United States Patent [19]
Watts, Jr. et al.

[11] Patent Number: 6,029,215
[45] Date of Patent: *Feb. 22, 2000

[54] COMPUTER DUCKING STATION WITH INTERNAL MICROPROCESSOR

[75] Inventors: LaVaughn F. Watts, Jr., Temple; Gary Verdun; Kevin Davis, both of Belton; Thomas R. Grimm, Temple, all of Tex.

[73] Assignee: Texas Instruments Incorporated, Dallas, Tex.

[*] Notice: This patent is subject to a terminal disclaimer.

[21] Appl. No.: 08/813,136

[22] Filed: Mar. 7, 1997

Related U.S. Application Data

[63] Continuation of application No. 08/335,934, Nov. 8, 1994, abandoned.

[51] Int. Cl.[7] .................................................. G06F 13/00
[52] U.S. Cl. ........................................... 710/101; 361/683
[58] Field of Search ..................................... 361/683, 686; 395/281, 750.02; 710/101; 713/310, 308

[56] References Cited

U.S. PATENT DOCUMENTS

| | | | |
|---|---|---|---|
| 5,283,714 | 2/1994 | Tsai et al. | 361/683 |
| 5,313,596 | 5/1994 | Swindler et al. | 395/281 |
| 5,323,291 | 6/1994 | Boyle et al. | 361/686 |
| 5,347,425 | 9/1994 | Herron et al. | 361/686 |
| 5,396,400 | 3/1995 | Register et al. | 361/686 |
| 5,477,415 | 12/1995 | Mitcham et al. | 361/686 |
| 5,488,572 | 1/1996 | Belmont | 364/514 |
| 5,526,493 | 6/1996 | Shu | 395/281 |
| 5,537,343 | 7/1996 | Kikinis et al. | 364/708.1 |
| 5,539,616 | 7/1996 | Kikinis | 361/686 |
| 5,579,528 | 11/1996 | Register | 395/671 |
| 5,627,974 | 5/1997 | Watts, Jr. et al. | 710/101 |

*Primary Examiner*—Larry D. Donaghue
*Attorney, Agent, or Firm*—Ronald C. Neerings; Richard L. Donaldson

[57] ABSTRACT

The described embodiments of the present invention provide a computer docking station having connection means for connecting a portable computer to the docking station, the docking station having an internal microprocessor.

In preferred embodiments, the microprocessor of the docking station: performs processing to the portable computer and applications across a communications bus between the microprocessor and said portable computer; controls the means by which the portable computer is mechanically connected to the docking station; controls the means by which the portable computer is electrically connected to said docking station; controls the means by which the portable computer is mechanically and electrically connected to said docking station; controls the power to the portable computer, connects the portable computer to the docking station from a software point of view; ejects the portable computer to from the docking station from a software point of view; controls processing across the bus; controls the function of free form switches on the docking station; and controls itself under a first mode of operation and is under at least partial from a central processing unit in said portable computer under a second mode of operation.

63 Claims, 71 Drawing Sheets

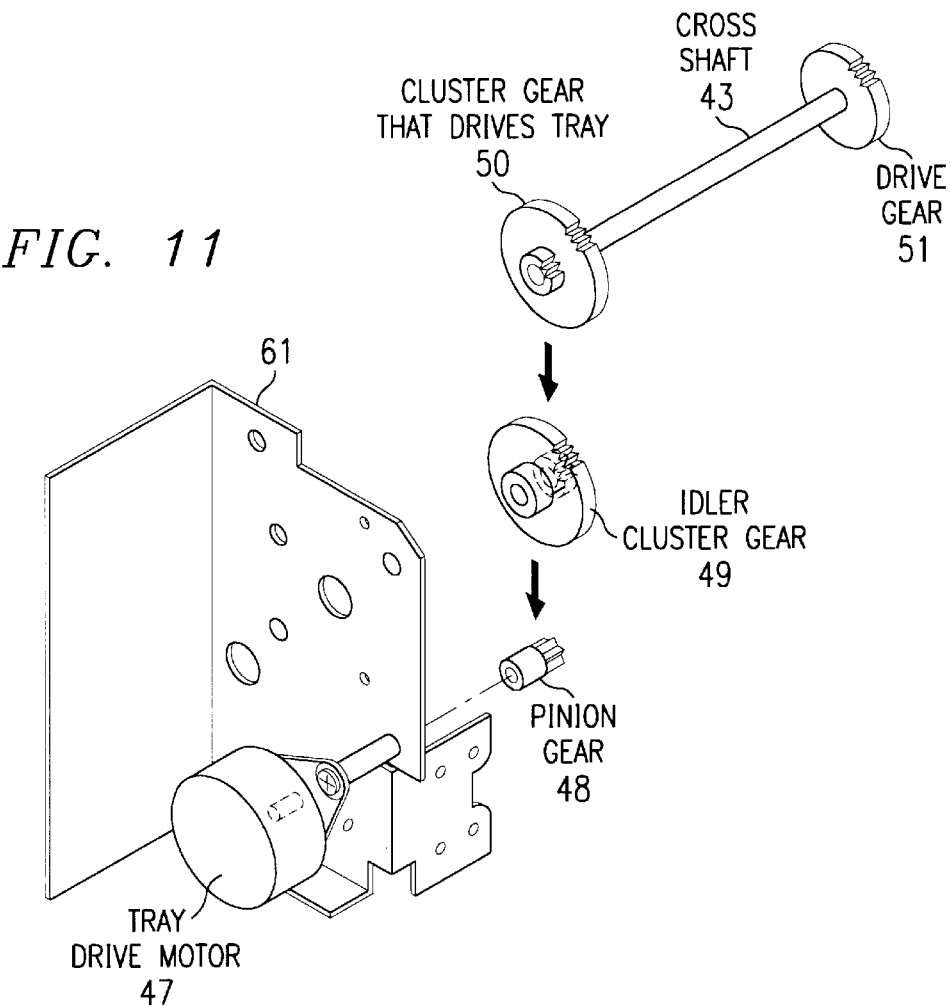
FIG. 11
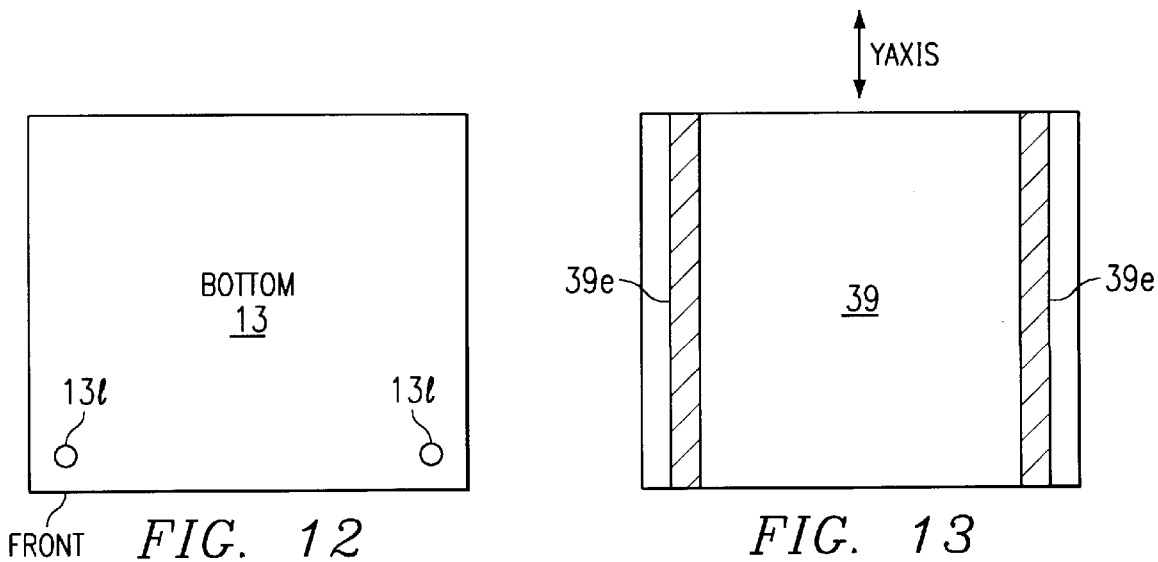
FIG. 12
FIG. 13

ES: UNLESS OTHERWISE SPECIFIED:

1. ALL IC DEVICE TYPES ARE PREFIXED WITH SN74.

2. THE FOLLOWING PREFIX'S ARE ALWAY'S USED:
    T IS EQUAL TO "LS"
    AT IS EQUAL TO "ALS"

3. THE FOLLOWING PREFIX'S ARE USED ONLY WHEN INSUFFICIENT CHARACTERS ARE AVAILABLE:
    A IS EQUAL TO "ACT"
    B IS EQUAL TO "BCT"
    V IS EQUAL TO "AS"
    W IS EQUAL TO "AT" OR "ALS"

4. IC PACKAGE TYPE IS INDICATED BY THE FOLLOWING SUFFIX'S:
    DUAL-IN-LINE, PLASTIC          = "N" OR BLANK
    DUAL-IN-LINE, PLASTIC (WIDE)   = NW
    DUAL-IN-LINE, CERAMIC          = J
    DUAL-IN-LINE, CERAMIC (WIDE)   = JD
    CHIP CARRIER, PLASTIC          = F
    CHIP CARRIER IN A S.M. SCKT    = FF
    CHIP CARRIER IN A PGA SCKT     = FX
    CHIP CARRIER, CERAMIC (RECT)   = FE
    CHIP CARRIER, CERAMIC (SQUARE) = FH
    FLAT PACKAGE, CERAMIC          = U
    FLAT PACKAGE, CERAMIC (WIDE)   = W
    GRID ARRAY, PLASTIC            = X
    GRID ARRAY, PLASTIC (LIF SCKT) = XL
    GRID ARRAY, PLASTIC (ZIF SCKT) = XZ
    GRID ARRAY, CERAMIC            = Y
    GRID ARRAY, CERAMIC (LIF SCKT) = YL
    GRID ARRAY, CERAMIC (ZIF SCKT) = YZ
    SINGLE-IN-LINE                 = E,L,M,G
    "SOIC", PLASTIC                = D
    "SOIC", PLASTIC (WIDE)         = DW
    "SOJ", PLASTIC, J LEADS        = R

5. VCC IS APPLIED TO PIN 8 OF ALL 8-PIN IC's, PIN 14 OF ALL 14-PIN IC's, PIN 16 OF ALL 16-PIN IC's, PIN 20 OF ALL 20-PIN IC's, ETC.

6. GROUND IS APPLIED TO PIN 4 OF ALL 8-PIN IC's, PIN 7 OF ALL 14-PIN IC's, PIN 8 OF ALL 16-PIN IC's, PIN 10 OF ALL 20-PIN IC's, ETC.

*FIG. 20A*

7. DEVICE TYPE, PIN NUMBERS, AND REFERENCE DESIGNATOR [LOCATION] OF GATES ARE SHOWN AS FOLLOWS:
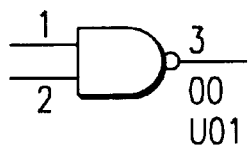
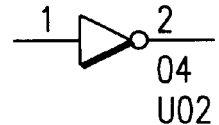
00 AND 04 = DEVICE TYPES
1, 2, AND 3 = PIN NUMBERS
U01 AND U02 = REF. DESIGNATOR [LOCATION]
8. RESISTANCE VALUES ARE IN OHMS.
9. RESISTORS ARE 1/8 WATT, 5%.
10. CAPACITANCE VALUES ARE IN MICROFARADS.
11. CAPACITORS ARE 50V, 10%.
12. THIS COUPON WILL BE USED ON ALL COMMERICAL MULTILAYER BOARDS.
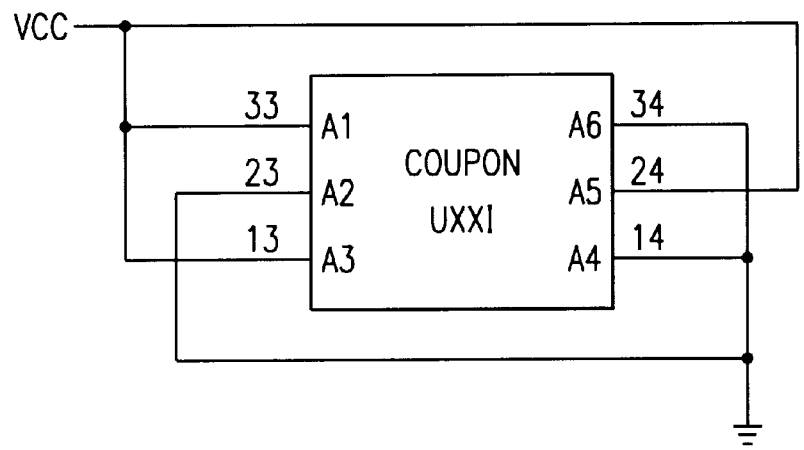
FIG. 20B

P1 AT BUS CONNECTOR

| | | | |
|---|---|---|---|
| GND | 1 | ATIOCHK- | 2 |
| ATRESET | 3 | ATD7 | 4 |
| VCC | 5 | ATD6 | 6 |
| IRQ9 | 7 | ATD5 | 8 |
| -5V | 9 | ATD4 | 10 |
| DRQ2 | 11 | ATD3 | 12 |
| -12V | 13 | ATD2 | 14 |
| ATZWS- | 15 | ATD1 | 16 |
| +12V | 17 | ATD0 | 18 |
| GND | 19 | ATIORDY- | 20 |
| SMEMW- | 21 | ATAEN | 22 |
| SMEMR- | 23 | ATA19 | 24 |
| ATIQW- | 25 | ATA18 | 26 |
| ATIQR- | 27 | ATA17 | 28 |
| DACK3- | 29 | ATA16 | 30 |
| DRQ3 | 31 | ATA15 | 32 |
| DACK1- | 33 | ATA14 | 34 |
| DRQ1 | 35 | ATA13 | 36 |
| ATREF- | 37 | ATA12 | 38 |
| ATSCLK | 39 | ATA11 | 40 |
| IRQ7 | 41 | ATA10 | 42 |
| IRQ6 | 43 | ATA9 | 44 |
| IRQ5 | 45 | ATA8 | 46 |
| IRQ4 | 47 | ATA7 | 48 |
| IRQ3 | 49 | ATA6 | 50 |
| DACK2- | 51 | ATA5 | 52 |
| ATT/C | 53 | ATA4 | 54 |
| ATALE | 55 | ATA3 | 56 |
| VCC | 57 | ATA2 | 58 |
| OSC | 59 | ATA1 | 60 |
| GND | 61 | ATA0 | 62 |
| ATMCS16- | 63 | ATSBHE- | 64 |
| ATIOC16- | 65 | ATLA23 | 66 |
| IRQ10 | 67 | ATLA22 | 68 |
| IRQ11 | 69 | ATLA21 | 70 |
| IRQ12 | 71 | ATLA20 | 72 |
| × | 73 | ATLA19 | 74 |
| IRQ14 | 75 | ATLA18 | 76 |
| DACK0- | 77 | ATLA17 | 78 |
| DRQ0 | 79 | ATMEMR- | 80 |
| DACK5- | 81 | ATMEMW- | 82 |
| DRQ5 | 83 | ATD8 | 84 |
| DACK6- | 85 | ATD9 | 86 |
| DRQ6 | 87 | ATD10 | 88 |
| DACK7- | 89 | ATD11 | 90 |
| DRQ7 | 91 | ATD12 | 92 |
| VCC | 93 | ATD13 | 94 |
| MASTER- | 95 | ATD14 | 96 |
| GND | 97 | ATD15 | 98 |

P2 AT BUS CONNECTOR

| | | | |
|---|---|---|---|
| GND | 1 | ATIOCHK- | 2 |
| ATRESET | 3 | ATD7 | 4 |
| VCC | 5 | ATD6 | 6 |
| IRQ9 | 7 | ATD5 | 8 |
| -5V | 9 | ATD4 | 10 |
| DRQ2 | 11 | ATD3 | 12 |
| -12V | 13 | ATD2 | 14 |
| ATZWS- | 15 | ATD1 | 16 |
| +12V | 17 | ATD0 | 18 |
| GND | 19 | ATIORDY- | 20 |
| SMEMW- | 21 | ATAEN | 22 |
| SMEMR- | 23 | ATA19 | 24 |
| ATIQW- | 25 | ATA18 | 26 |
| ATIQR- | 27 | ATA17 | 28 |
| DACK3- | 29 | ATA16 | 30 |
| DRQ3 | 31 | ATA15 | 32 |
| DACK1- | 33 | ATA14 | 34 |
| DRQ1 | 35 | ATA13 | 36 |
| ATREF- | 37 | ATA12 | 38 |
| ATSCLK | 39 | ATA11 | 40 |
| IRQ7 | 41 | ATA10 | 42 |
| IRQ6 | 43 | ATA9 | 44 |
| IRQ5 | 45 | ATA8 | 46 |
| IRQ4 | 47 | ATA7 | 48 |
| IRQ3 | 49 | ATA6 | 50 |
| DACK2- | 51 | ATA5 | 52 |
| ATT/C | 53 | ATA4 | 54 |
| ATALE | 55 | ATA3 | 56 |
| VCC | 57 | ATA2 | 58 |
| OSC | 59 | ATA1 | 60 |
| GND | 61 | ATA0 | 62 |
| ATMCS16- | 63 | ATSBHE- | 64 |
| ATIOC16- | 65 | ATLA23 | 66 |
| IRQ10 | 67 | ATLA22 | 68 |
| IRQ11 | 69 | ATLA21 | 70 |
| IRQ12 | 71 | ATLA20 | 72 |
| × | 73 | ATLA19 | 74 |
| IRQ14 | 75 | ATLA18 | 76 |
| DACK0- | 77 | ATLA17 | 78 |
| DRQ0 | 79 | ATMEMR- | 80 |
| DACK5- | 81 | ATMEMW- | 82 |
| DRQ5 | 83 | ATD8 | 84 |
| DACK6- | 85 | ATD9 | 86 |
| DRQ6 | 87 | ATD10 | 88 |
| DACK7- | 89 | ATD11 | 90 |
| DRQ7 | 91 | ATD12 | 92 |
| VCC | 93 | ATD13 | 94 |
| MASTER- | 95 | ATD14 | 96 |
| GND | 97 | ATD15 | 98 |

FIG. 32B

P3 AT BUS CONNECTOR

| Pin | Signal | Pin | Signal |
|---|---|---|---|
| 1 | GND | 2 | ATIOCHK- |
| 3 | ATRESET | 4 | ATD7 |
| 5 | VCC | 6 | ATD6 |
| 7 | IRQ9 | 8 | ATD5 |
| 9 | -5V | 10 | ATD4 |
| 11 | DRQ2 | 12 | ATD3 |
| 13 | -12V | 14 | ATD2 |
| 15 | ATZWS- | 16 | ATD1 |
| 17 | +12V | 18 | ATD0 |
| 19 | GND | 20 | ATIORDY- |
| 21 | SMEMW- | 22 | ATAEN |
| 23 | SMEMR- | 24 | ATA19 |
| 25 | ATIQW- | 26 | ATA18 |
| 27 | ATIQR- | 28 | ATA17 |
| 29 | DACK3- | 30 | ATA16 |
| 31 | DRQ3 | 32 | ATA15 |
| 33 | DACK1- | 34 | ATA14 |
| 35 | DRQ1 | 36 | ATA13 |
| 37 | ATREF- | 38 | ATA12 |
| 39 | ATSCLK | 40 | ATA11 |
| 41 | IRQ7 | 42 | ATA10 |
| 43 | IRQ6 | 44 | ATA9 |
| 45 | IRQ5 | 46 | ATA8 |
| 47 | IRQ4 | 48 | ATA7 |
| 49 | IRQ3 | 50 | ATA6 |
| 51 | DACK2- | 52 | ATA5 |
| 53 | ATT/C | 54 | ATA4 |
| 55 | ATALE | 56 | ATA3 |
| 57 | VCC | 58 | ATA2 |
| 59 | OSC | 60 | ATA1 |
| 61 | GND | 62 | ATA0 |
| 63 | ATMCS16- | 64 | ATSBHE- |
| 65 | ATIOC16- | 66 | ATLA23 |
| 67 | IRQ10 | 68 | ATLA22 |
| 69 | IRQ11 | 70 | ATLA21 |
| 71 | IRQ12 | 72 | ATLA20 |
| 73 | IRQ14 (x) | 74 | ATLA19 |
| 75 |  | 76 | ATLA18 |
| 77 | DACK0- | 78 | ATLA17 |
| 79 | DRQ0 | 80 | ATMEMR- |
| 81 | DACK5- | 82 | ATMEMW- |
| 83 | DRQ5 | 84 | ATD8 |
| 85 | DACK6- | 86 | ATD9 |
| 87 | DRQ6 | 88 | ATD10 |
| 89 | DACK7- | 90 | ATD11 |
| 91 | DRQ7 | 92 | ATD12 |
| 93 | VCC | 94 | ATD13 |
| 95 | MASTER- | 96 | ATD14 |
| 97 | GND | 98 | ATD15 |

P4 AT BUS CONNECTOR

| Pin | Signal | Pin | Signal |
|---|---|---|---|
| 1 | GND | 2 | ATIOCHK- |
| 3 | ATRESET | 4 | ATD7 |
| 5 | VCC | 6 | ATD6 |
| 7 | IRQ9 | 8 | ATD5 |
| 9 | -5V | 10 | ATD4 |
| 11 | DRQ2 | 12 | ATD3 |
| 13 | -12V | 14 | ATD2 |
| 15 | ATZWS- | 16 | ATD1 |
| 17 | +12V | 18 | ATD0 |
| 19 | GND | 20 | ATIORDY- |
| 21 | SMEMW- | 22 | ATAEN |
| 23 | SMEMR- | 24 | ATA19 |
| 25 | ATIQW- | 26 | ATA18 |
| 27 | ATIQR- | 28 | ATA17 |
| 29 | DACK3- | 30 | ATA16 |
| 31 | DRQ3 | 32 | ATA15 |
| 33 | DACK1- | 34 | ATA14 |
| 35 | DRQ1 | 36 | ATA13 |
| 37 | ATREF- | 38 | ATA12 |
| 39 | ATSCLK | 40 | ATA11 |
| 41 | IRQ7 | 42 | ATA10 |
| 43 | IRQ6 | 44 | ATA9 |
| 45 | IRQ5 | 46 | ATA8 |
| 47 | IRQ4 | 48 | ATA7 |
| 49 | IRQ3 | 50 | ATA6 |
| 51 | DACK2- | 52 | ATA5 |
| 53 | ATT/C | 54 | ATA4 |
| 55 | ATALE | 56 | ATA3 |
| 57 | VCC | 58 | ATA2 |
| 59 | OSC | 60 | ATA1 |
| 61 | GND | 62 | ATA0 |
| 63 | ATMCS16- | 64 | ATSBHE- |
| 65 | ATIOC16- | 66 | ATLA23 |
| 67 | IRQ10 | 68 | ATLA22 |
| 69 | IRQ11 | 70 | ATLA21 |
| 71 | IRQ12 | 72 | ATLA20 |
| 73 | IRQ14 (x) | 74 | ATLA19 |
| 75 |  | 76 | ATLA18 |
| 77 | DACK0- | 78 | ATLA17 |
| 79 | DRQ0 | 80 | ATMEMR- |
| 81 | DACK5- | 82 | ATMEMW- |
| 83 | DRQ5 | 84 | ATD8 |
| 85 | DACK6- | 86 | ATD9 |
| 87 | DRQ6 | 88 | ATD10 |
| 89 | DACK7- | 90 | ATD11 |
| 91 | DRQ7 | 92 | ATD12 |
| 93 | VCC | 94 | ATD13 |
| 95 | MASTER- | 96 | ATD14 |
| 97 | GND | 98 | ATD15 |

FIG. 32C

P5 AT BUS CONNECTOR

| Pin | Signal | Pin | Signal |
|---|---|---|---|
| 1 | GND | 2 | ATIOCHK- |
| 3 | ATRESET | 4 | ATD7 |
| 5 | VCC | 6 | ATD6 |
| 7 | IRQ9 | 8 | ATD5 |
| 9 | -5V | 10 | ATD4 |
| 11 | DRQ2 | 12 | ATD3 |
| 13 | -12V | 14 | ATD2 |
| 15 | ATZWS- | 16 | ATD1 |
| 17 | +12V | 18 | ATD0 |
| 19 | GND | 20 | ATIORDY- |
| 21 | SMEMW- | 22 | ATAEN |
| 23 | SMEMR- | 24 | ATA19 |
| 25 | ATIQW- | 26 | ATA18 |
| 27 | ATIQR- | 28 | ATA17 |
| 29 | DACK3- | 30 | ATA16 |
| 31 | DRQ3 | 32 | ATA15 |
| 33 | DACK1- | 34 | ATA14 |
| 35 | DRQ1 | 36 | ATA13 |
| 37 | ATREF- | 38 | ATA12 |
| 39 | ATSCLK | 40 | ATA11 |
| 41 | IRQ7 | 42 | ATA10 |
| 43 | IRQ6 | 44 | ATA9 |
| 45 | IRQ5 | 46 | ATA8 |
| 47 | IRQ4 | 48 | ATA7 |
| 49 | IRQ3 | 50 | ATA6 |
| 51 | DACK2- | 52 | ATA5 |
| 53 | ATT/C | 54 | ATA4 |
| 55 | ATALE | 56 | ATA3 |
| 57 | VCC | 58 | ATA2 |
| 59 | OSC | 60 | ATA1 |
| 61 | GND | 62 | ATA0 |
| 63 | ATMCS16- | 64 | ATSBHE- |
| 65 | ATIOC16- | 66 | ATLA23 |
| 67 | IRQ10 | 68 | ATLA22 |
| 69 | IRQ11 | 70 | ATLA21 |
| 71 | IRQ12 | 72 | ATLA20 |
| 73 | × | 74 | ATLA19 |
| 75 | IRQ14 | 76 | ATLA18 |
| 77 | DACK0- | 78 | ATLA17 |
| 79 | DRQ0 | 80 | ATMEMR- |
| 81 | DACK5- | 82 | ATMEMW- |
| 83 | DRQ5 | 84 | ATD8 |
| 85 | DACK6- | 86 | ATD9 |
| 87 | DRQ6 | 88 | ATD10 |
| 89 | DACK7- | 90 | ATD11 |
| 91 | DRQ7 | 92 | ATD12 |
| 93 | VCC | 94 | ATD13 |
| 95 | MASTER- | 96 | ATD14 |
| 97 | GND | 98 | ATD15 |

P6 AT BUS CONNECTOR

| Pin | Signal | Pin | Signal |
|---|---|---|---|
| 1 | GND | 2 | ATIOCHK- |
| 3 | ATRESET | 4 | ATD7 |
| 5 | VCC | 6 | ATD6 |
| 7 | IRQ9 | 8 | ATD5 |
| 9 | -5V | 10 | ATD4 |
| 11 | DRQ2 | 12 | ATD3 |
| 13 | -12V | 14 | ATD2 |
| 15 | ATZWS- | 16 | ATD1 |
| 17 | +12V | 18 | ATD0 |
| 19 | GND | 20 | ATIORDY- |
| 21 | SMEMW- | 22 | ATAEN |
| 23 | SMEMR- | 24 | ATA19 |
| 25 | ATIQW- | 26 | ATA18 |
| 27 | ATIQR- | 28 | ATA17 |
| 29 | DACK3- | 30 | ATA16 |
| 31 | DRQ3 | 32 | ATA15 |
| 33 | DACK1- | 34 | ATA14 |
| 35 | DRQ1 | 36 | ATA13 |
| 37 | ATREF- | 38 | ATA12 |
| 39 | ATSCLK | 40 | ATA11 |
| 41 | IRQ7 | 42 | ATA10 |
| 43 | IRQ6 | 44 | ATA9 |
| 45 | IRQ5 | 46 | ATA8 |
| 47 | IRQ4 | 48 | ATA7 |
| 49 | IRQ3 | 50 | ATA6 |
| 51 | DACK2- | 52 | ATA5 |
| 53 | ATT/C | 54 | ATA4 |
| 55 | ATALE | 56 | ATA3 |
| 57 | VCC | 58 | ATA2 |
| 59 | OSC | 60 | ATA1 |
| 61 | GND | 62 | ATA0 |
| 63 | ATMCS16- | 64 | ATSBHE- |
| 65 | ATIOC16- | 66 | ATLA23 |
| 67 | IRQ10 | 68 | ATLA22 |
| 69 | IRQ11 | 70 | ATLA21 |
| 71 | IRQ12 | 72 | ATLA20 |
| 73 | × | 74 | ATLA19 |
| 75 | IRQ14 | 76 | ATLA18 |
| 77 | DACK0- | 78 | ATLA17 |
| 79 | DRQ0 | 80 | ATMEMR- |
| 81 | DACK5- | 82 | ATMEMW- |
| 83 | DRQ5 | 84 | ATD8 |
| 85 | DACK6- | 86 | ATD9 |
| 87 | DRQ6 | 88 | ATD10 |
| 89 | DACK7- | 90 | ATD11 |
| 91 | DRQ7 | 92 | ATD12 |
| 93 | VCC | 94 | ATD13 |
| 95 | MASTER- | 96 | ATD14 |
| 97 | GND | 98 | ATD15 |

```
TravelMate DeskTop/MicroDock Setup Program
        Version 1.00.15 Dec 1 1993

Page 2 of 3
Port settings
                       Notebook    MicroDock    DeskTop
                         Only      & Notebook   & Notebook
       Configuration:      1           1            1
Notebook  9 Pin Serial:  COM1        COM3         N/A
    Notebook Internal:   COM2        COM2         COM2
 Station  9 Pin Serial:   N/A        COM1         COM1
 Station 25 Pin Serial:   N/A         N/A         COM3

COM3/COM4 Addresses: 3e8/2e8
Select comm port configuration

Esc=Exit  F1=Help     ↑↓Field  +/- Value  PgUp/PgDn
```

FIG. 39

```
TravelMate DeskTop/MicroDock Setup Program
        Version X.XX MMM D YYYY

Page 3 of 3
LPT settings
                       Notebook    MicroDock    DeskTop
                         Only      & Notebook   & Notebook
       Configuration:     2           1            1
               LPT1:  Notebook Port  MicroDock   DeskTop Port
                      378h-IRQ7      378h-IRQ7   378h-IRQ7
               LPT2:    N/A         Notebook Port   N/A
                                    278h-IRQ5

DeskTop/MicroDock LPT port type:      Standard
Select LPT port configuration

Esc=Exit  F1=Help  F2=Info    ↑↓Field  +/- Value  PgUp/PgDn
```

FIG. 40

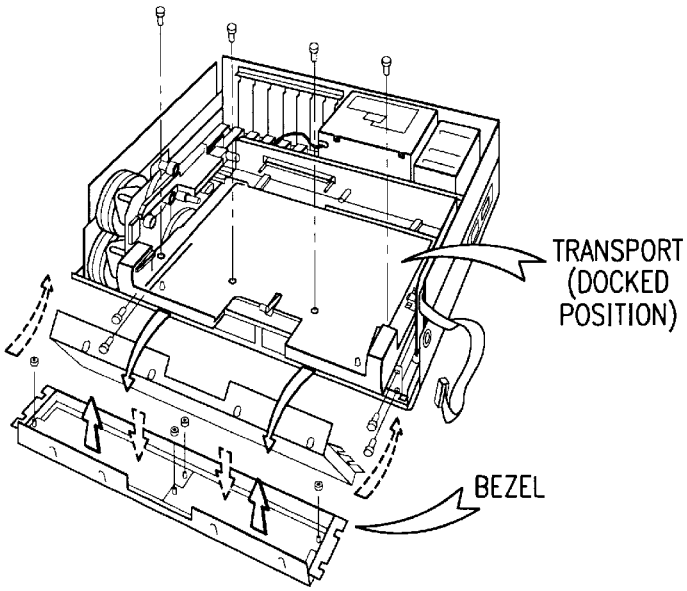
FIG. 50
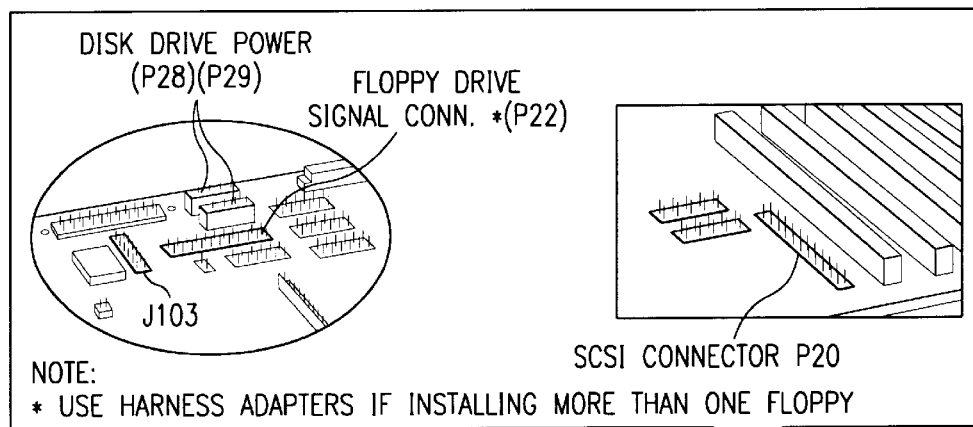
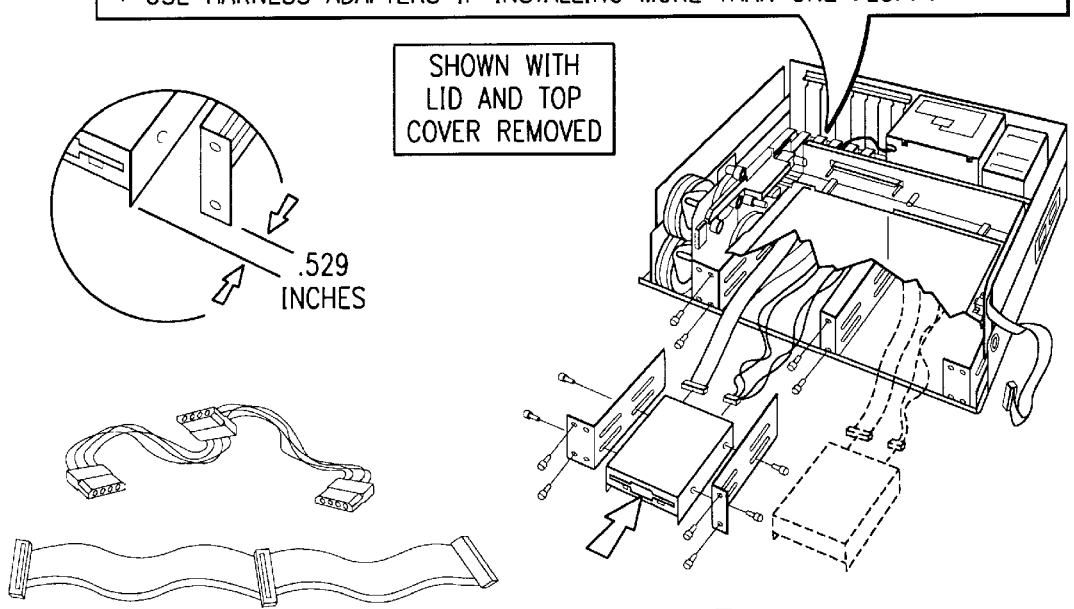
FIG. 51

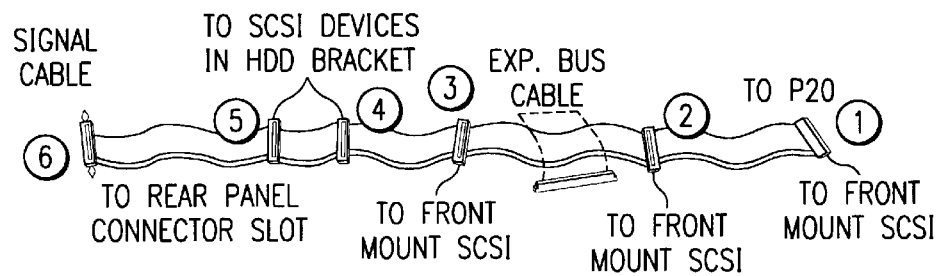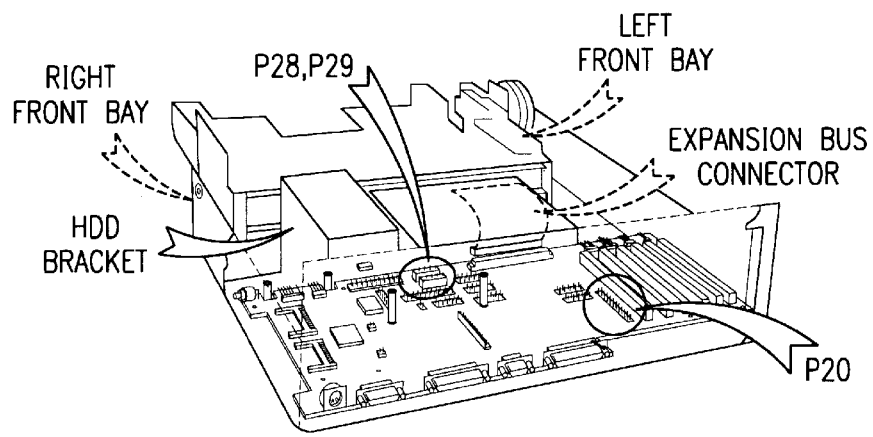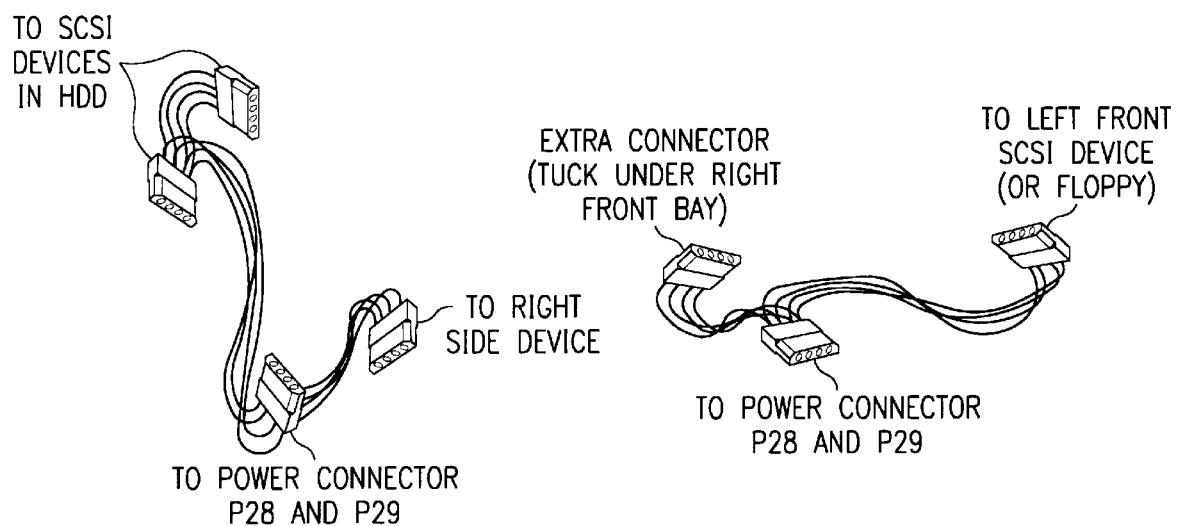
FIG. 57

| Pin | Signal |
|---|---|
| 1 | Strobe |
| 2 | Data Bit 0 |
| 3 | Data Bit 1 |
| 4 | Data Bit 2 |
| 5 | Data Bit 3 |
| 6 | Data Bit 4 |
| 7 | Data Bit 5 |
| 8 | Data Bit 6 |
| 9 | Data Bit 7 |
| 10 | Acknowledge* |
| 11 | Busy |
| 12 | Paper Out |
| 13 | Select |
| 14 | Auto Linefeed* |
| 15 | Error* |
| 16 | Intialize Printer* |
| 17 | Select In* |
| 18 | Ground |
| 19 | Ground |
| 20 | Ground |
| 21 | Ground |
| 22 | Ground |
| 23 | Ground |
| 24 | Ground |
| 25 | Ground |

NOTE: * Active Low

Game Port Connector Pinouts

| Pin Number | Name |
|---|---|
| 1,8,9,15 | VCC |
| 2 | DC4 |
| 3 | TMRD |
| 4,5,12 | GND |
| 6 | TMRC |
| 7 | D5 |
| 10 | D6 |
| 11 | TMRB |
| 13 | TMRA |
| 14 | D7 |

COMPUTER DUCKING STATION WITH INTERNAL MICROPROCESSOR

This application is a Continuation of application Ser. No. 08/335,934, filed Nov. 8, 1994 now abandoned.

TECHNICAL FIELD OF THE INVENTION

This invention relates to computer docking station and more particularly to an computer docking station having an internal microprocessor.

BACKGROUND OF THE INVENTION

The growth in the use of Personal Computers marks the present age. Not only for the use in desktop computing but also the use of a portable notebook or laptop type computer when traveling. The use of the two computers, one for the desktop and one for traveling, has created a problem that when the traveler returns to the office the desktop or portable computer now has more recent data in it than did the office base computer. Also, when you leave to go on a trip the portable would be behind the desktop computer. Complex systems of lap-link type cables and software haven't developed to speed up the exchange of information from the portable computer to the desktop or base computer. This also, however, results in a problem of trying to know just which computer had the latest and greatest data. The solution is the ability to simply have only a portable computer and use it as a base station with a means referred to as a "docking station" in which the portable computer is mounted to the base station which connects up to a real size keyboard and monitor and to a modem and LAN or local area network. One of the small problems that seems though lingering in that with all of the plugs, key/cable, LAN adapters, one could spend a good deal of time just tending to all the hardware to connect and disconnect. The docking station is an idea to simplify all of the hookups, but it still takes manipulation and task just to see if everything gets plugged in right and without bending one of the many pins. The current state-of-art docking stations have a buss pin at one end in which like a printed circuit card, the CPU is mounted and then manually the other elements are plugged in. This can be a concern with a relatively heavy portable computer and many tiny pins. What is really in need is some form of automatic docking station so that one need not be a hardware expert or have certain training and skill and adeptness and take time to hookup the monitor, the keyboard, the cables, and the LAN and check over before turning on the computer system are automatic systems that will automatically hookup correctly, self check and turn on while the user is attending to other activities is highly desirable when you're ready to leave or go on a trip.

It is highly desirable to have a docking station that also appropriately disconnects the portable computer in the manner of ejecting a tape from a VCR so the traveler is ready to go in an instant. It would be desirable to provide some way of automatic loading and unloading the laptop computer when one is ready for a trip. Many people who utilize computers do not consider themselves expert in the field of wiring or plugging in equipment. They simply want to put it in something and have it automatically loaded and when leaving to such a button and have the docking station deliver it free to travel.

SUMMARY OF THE INVENTION

The described embodiments of the present invention provide a computer docking station having connection means for connecting a portable computer to the docking station, the docking station having an internal microprocessor.

In preferred embodiments, the microprocessor of the docking station: performs processing to the portable computer and applications across a communications bus between the microprocessor and said portable computer; controls the means by which the portable computer is mechanically connected to the docking station; controls the means by which the portable computer is electrically connected to said docking station; controls the means by which the portable computer is mechanically and electrically connected to said docking station; controls the power to the portable computer; connects the portable computer to the docking station from a software point of view; ejects the portable computer from the docking station from a software point of view; controls processing across the bus; controls the function of free form switches on the docking station; and controls itself under a first mode of operation and is under at least partial control from a central processing unit in said portable computer under a second mode of operation.

DESCRIPTION OF THE DRAWINGS

FIG. 11 illustrates the tray drive train for the docking station of FIG. 1.

FIG. 12 is a bottom view of the personal computer illustrating the alignment pins.

FIG. 13 is a bottom view of the tray of FIG. 11 illustrating the drive racks for the trays.

FIGS. 20a, 20b, 21a, 21b, 21c, 22a, 22b, 22c, 23a, 23b, 24, 25a, 25b, 25c, 26a, 26b, 27a, 27b, 28a, 28b, 28c, 29a, 29b, 29c, 30a, 30b, 31a, 31b, 32a, 32b, 32c, 32d, 33a, 33b, 33c, 33d, 34a, 34b, 34c, 35a, 35b, and 35c are electrical schematic diagrams for main board 94.

FIG. 39 illustrates SETDOCK second screen.

FIG. 40 illustrates SETDOCK third screen.

FIG. 50 illustrates removing the bezel.

FIG. 51 illustrates installing front mount devices.

FIG. 57 illustrates routing of the 6-connector SCSI interface cable.

DETAILED DESCRIPTION OF THE INVENTION

Figure 1:
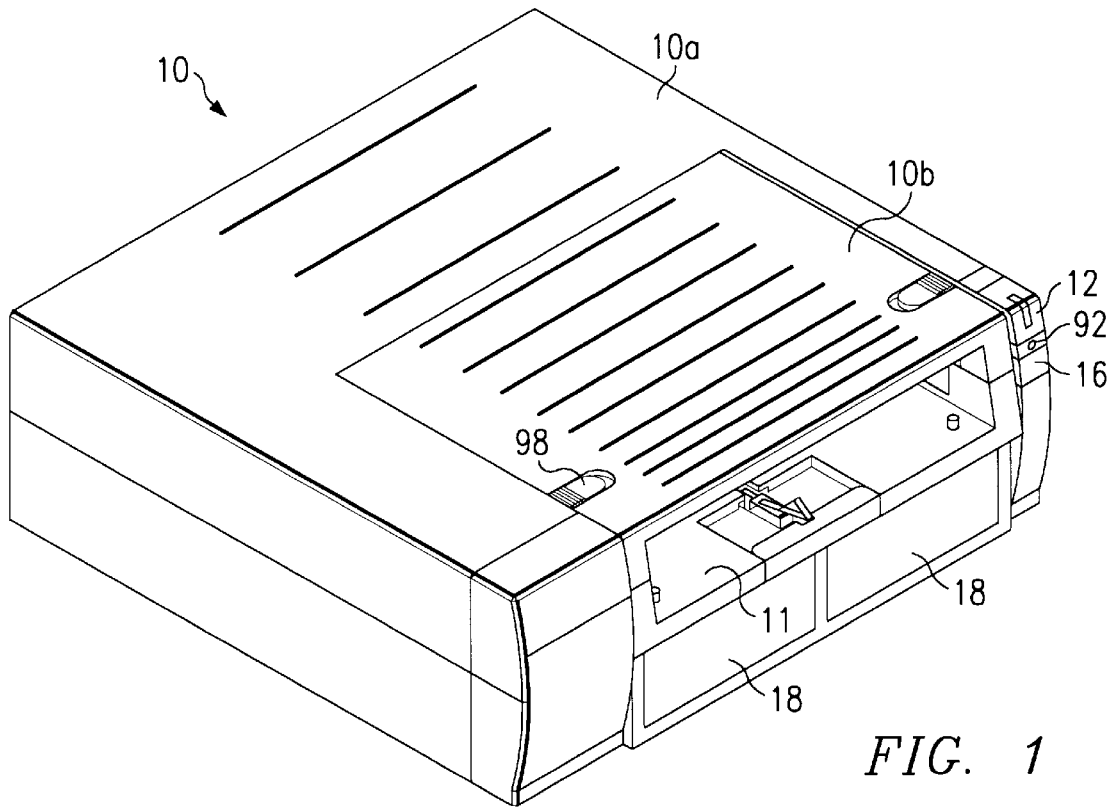
FIG. 1 is a front perexecutive view sketch of the docking station in accordance with one embodiment of the present invention.

Referring to FIG. 1 there is illustrated the docking station in accordance with the present invention. Docking station 10 includes a slot 11 for receiving a portable computer 13 shown in FIG. 2.

Figure 3:
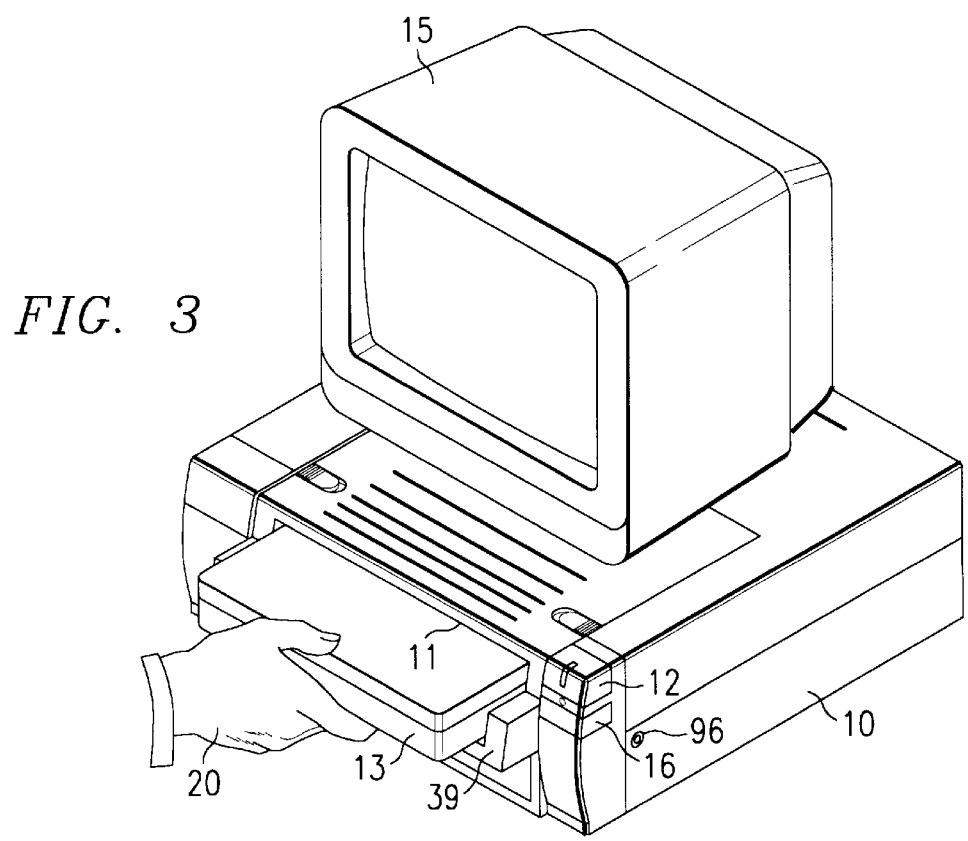
FIG. 3 is a sketch of the docking station of FIG. 1 receiving a portable computer.
Figure 2:
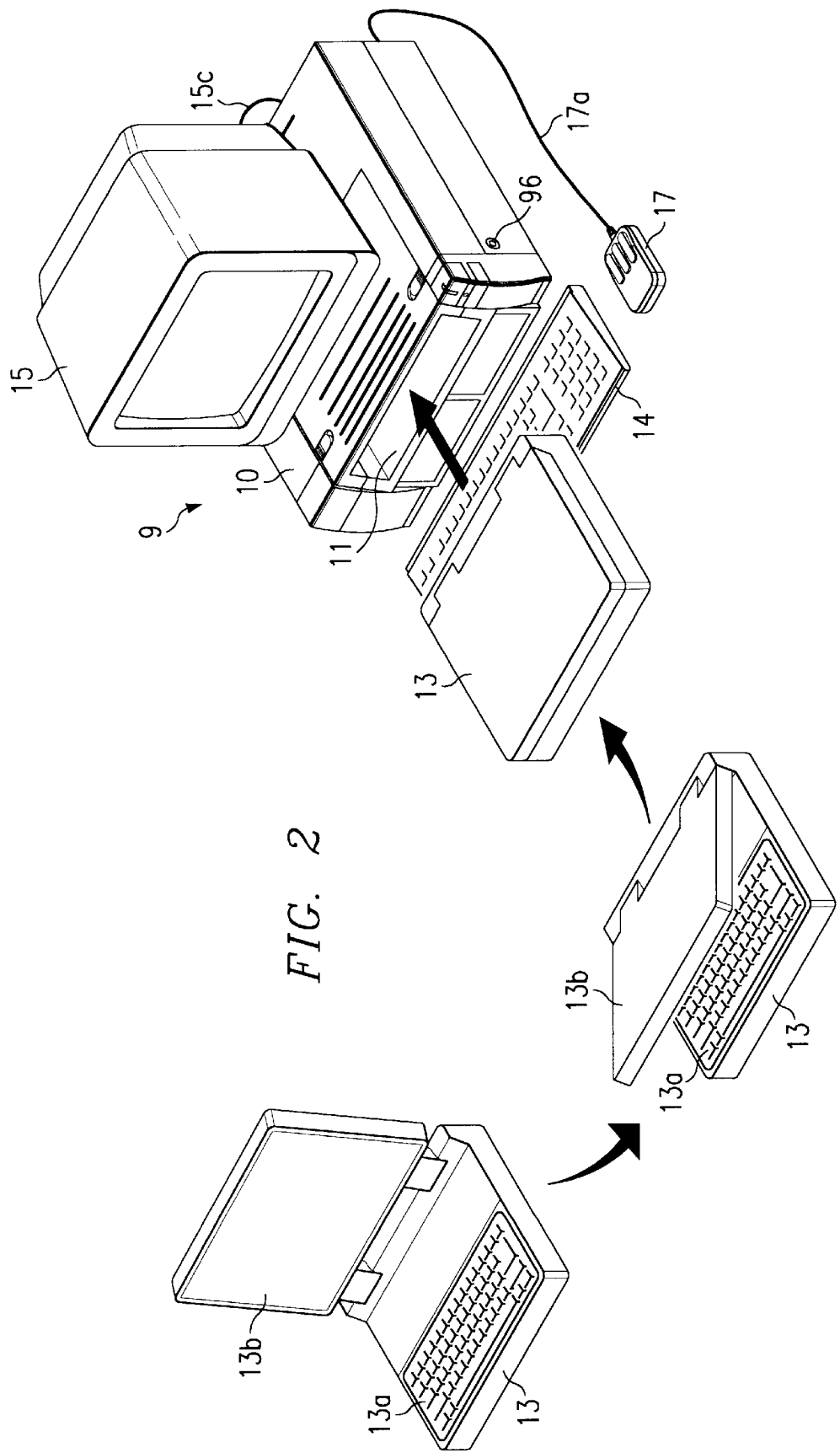
FIG. 2 is a sketch of a portable laptop computer being folded and applied to the docking station of FIG. 1 in accordance with the present invention.

FIG. 2 illustrates the progression of a portable laptop or notebook computer 13 from an open position to a partially folded position and after being folded is inserted into the opening or the slot 11 in the docking station 10. FIG. 2 further illustrates a docking station system 9 comprising portable computer 13 docked to docking station 10, a full size monitor 15, a mouse 17, a full size keyboard 14 and further may include, for example a LAN connection not shown, all connected to docking station 10. Portable computer 13 is powered down and loaded into docking station 10, as illustrated in FIG. 3. Plastic posts or pins 53 on the tray of docking station 10, illustrated in FIG. 10, fully insert into holes in the bottom of portable computer 13. A docking station user 20 depresses load/eject switch or button 16 and the portable computer 13 is driven by the docking station into its enabling position such that the portable computer is hooked up to the CRT display 15, a fullsize keyboard 14, power supply, a LAN network as well as any mouse connection, through its connections to docking station 10. User 20 may then depress standby/on power key and indicator 12 to turn power on to the docking station system 9.

Figure 4:
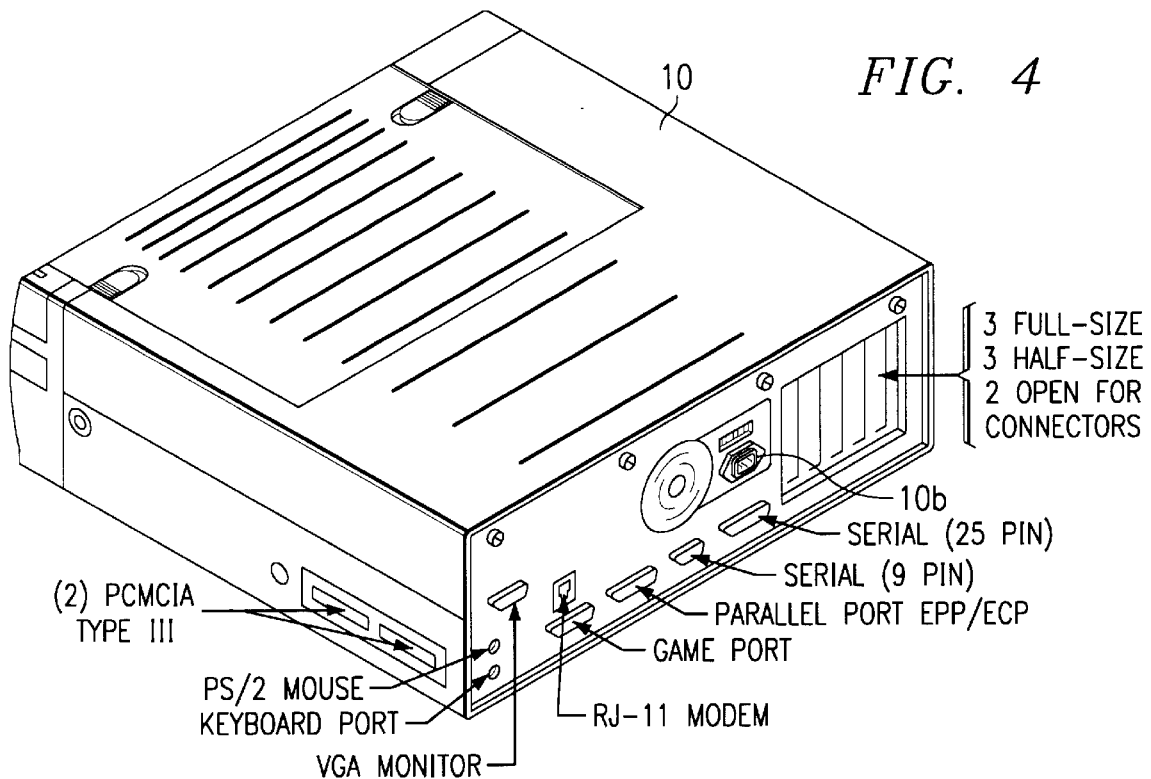
FIG. 4 is a rear view of the docking station of FIG. 1.

Referring again to FIG. 1, the top 10a of the base station 10 is used as a VGA monitor stand. There is the slot 11. There are below the slot 11 two drive bays 18 in which can be placed hard drives, either 3.5" or 5.25." These drive bays 18 may also be used for CD ROMs or tape backup devices. The bottom button 16 on the base station 10 can be used to load or eject the notebook or portable computer 13. There is also a battery charge indicator light 92 between load/eject switch 16 and standby/on power key and indicator 12, since the docking station, when docked to the portable computer, can be used to also charge the battery in the portable PC unit 13. There are also two PCMCIA type 111 card slots. The PCMCIA cards can be used to include Eithernet and Token ray operations. Referring to FIG. 4, there is illustrated a back view of the docking station 10 which shows places for connectors. There is a 25 pin 16550UART serial port and a 9 pin 16550UART serial port, a EPP/ECP parallel port, a port for the fullsize keyboard 14, a port for the mouse, a port for the VGA monitor next to the PCMCIA port and a power plug connector 10b to which a power cord is attached and plugged into a wall outlet. The portable may be, for example, a TravelMate 4000 Notebook computer made by Texas Instruments or may be one of the competition units made by Toshiba, IBM or Compaq.

Figure 5:
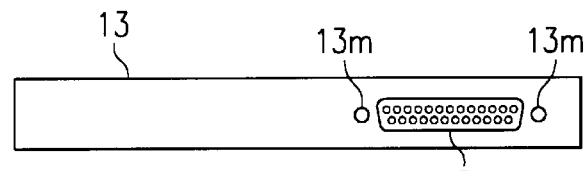
FIG. 5 is a rear view of the portable computer illustrating the sub-connector.
Figure 6:
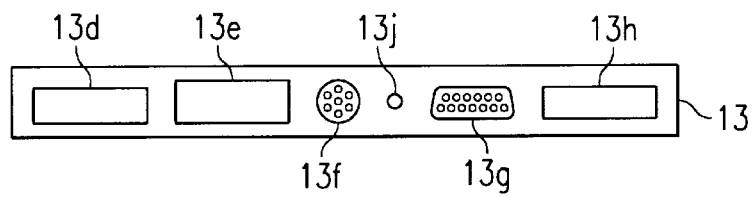
FIG. 6 is a left side view of the portable computer illustrating the connectors.

The portable computer 13, as illustrated in FIG. 2, includes a keyboard half 13a and a display half 13b in the cover. On the backed or hinged edge of the portable computer 13 there is a buss connector 13c as shown in FIG. 5 which is wired to the keyboard 13a and changeable power supply. As shown in FIG. 6 on the left side edge of the portable PC 13, there is a connector 13d for the serial buss, a connector 13e for a modem, a mouse connector 13f, a VGA connector 13g and a parallel port buss connector 13h. There is also an alignment pin hole 13j. On the right edge of the portable CPU13, there is a mouse connector 13k as shown in FIG. 3 to receive a mouse. The mouse connector is a connector pad such as used with the QUICK PORT connections of Texas Instruments TravelMates. As will be described in connection with the present invention, an automatic docking system will make the connections to the rear bus connector 13, to the modem connector 13e, to the VGA connector 13g and to the mouse connector 13k of the portable PC 13. The docking station 10 has internal wiring to couple the VGA input from the PC 13 connector 13g to the VG monitor output connector of the base station to which monitor 15 is connected by the cable 15c to couple the modem connector 13e to the modem output on the back of the base station 10, and to couple the mouse connector 13k output through the 15/2 mouse plug and mouse 17 via cable 17a.

Figure 8:
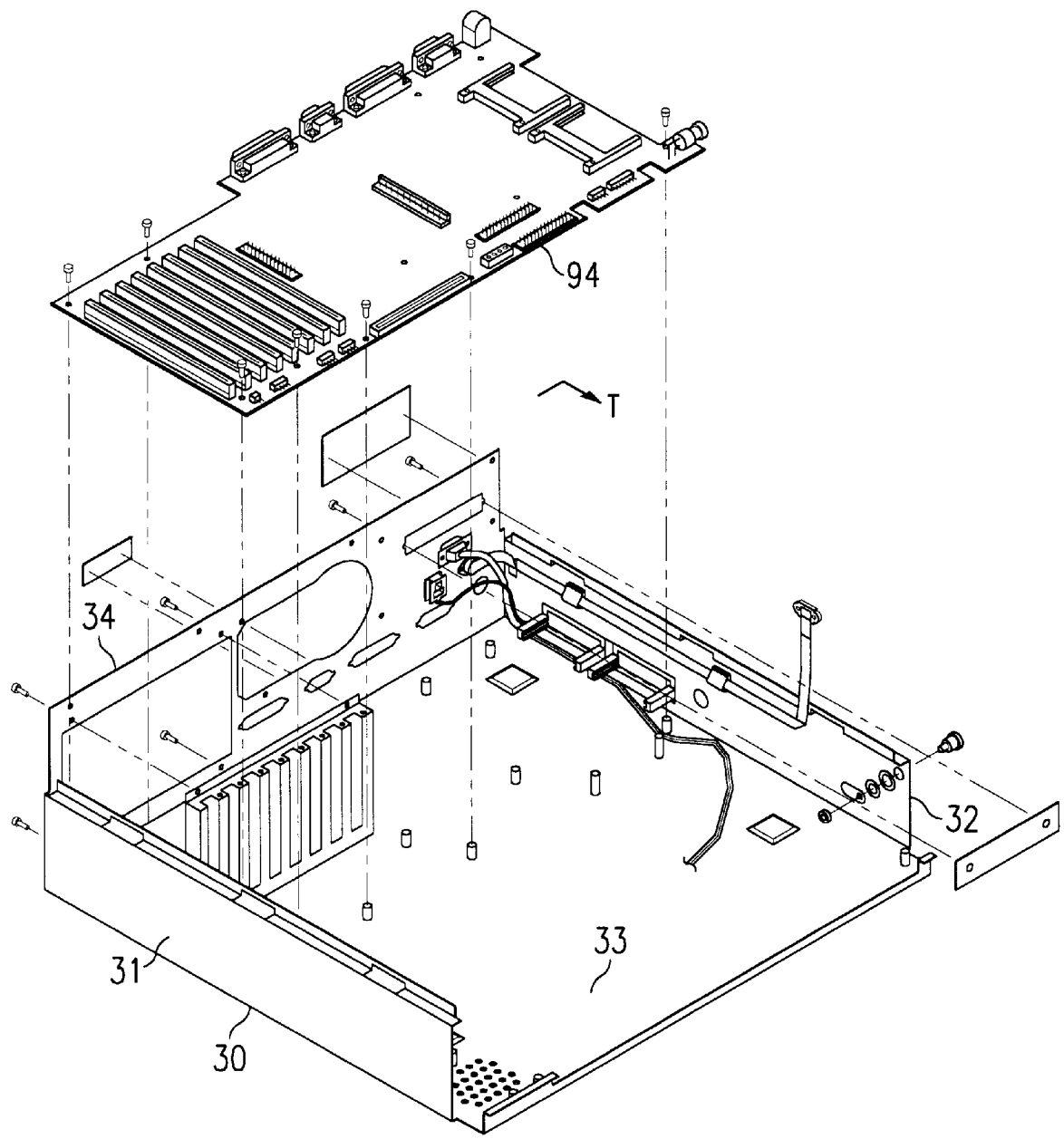
FIG. 8 is an exploded view of the docking station of FIG. 1 with the top cover, front cover, tray and associated parts removed.
Figure 9:
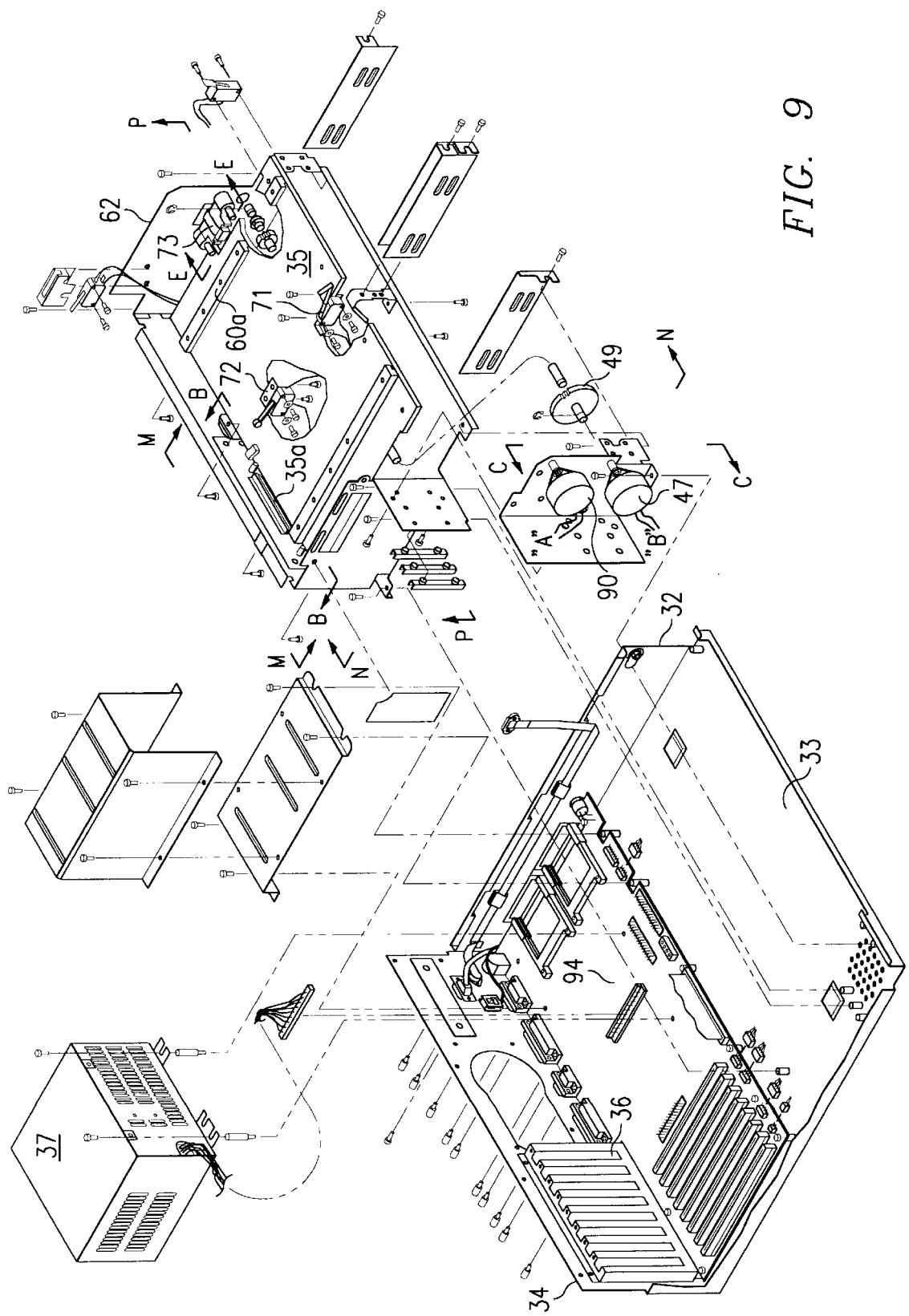
FIG. 9 is an exploded view of the docking station of FIG. 1 with the top cover and front cover removed.

FIG. 8 illustrates a partial view of the inside of the docking station 10, with the top housing cover 10a and front side wall removed, showing the housing 30 with the left side 31, right side 32, back side wall 34, bottom 33 and main board 94 removed from bottom 33. FIG. 9 illustrates a partial exploded view of the inside of docking station 10, showing main board 94 attached to bottom 33.

Figure 10:
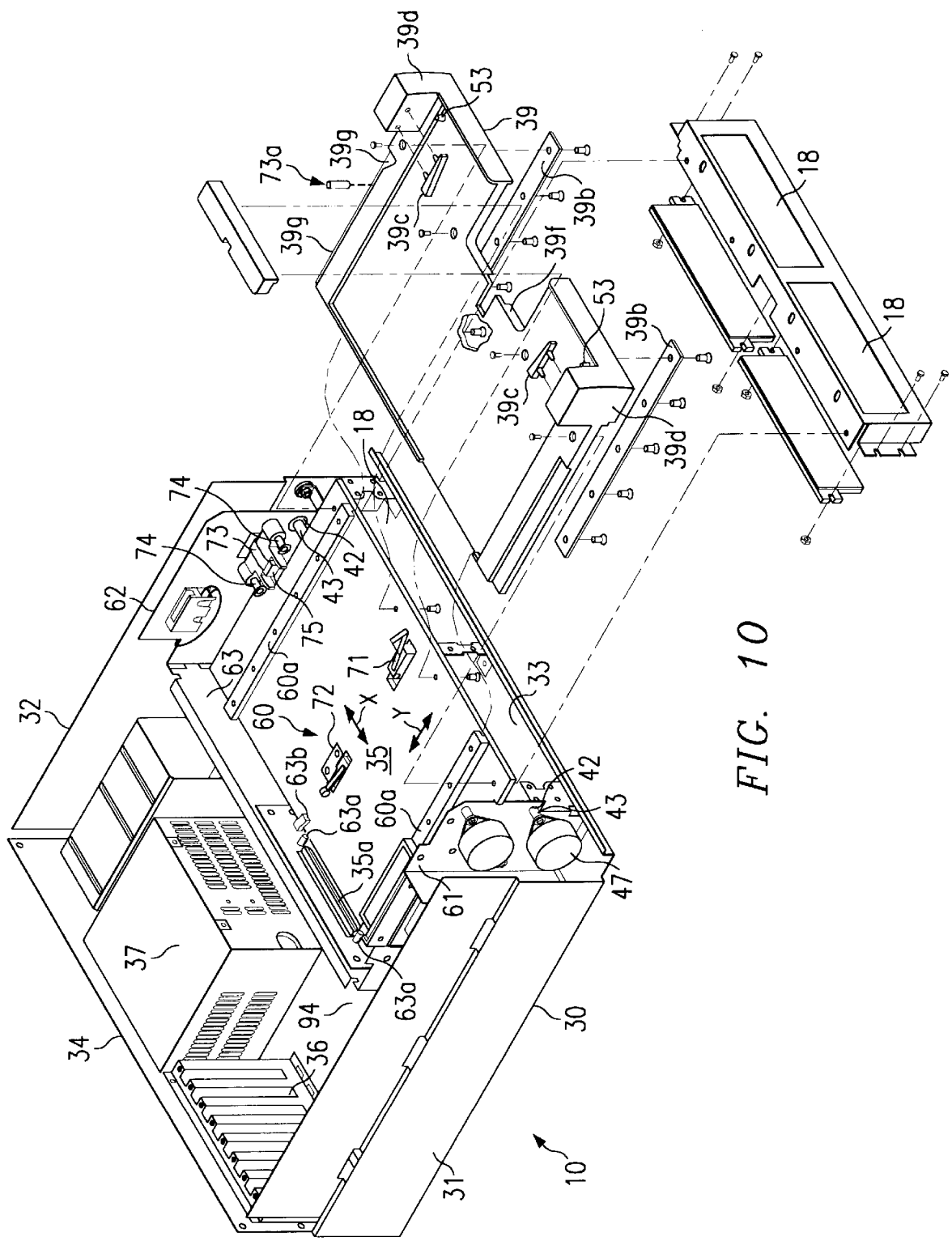
FIG. 10 is a partial exploded view of the docking station of FIG. 1 with the top cover and front cover removed.

Referring to FIG. 10 there is illustrated the docking unit 10, with the top housing cover 10a and front side wall removed, showing the housing 30 with the left side 31, right side 32, back side wall 34 and bottom 33. A tray section 35 in the housing is the active portion to load and unload the portable computer. Behind the tray section 35 there is a section 36 of expansion slots for full size and half size 16 bit 15A card slots expanded ports, power supply section 37 and other parts of the docking station. As stated previously in the space below the tray section, there are bays for putting the hard drives. The tray section 35 includes side walls 61 and 62, back wall 63 mounted to floor 33. A shelf 60 extends between side walls 61 and 62 and back wall 63. A cross shaft 43 extends from left side wall 61 to side 62. This cross shaft 43 is mounted in bearings 42 at the side wall 61 and 62. The system uses two motors. A first motor 47 is connected to the cross shaft 43 for driving a tray 39 in an out of the docking station 10.

As illustrated in FIG. 11, the motor 47 is mounted to a pinion gear 48 which in turn drives an idler cluster gear 49, which in turn drives cluster gear 50 at the drives tray and the cross shaft 43, that in turn drives the tray 39 via the drive gear 51. The tray 39 slides in the direction over shelf 60. The tray 39 includes pins or posts 53 that index or locate the computer 13 during the mating of the connectors. The bottom of the portable computer 13 includes holes 131 that match the pins 53 as shown in FIG. 12. The drive gears 50 and 51 on each end of the shaft 43 mate intimately with intrical racks 39c in the tray structure 50 at the bottom. As shown in FIG. 13 racks 39a that extend in the Y direction engage gears 50 and 51. The tray is confined to a linear motion via guides 39b on the tray 39 that slide under guides 60 a on the shelf. The guides are collinear with the rack access and normal to the cross shaft 43. There are cut outs in the shelf 60 such that the racks 39a at the bottom of the tray 39 will mate with the gears 50 and 51 at each end of the shaft 43. The tray 39 also has side guides 39 on side posts 39d which broad to a narrowing wedges illustrated at opposite ends at the front of the tray. Front and back switches 71 and 72 in openings in the shelf 60 and tray 39 aid in controlling the drive motor 47. The first presence of the portable computer 13 on the tray 39 is indicated by the closing by depression of the front switch 71 which extends through notch 39f in tray 39. When the tray reaches the position of switch 72, the drive motor 47 is slowed down and controlled to aid in connecting the bus connector 13c to a mating bus connector 35a in rear wall 63 by stepping the motor 47 so that the rear bus pins of the connector 13c match with the bus sockets of connector 35a of the docking station 10. At the rear wall 63 of the tray section 35, on either side of the bus pin connector 35a, there are pins 63 that are spring loaded and locked in the extended position that match with aligned holes 13m in the personal computer 13 on either of the bus connector 13c. As the computer 13 is driven by the tray 39, the pins 63a extend into these apertures 13m. A spring loaded extension 63b from the rear wall 63 when it touches the rear of the computer PC 13 releases the locked pins 63a and the drive motor 47 is stepped according to the position of the drive tray to make the rear connector 35a make to the bus pins 13c of the computer PC 13. Stop sensors aid in starting, running and stopping the drive chain motor 47 during the docking operation.

Figure 7:
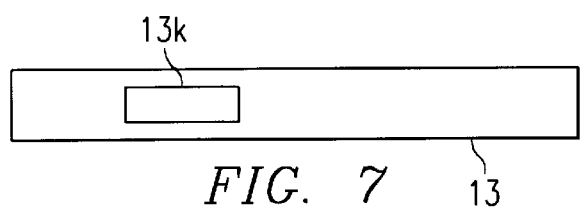
FIG. 7 is a right side view of the portable computer illustrating the mouse connector.

Also molded on the tray 39 is a cam edge 39g with a notch that extends in the X-axis direction toward the center of the tray 39. A spring mounted mouse connector mechanism 73 is mounted on the side wall 62 of the tray section 35. The mechanism 73 includes a cam follower or pin 73a that extends from spring mounted connector mechanism 73. The mechanism 73 is mounted along a pair of shafts 74, such that as the tray moves in the housing the cam follower 73a follows the edge 39g of the tray and when it reaches the portion of the X-axis notch that extends inwardly the spring operation of the connector mechanism to extend laterally and move the connector 75 for the mouse into the side of the computer PC 13 at connector 13k in FIG. 7.

Figure 14:
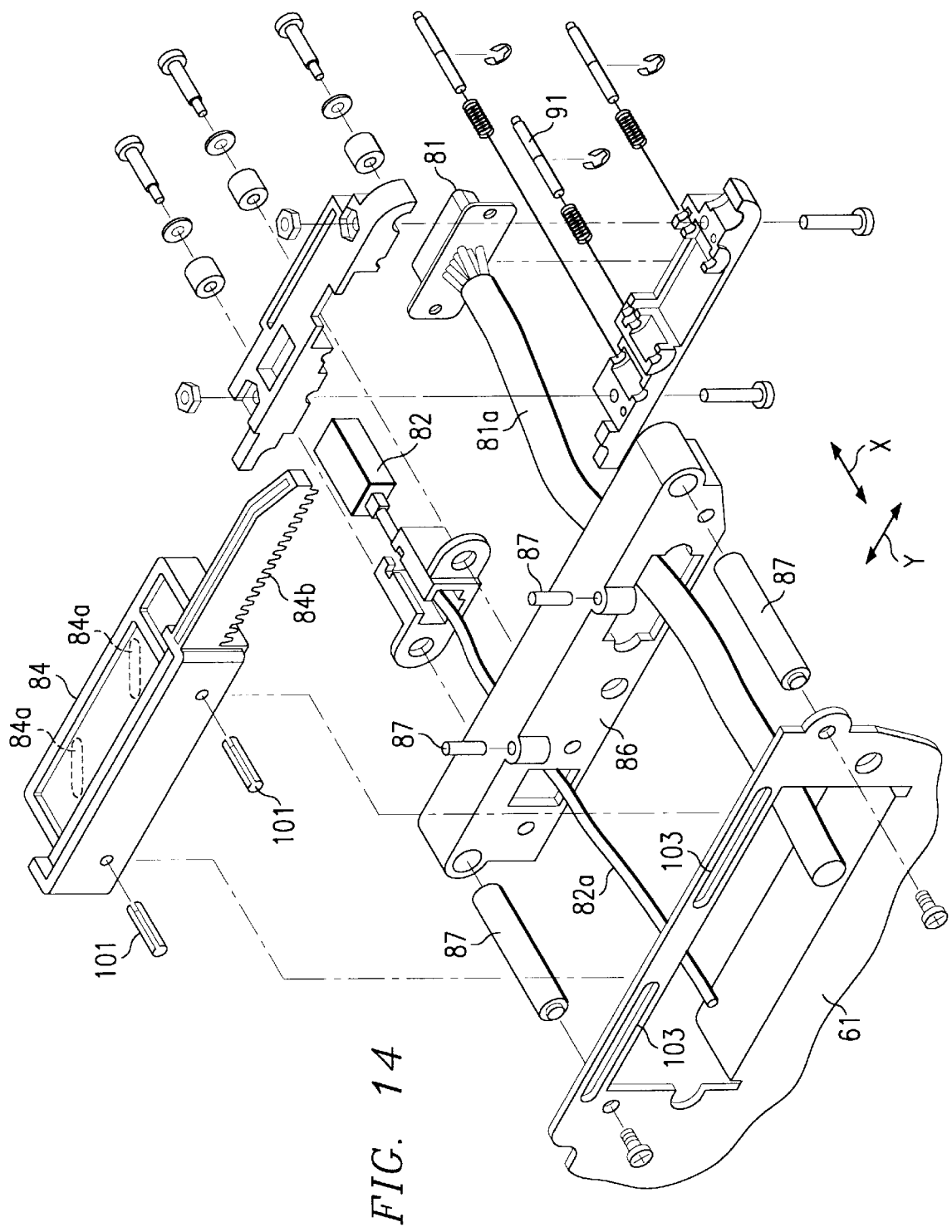
FIG. 14 is an exploded view of the X-axis drive connector mechanisms of the docking station of FIG. 1.
Figure 15:
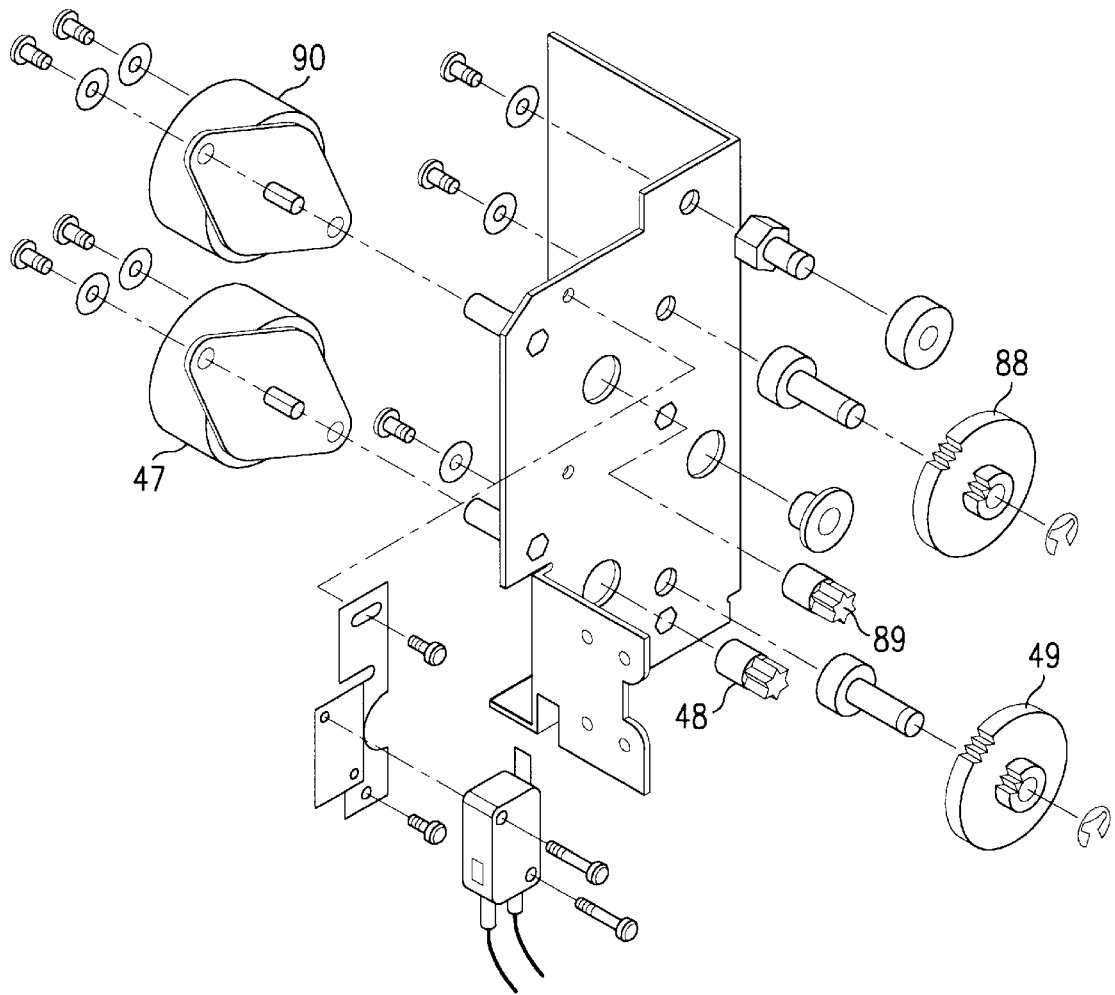
FIG. 15 is an exploded view of the drive motors and mounting of the docking station of FIG. 1.

In addition to a Y-axis drive, the docking station is equipped with a side or X-axis drive capability from which to make connections with many side connectors and in particular the connectors on the portable computing device 13. In particular these side connectors are the modem connector 13e and VGA connector 13g on the left side of the portable computing device 13. Referring to FIG. 14 horizontal moving connector holder 46 movable in the X-axis direction is mounted on two rods 87 which are rigidly attached to side wall 61 of section 35. The modem connector 82 and VGA connector 81 shown are mounted to the holder 16 and side with the holder 16. The cables 82a and 81a are coupled to the connector 82 and 81 at one end and to the modem and VGA connectors on the back and side of the station 10 as seen in FIG. 4. A rack cam slate 84 is mounted to this laterally moving holder via a pins 87 which slide in inclined slots or groves 84a mounted in the lower surface of the traversing rack/cam plate 24. The rack/cam plate includes at one end thereof a rack 84b. This rack/cam plate 84 is mated at rack 84b to a cluster gear 88, spur gear 89 which is driven by the second drive motor 9u as shown in FIG. 15. The result in linear motion from the rack cam plate 84 being the driven by the cluster gear 88 moves the cam plate 84 in the Y-axis direction also parallel to the tray 39 mechanism. The inclined slots 84a in the rack/cam plate 24 convert this via pins 87 to X-axis motion to move holder 86 to plug and unplug the side connectors 13e and 13g on a computer 13 spring loaded guide pin 91 is aligned with holder 13j in portable PC 13 shown in FIG. 6. Thus, this docking device automatically connects up, fully automatic, in biactual connector directions.

In operation, drive motor 47 first drives in the Y-axis direction to mate connector halves 35a and 13c with the rear connector and connector halves 13k and 74 and then following thereafter the other motor 90 is energized which then drives the side connectors 81 and 82. When the unit is to be disconnected and the computer is to be ejected, first the side access connectors 81 and 82 are pulled back and then the drive motor 47 drives the tray out with the computer 13. Where mating connectors are described one of the connectors is a connector half that is either male or female while the other connector is a mating connector half of female or male respectively.

To remove portable computer 13 from docking station 10, docking station user 20 depresses load/eject switch or button 16 or double click on the Super Shutdown ICON on the lower left-hand corner of windows (if programmed/setup appropriately). The internal motor-driven platforms and connector mating mechanisms disconnect all necessary cabling, and intelligent software automatically saves all open files (if enabled), closes all applications (if enabled) and ejects the portable computer much like a video tape is ejected from a video tape player. If the docking station is protected against unauthorized removal by an optional security switch 96, as illustrated in FIG. 2, the security switch must be unlocked (if previously locked) to enable the load/eject switch.

Figure 16:
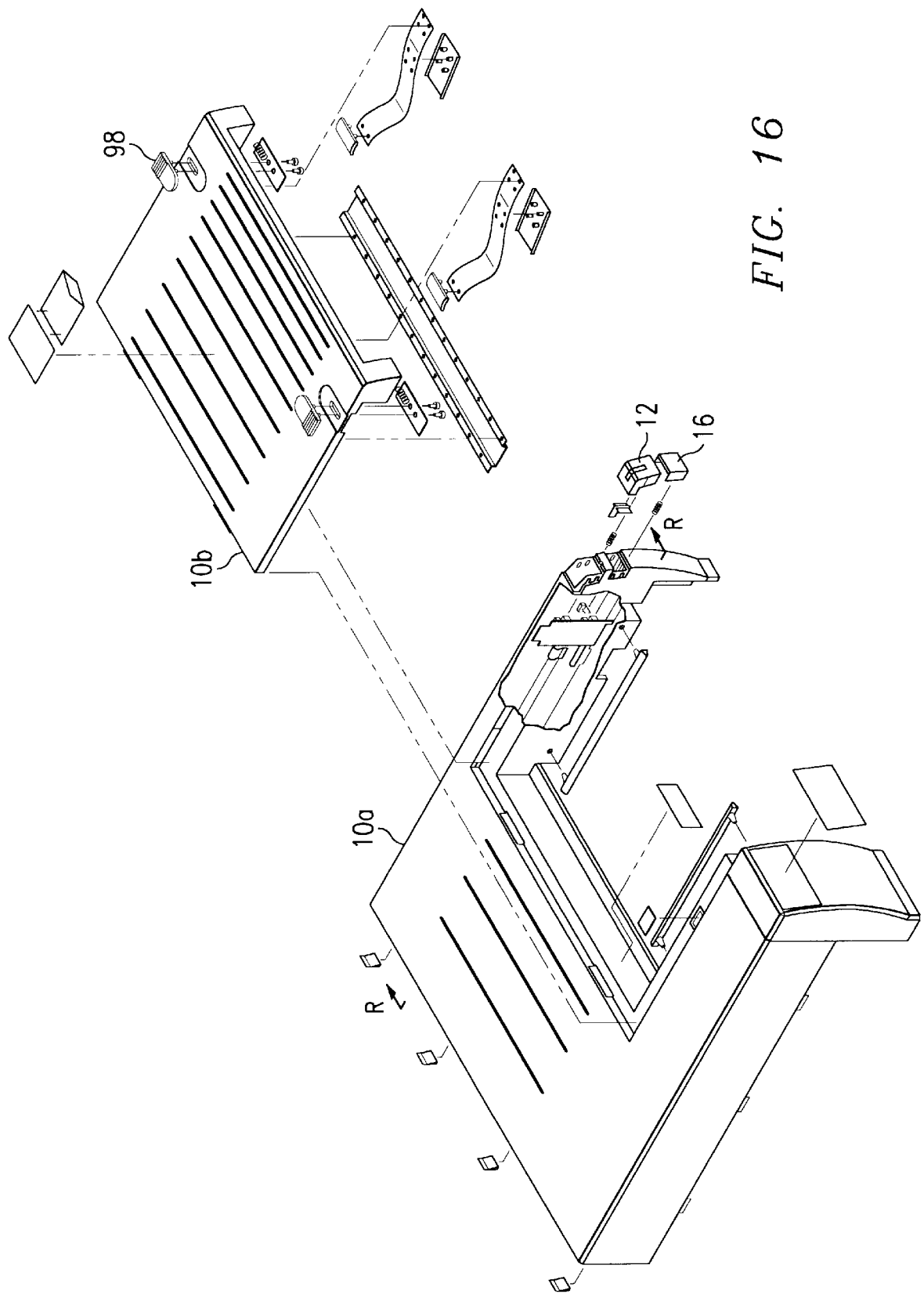
FIG. 16 is an exploded view of the top cover of the docking station of FIG. 1.
Figure 17:
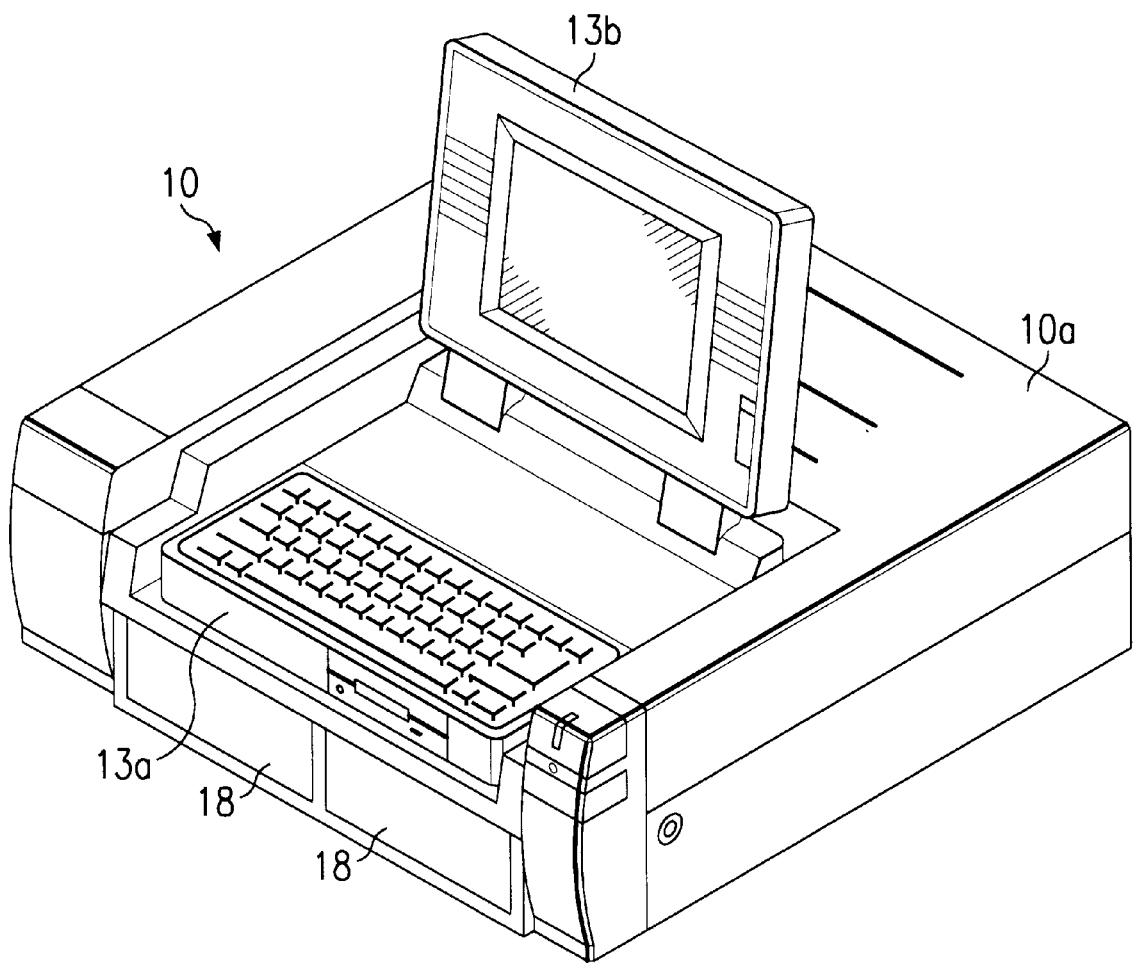
FIG. 17 is a front perexecutive view sketch of the docking station in accordance with another embodiment of the present invention.

With the docking station in a horizontal position, the portable computer can be opened to permit using the portable computer's internal display and keyboard (e.g. for running diagnostics). Power to docking station 10 is turned off by pressing standby/on power key and indicator 12 if at DOS or single clicking on Super Shutdown icon and selecting "Exit Windows and Suspend" (if enabled). Next, two top lid access slide latches 98 on the removable portion 10b of top housing cover 10a, illustrated in FIGS. 2 and 16, are slid inward. Removable portion 10b is removed from top housing cover 10a and set aside. Keyboard 14 and monitor 15 are then disconnected from the rear of the docking station. The portable computer may now be opened up, as illustrated in FIG. 17. Standby/on power key and indicator 12 is pressed to turn power on to the docking station system (the Standby/On LED should glow, green in the present case). There are no special configuration setups that need to be performed. The intelligence of the docking system will detect if a monitor is present and automatically display on the CRT. If no CRT is attached, the system defaults to the default setting configured in the portable computer setup program (LCD only, SIMUL or CRT). The portable keyboard and internal display are now ready for use.

Figure 18:
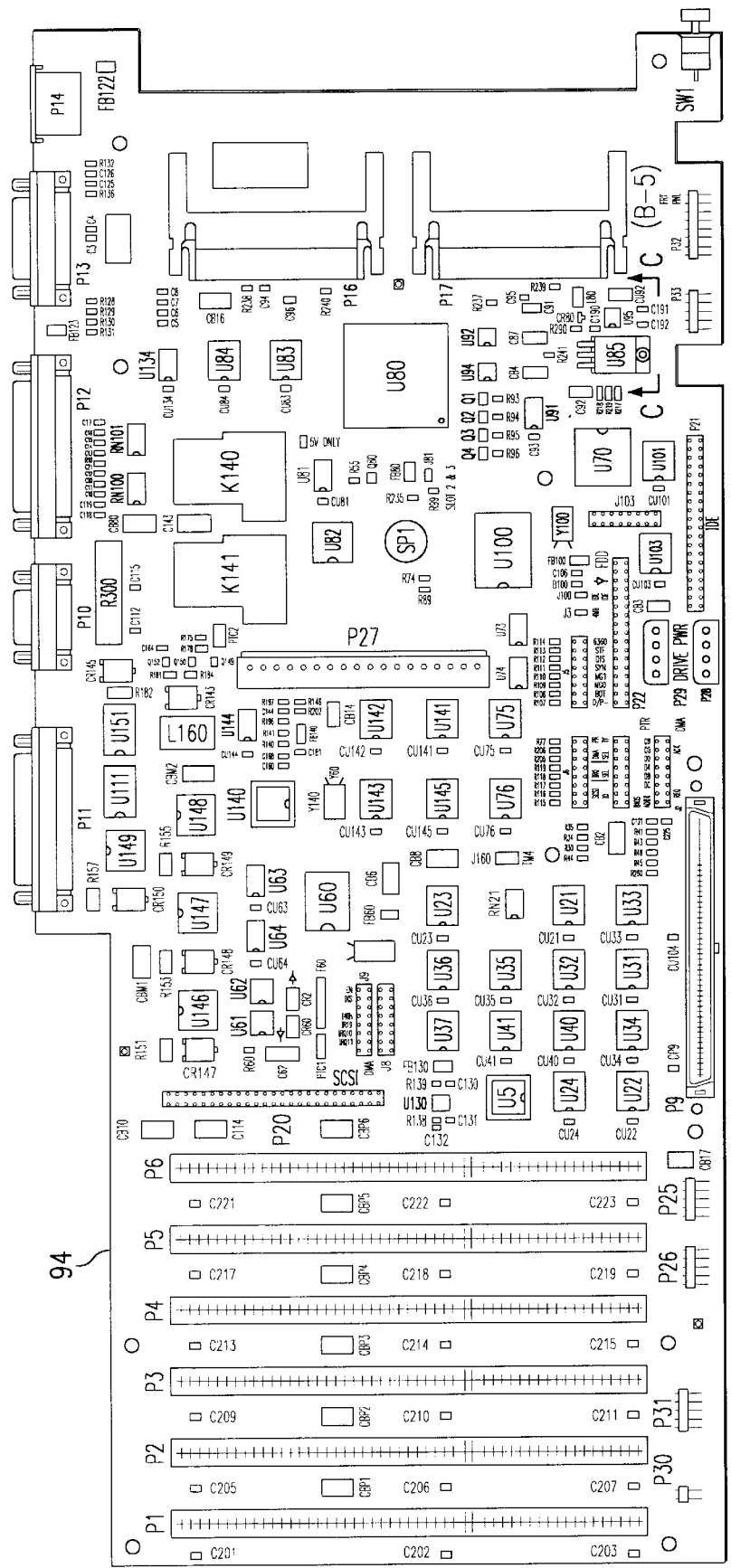
FIG. 18 is a top plan view of main board 94.
Figure 19:
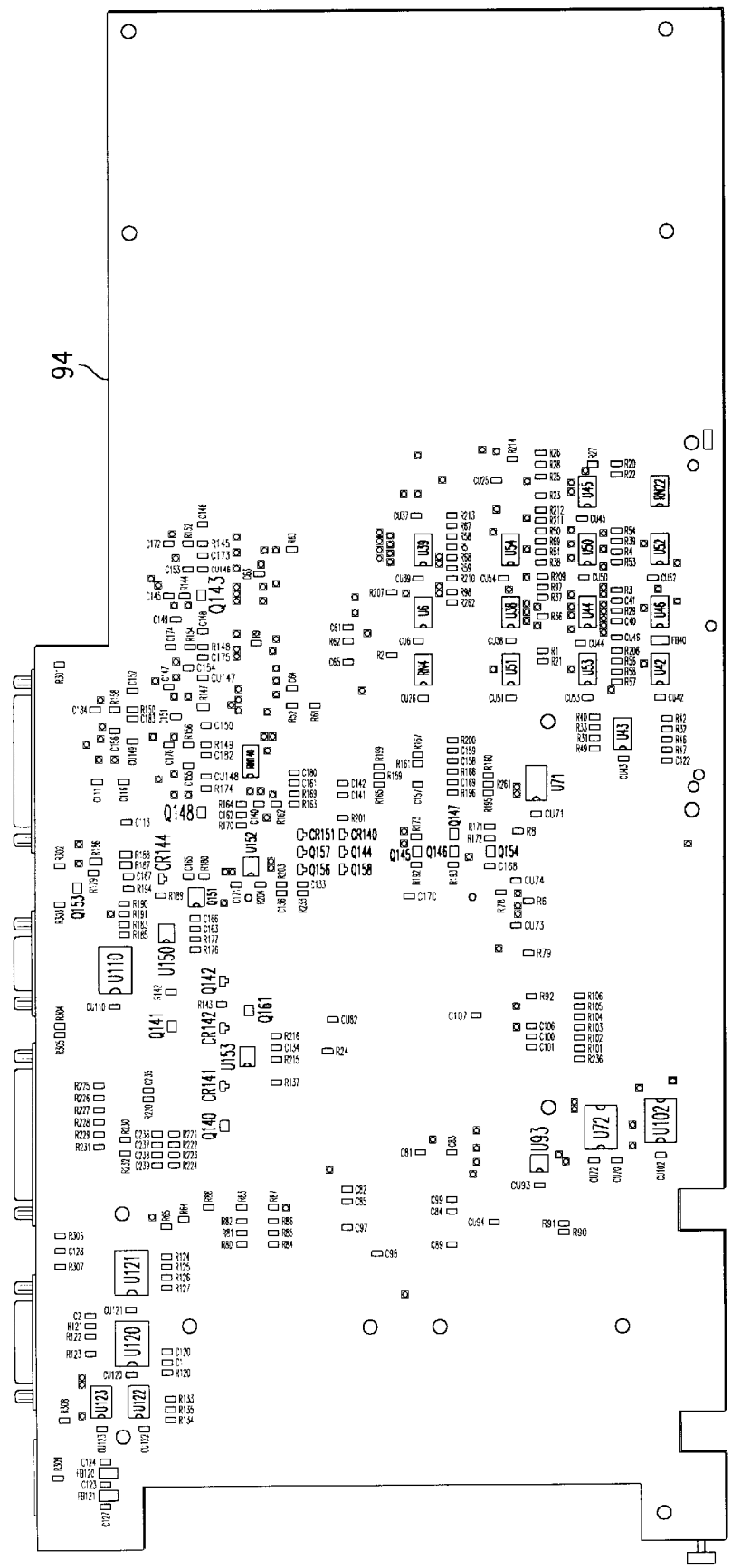
FIG. 19 is a bottom plan view of main board 94.
Figure 21A:
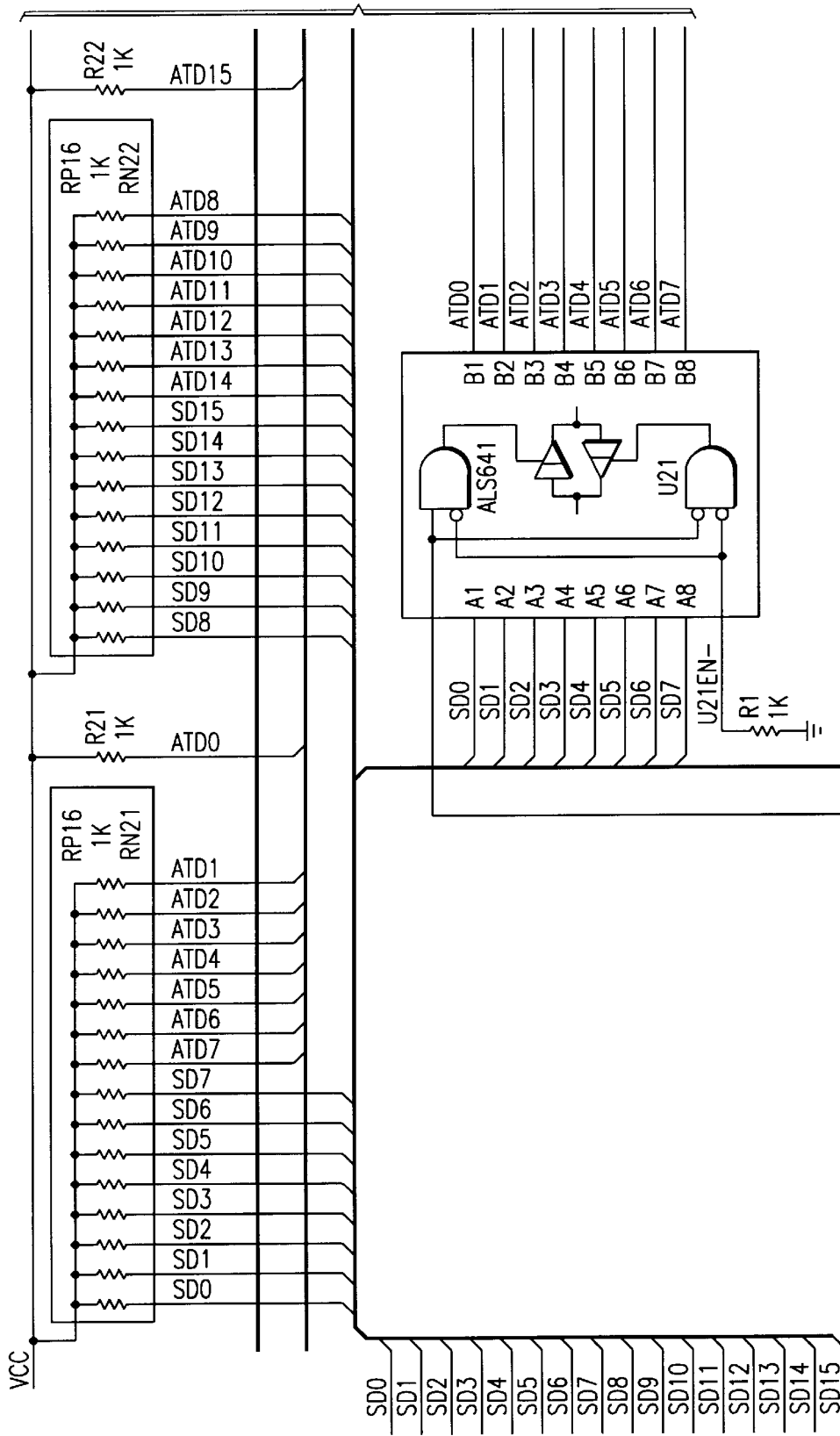
Figure 21B:
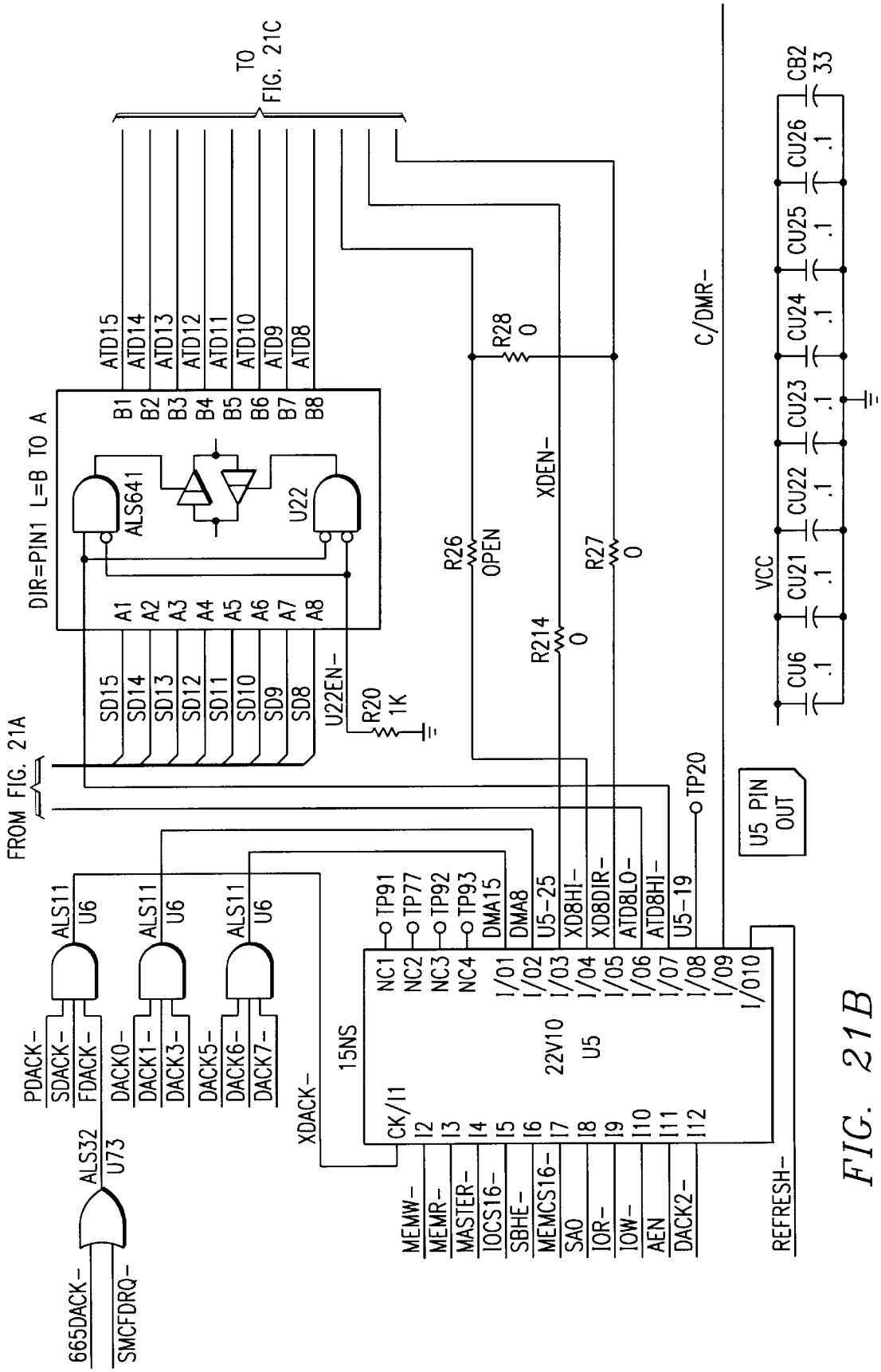
Figure 21C:
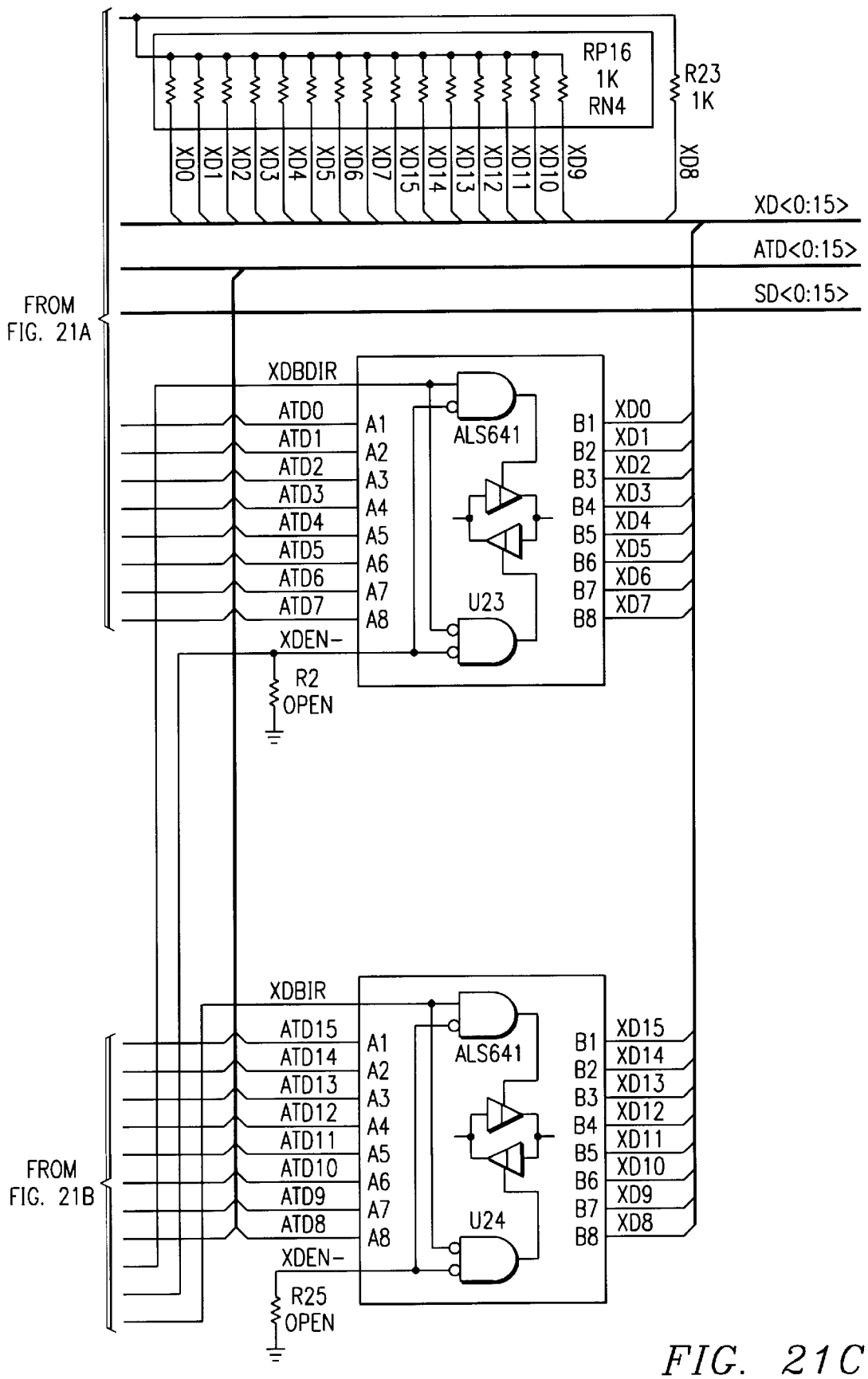
Figure 22B:
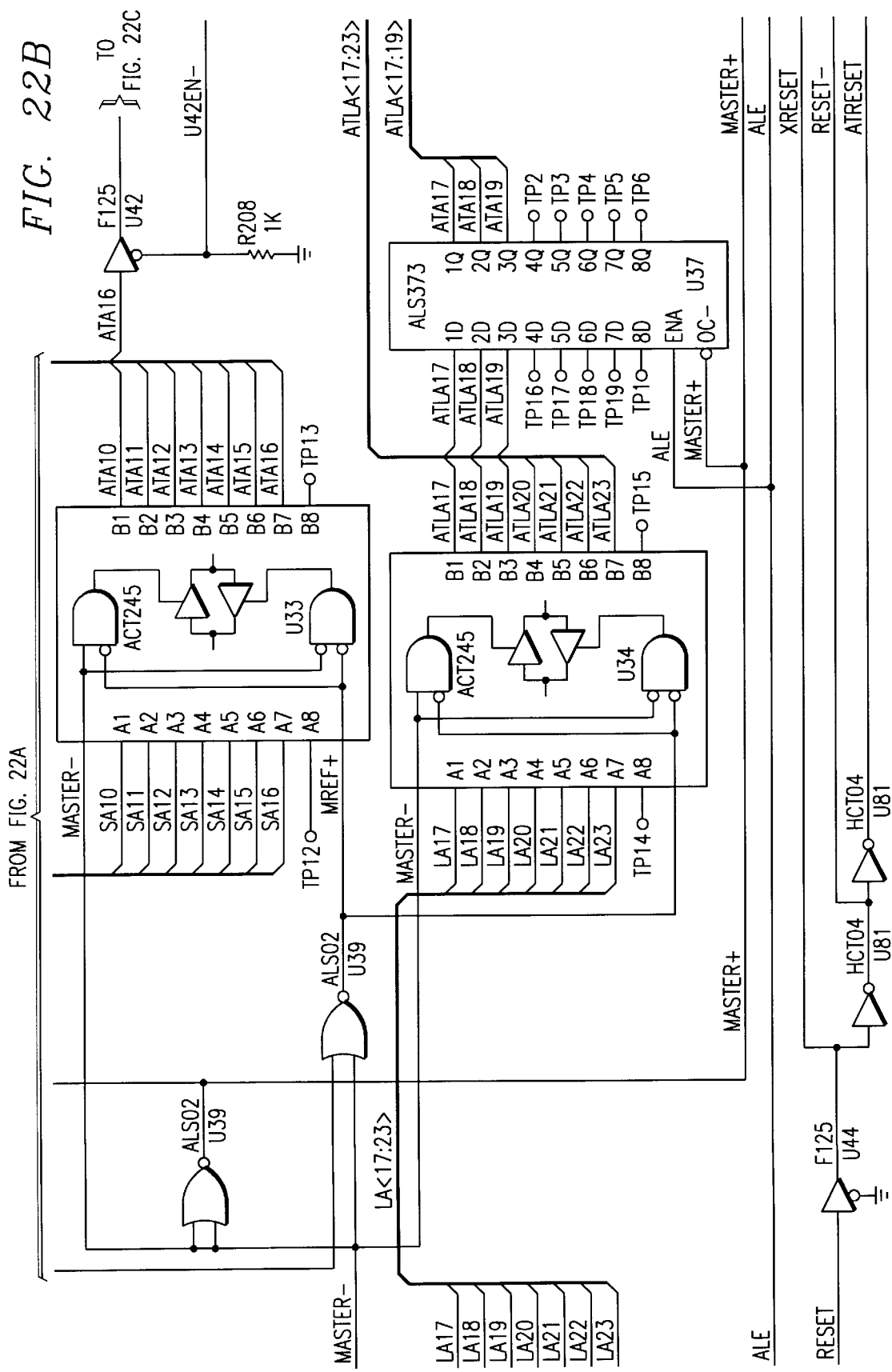
Figure 22C:
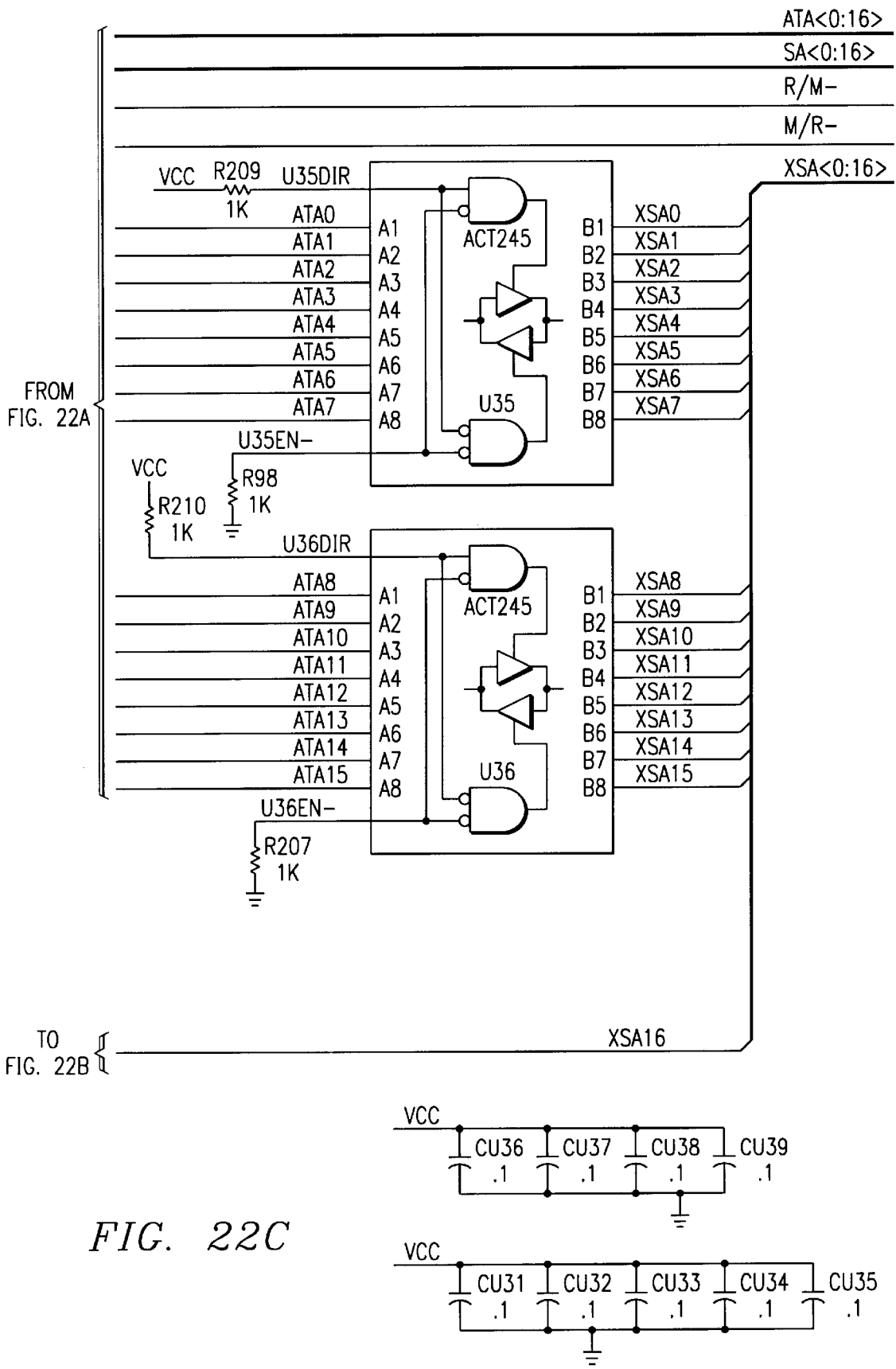
Figure 23A:
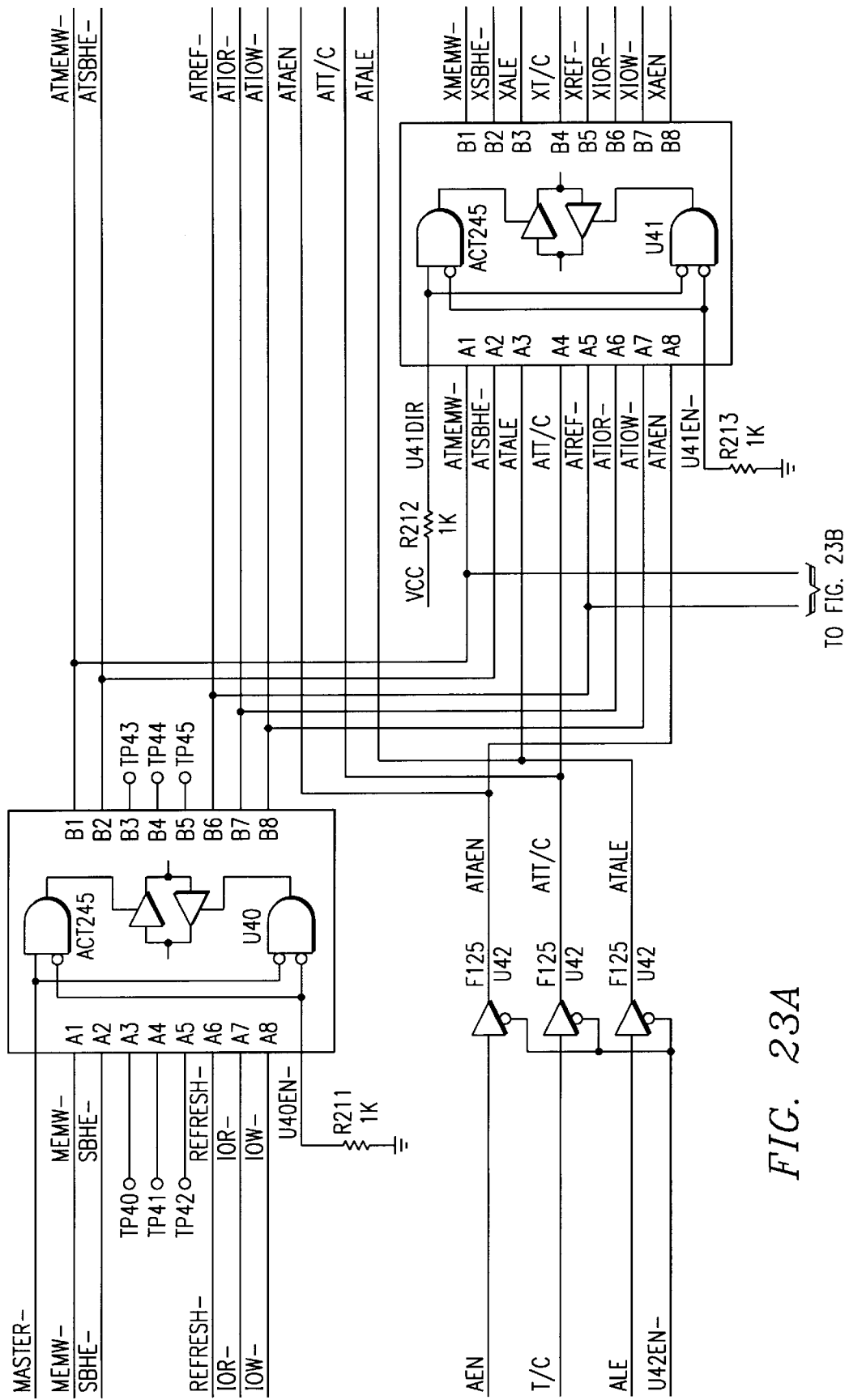
Figure 23B:
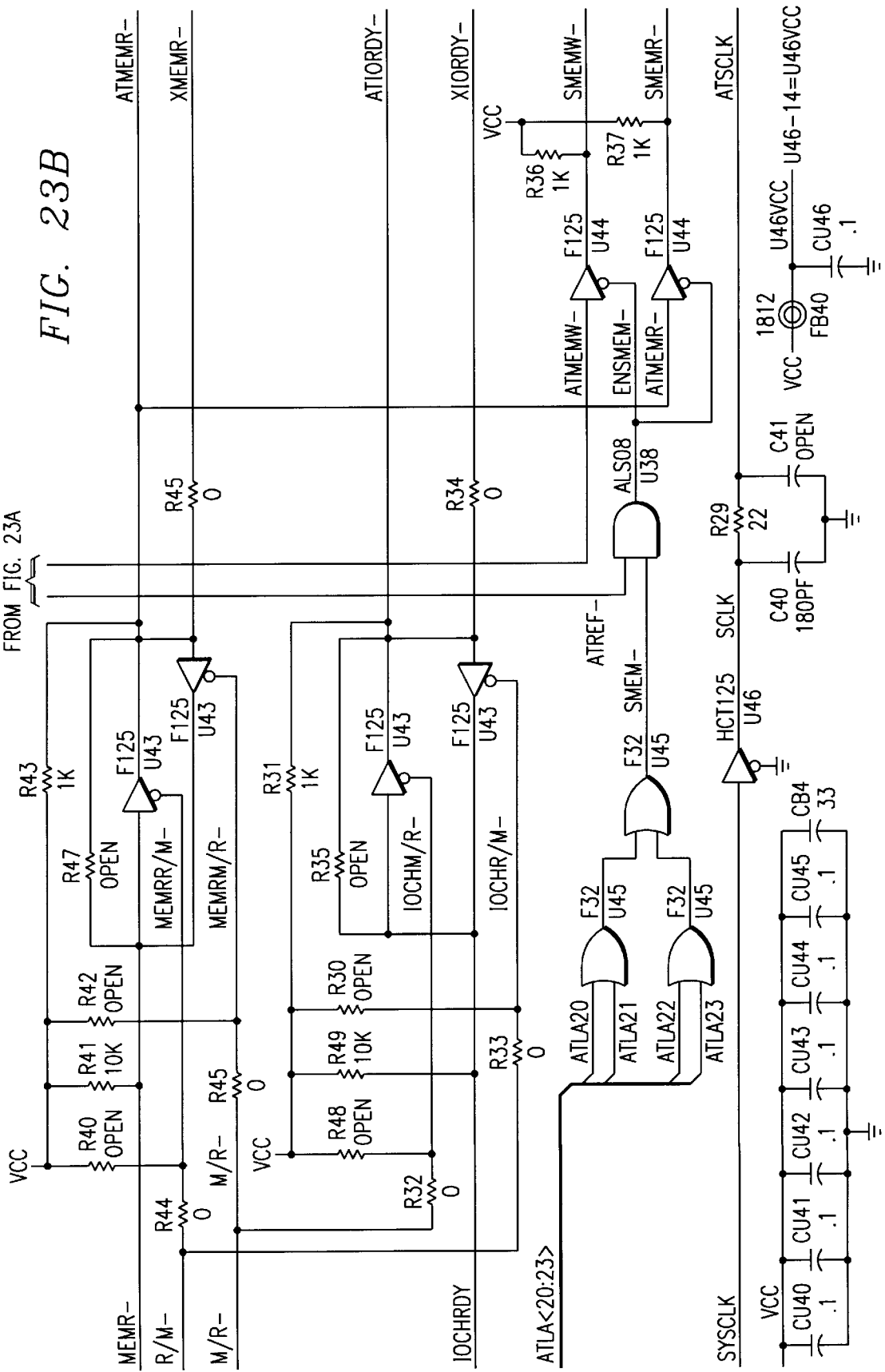
Figure 24:
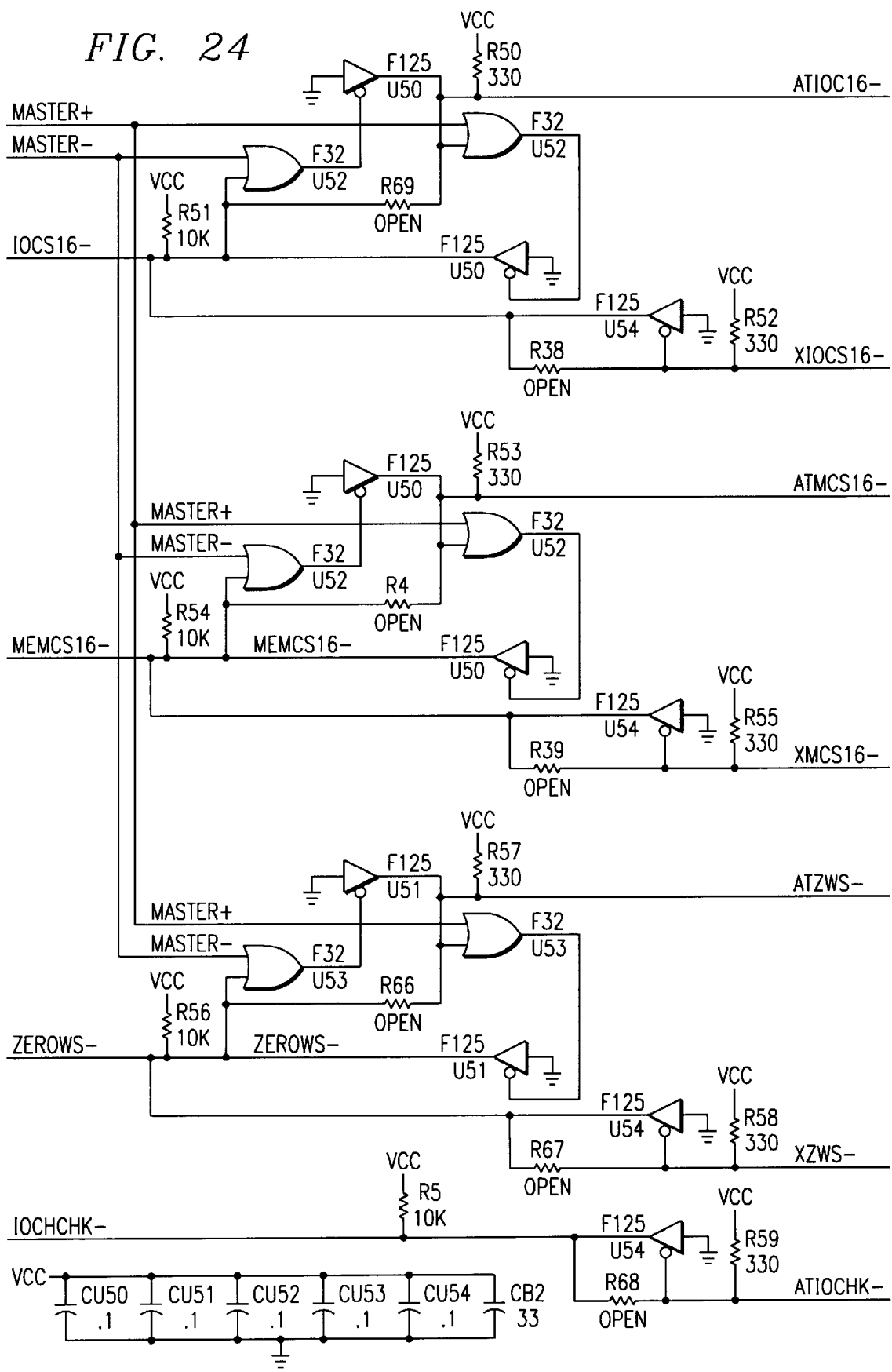
Figure 25A:
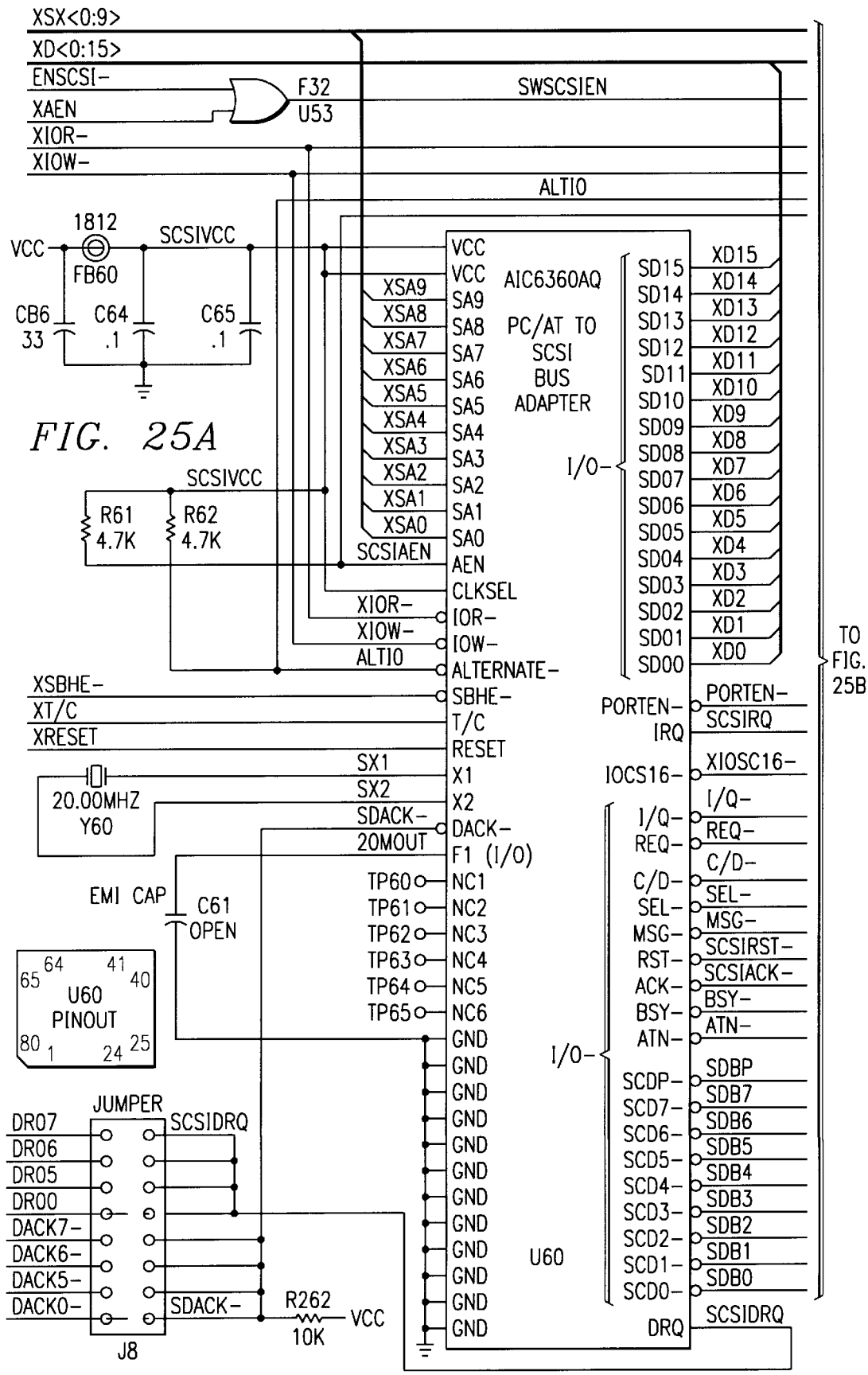
Figure 25B:
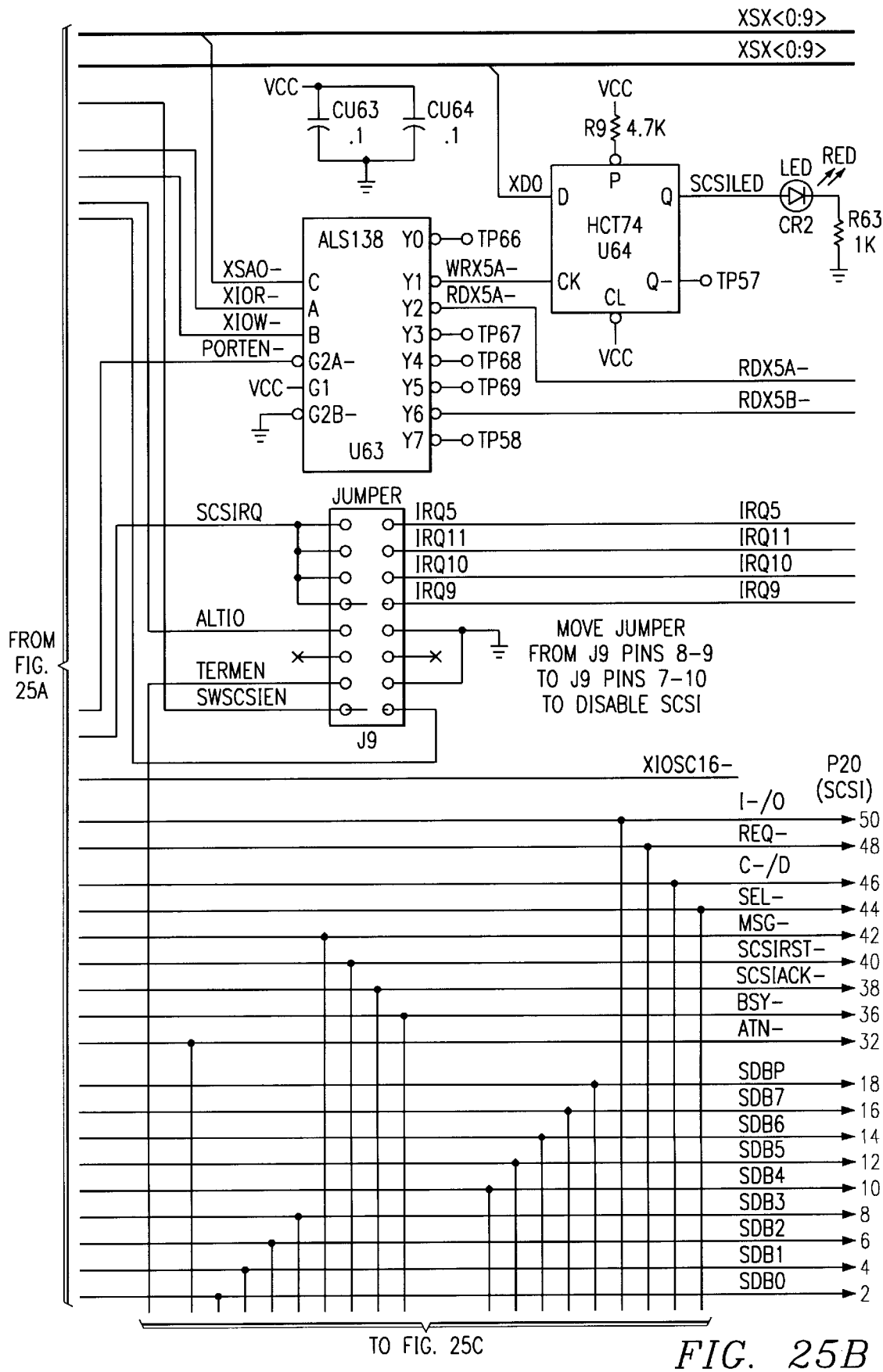
Figure 25C:
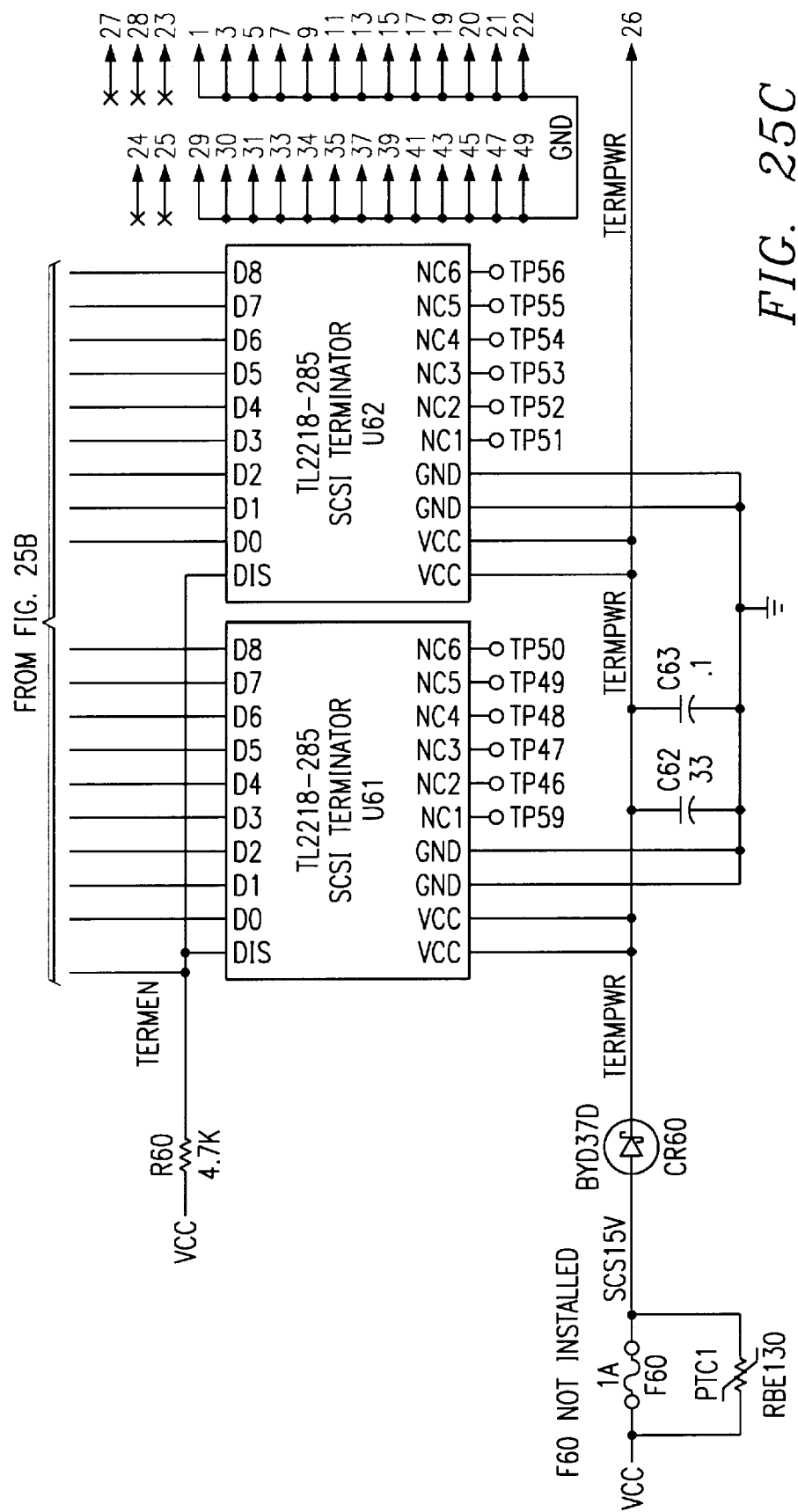
Figure 26A:
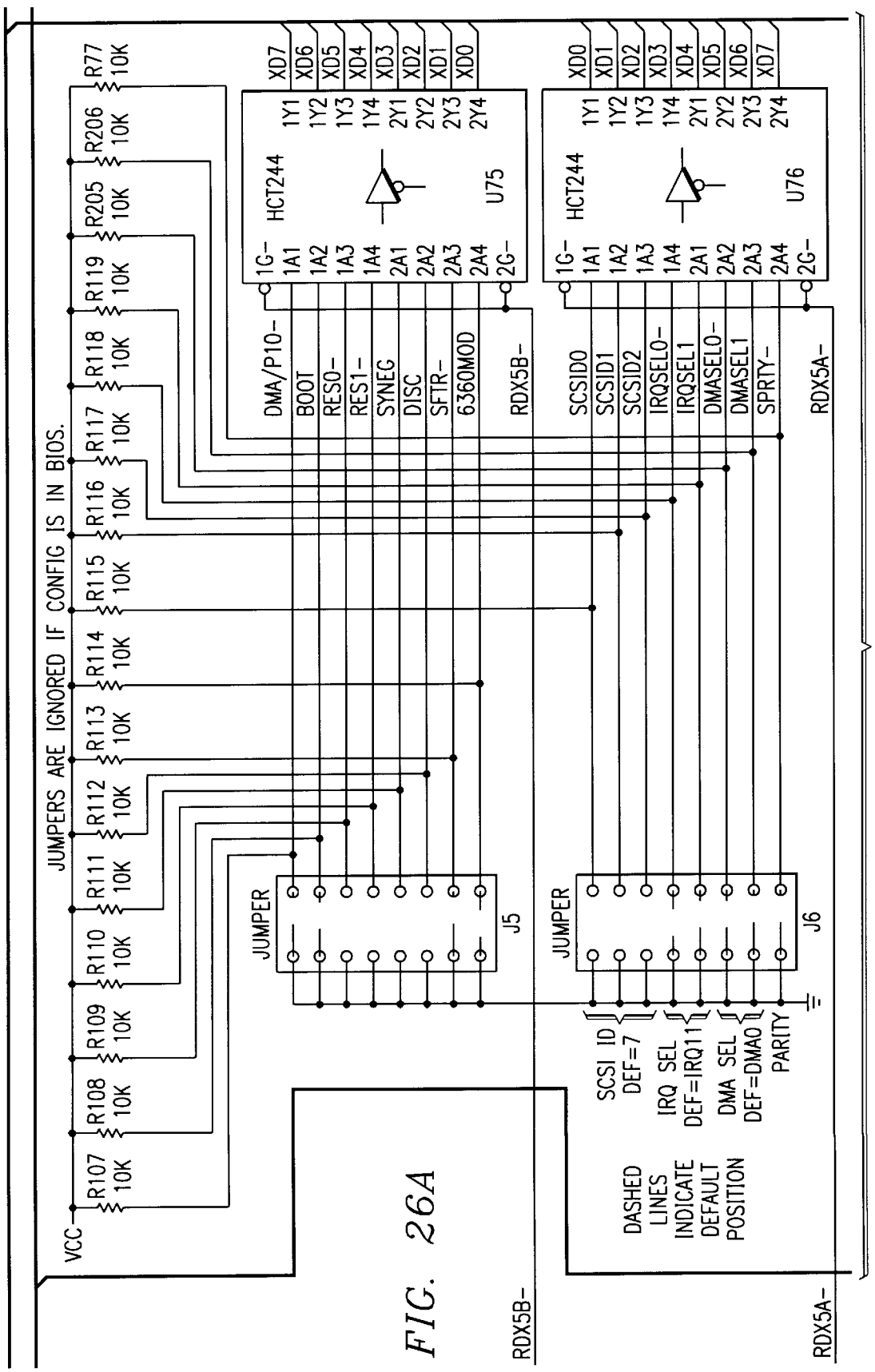
Figure 26B:
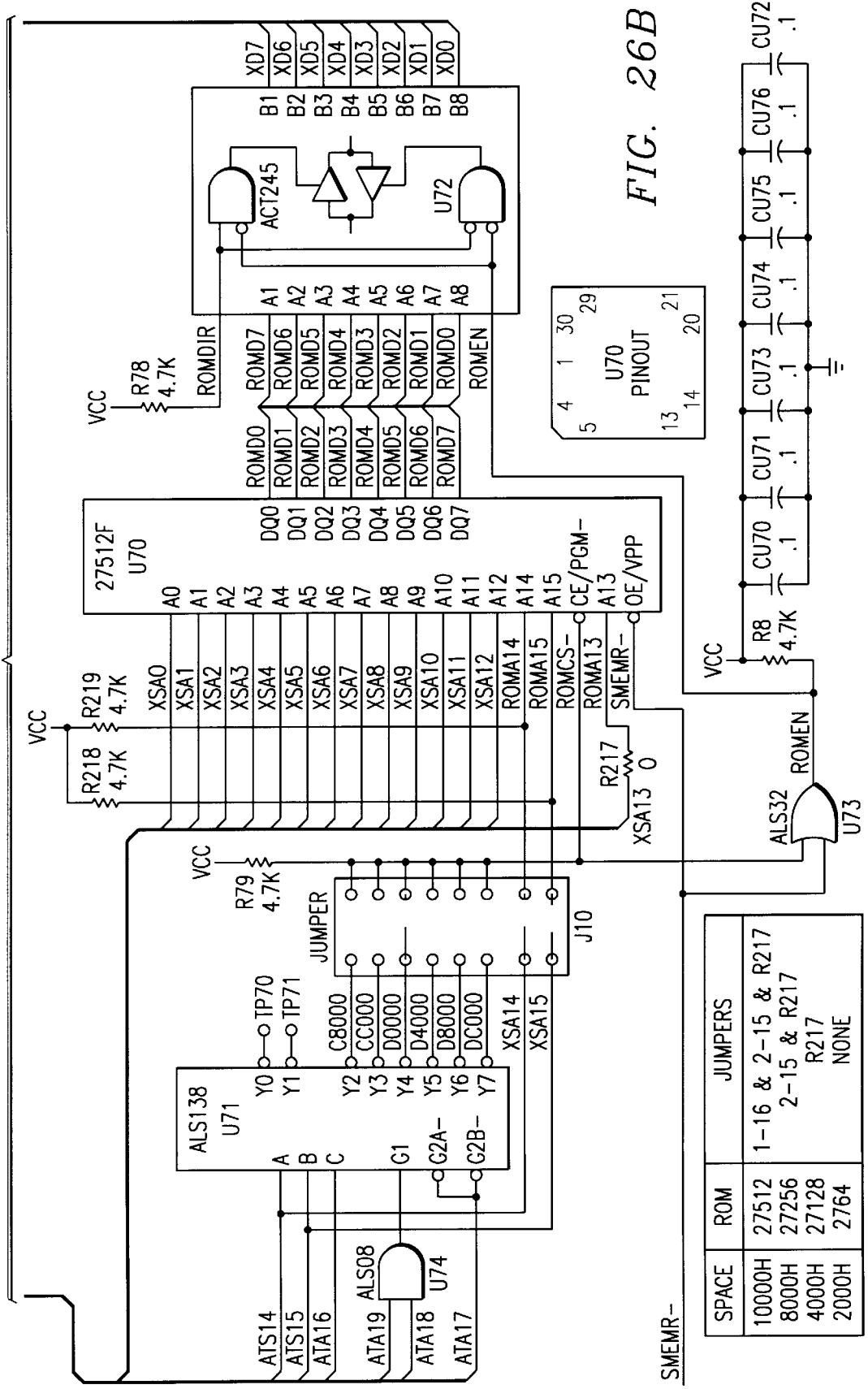
Figure 27A:
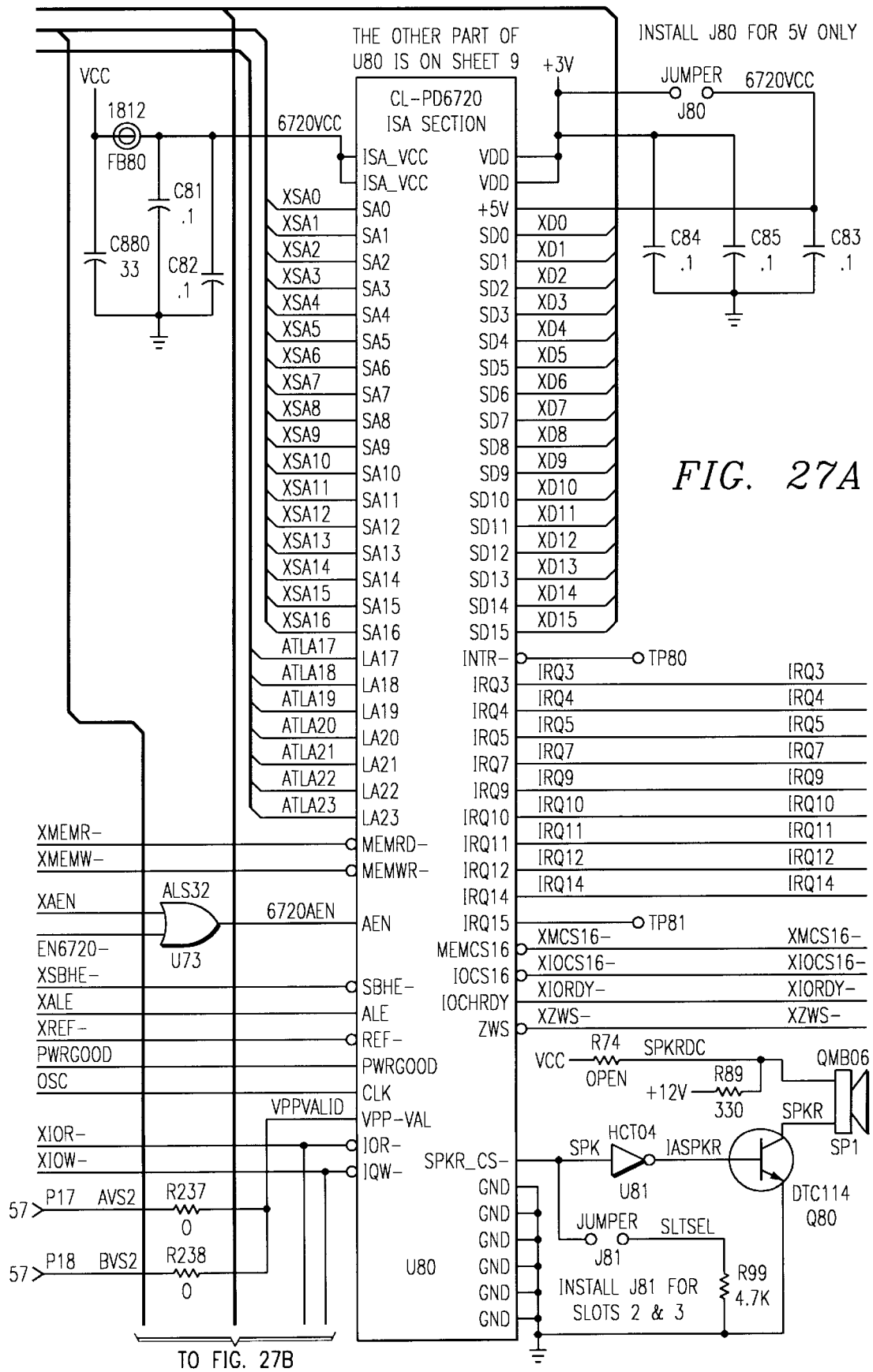
Figure 27B:
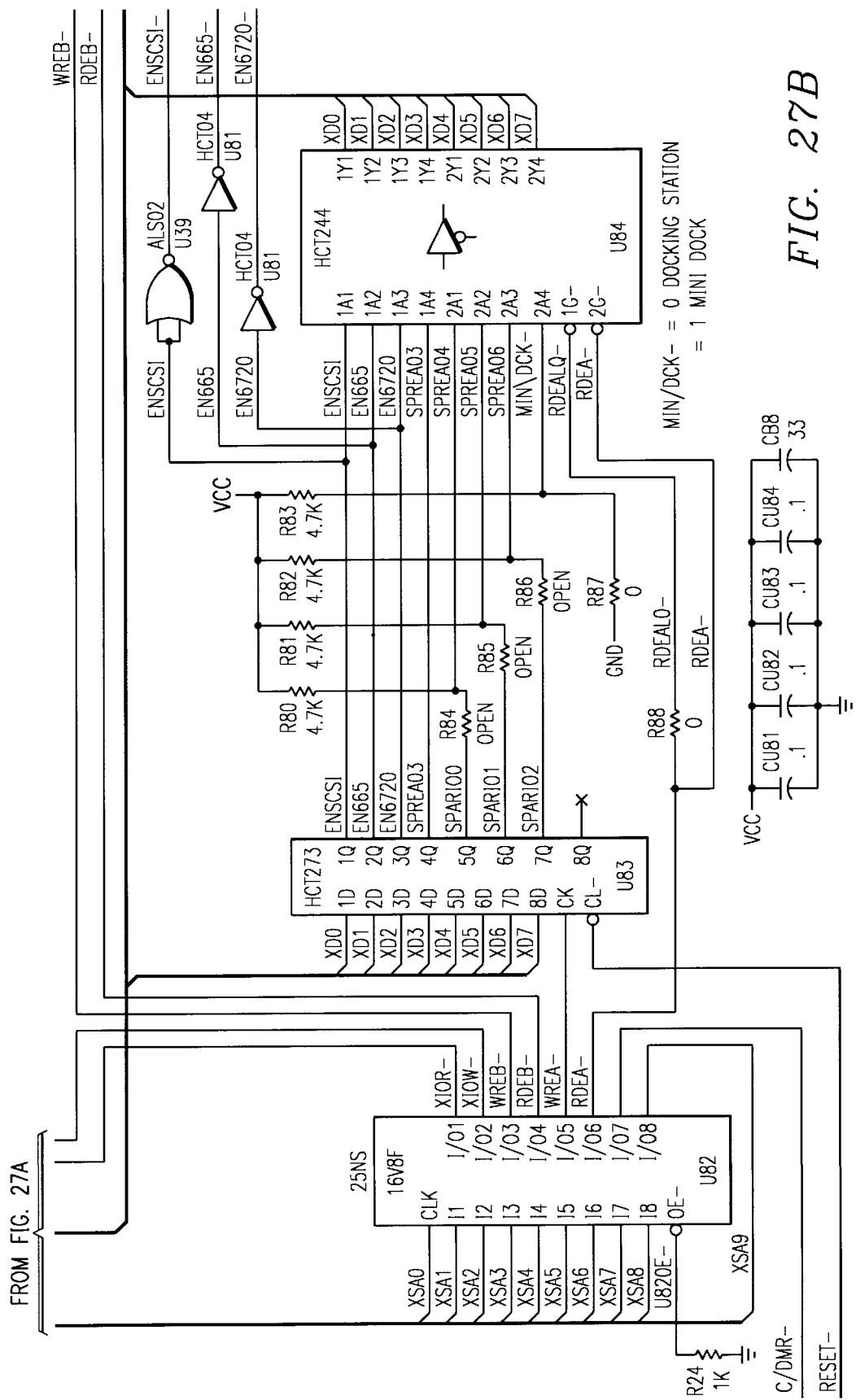
Figure 28A:
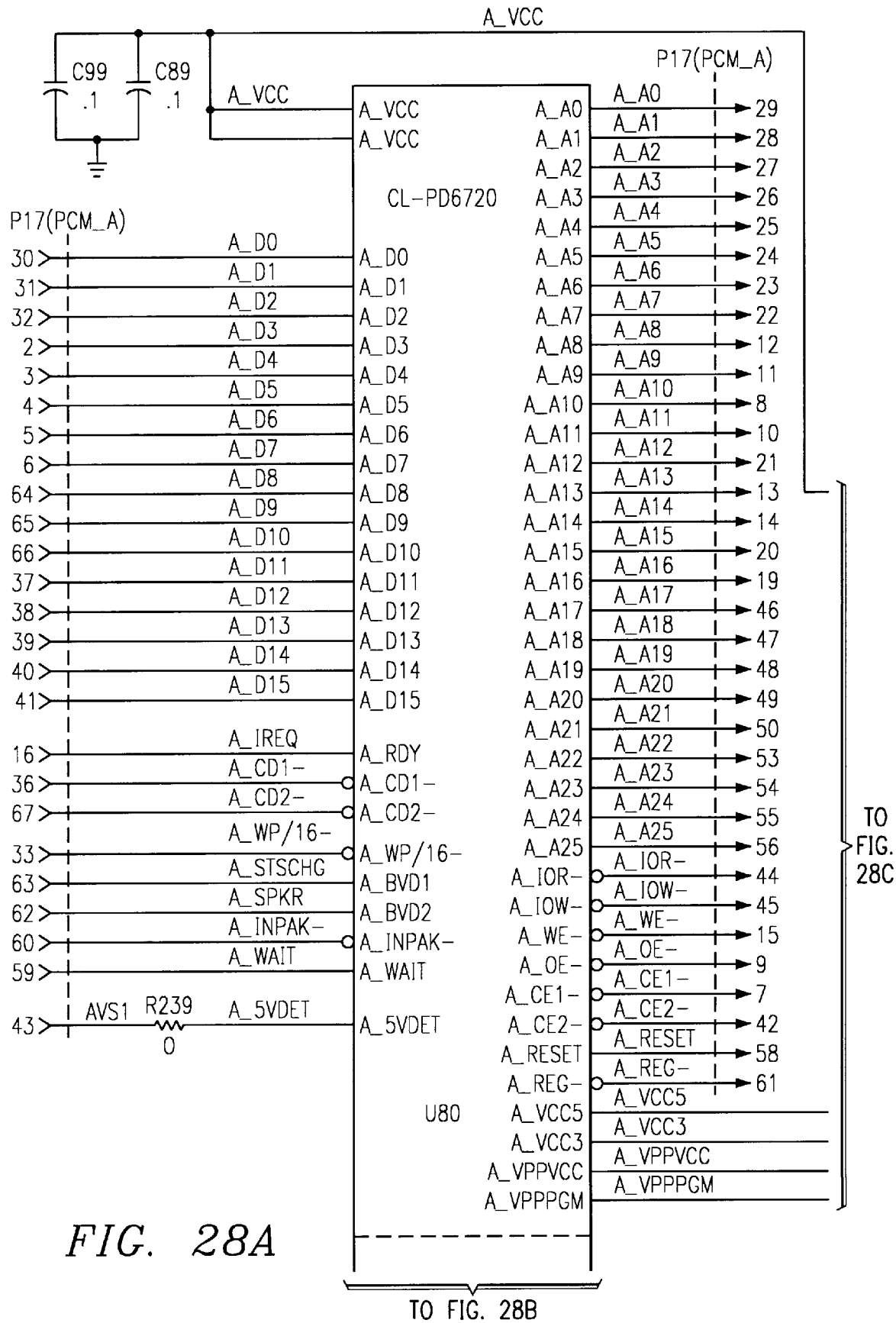
Figure 28B:
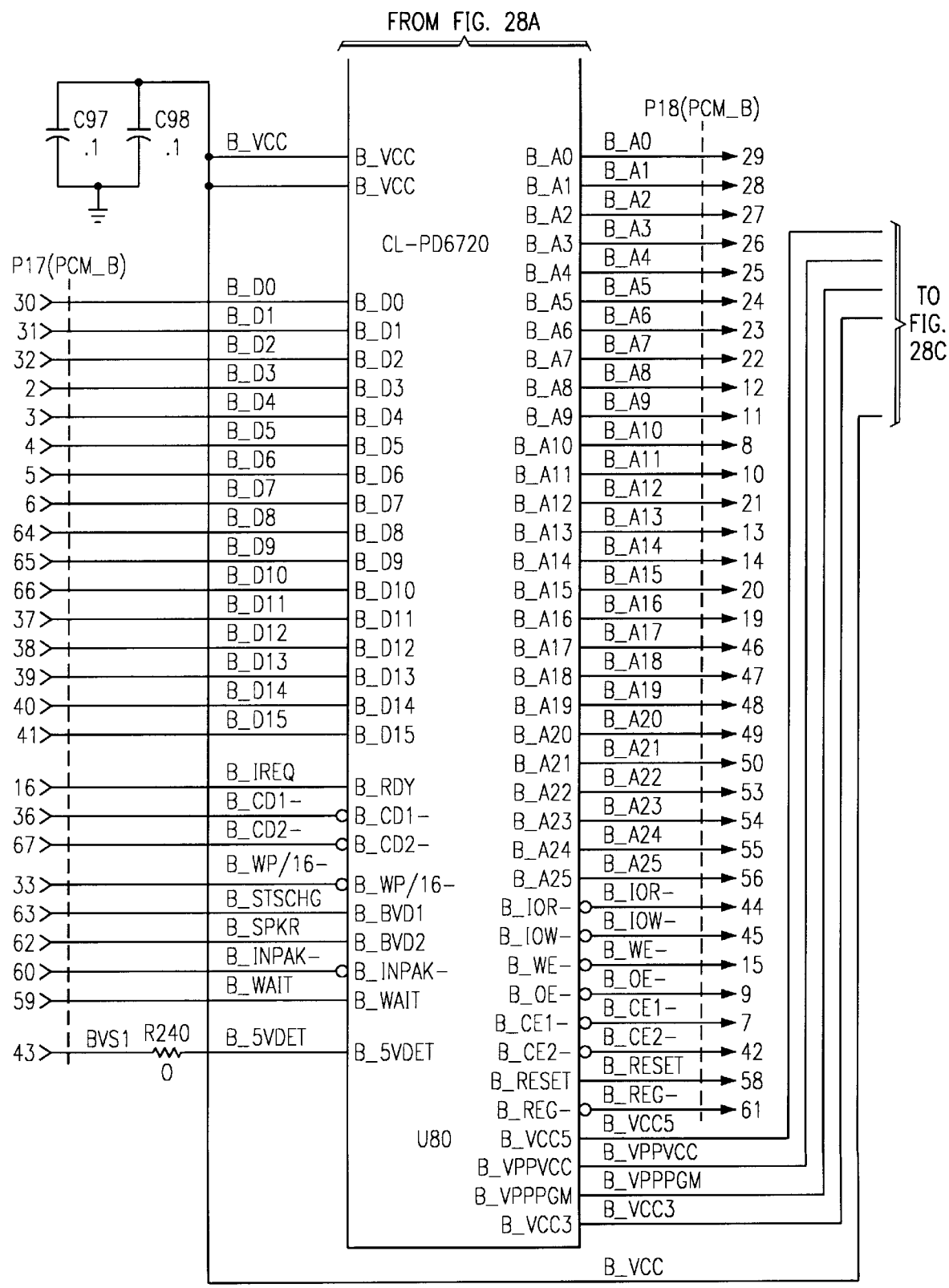
Figure 28C:
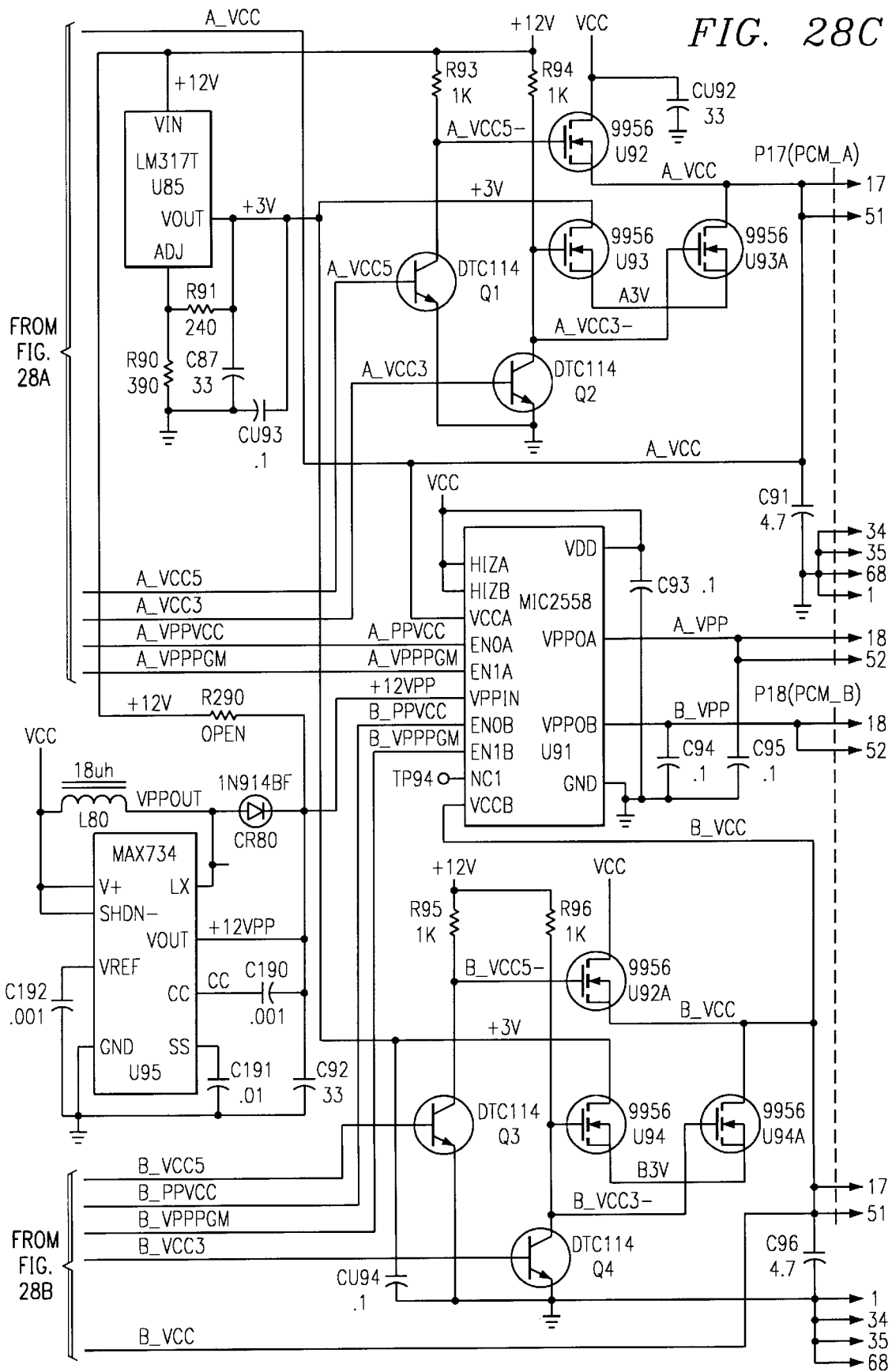
Figure 29A:
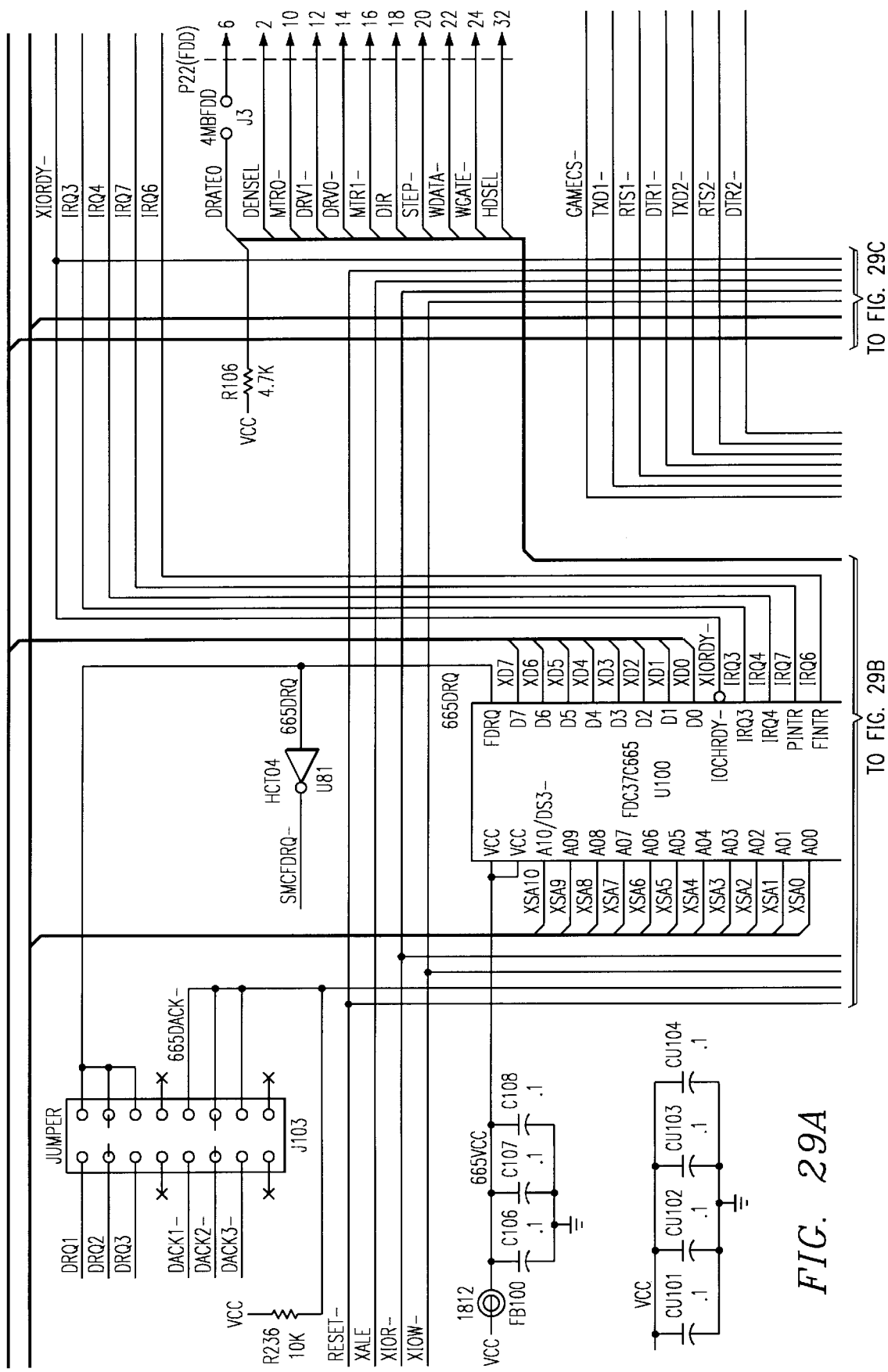
Figure 29B:
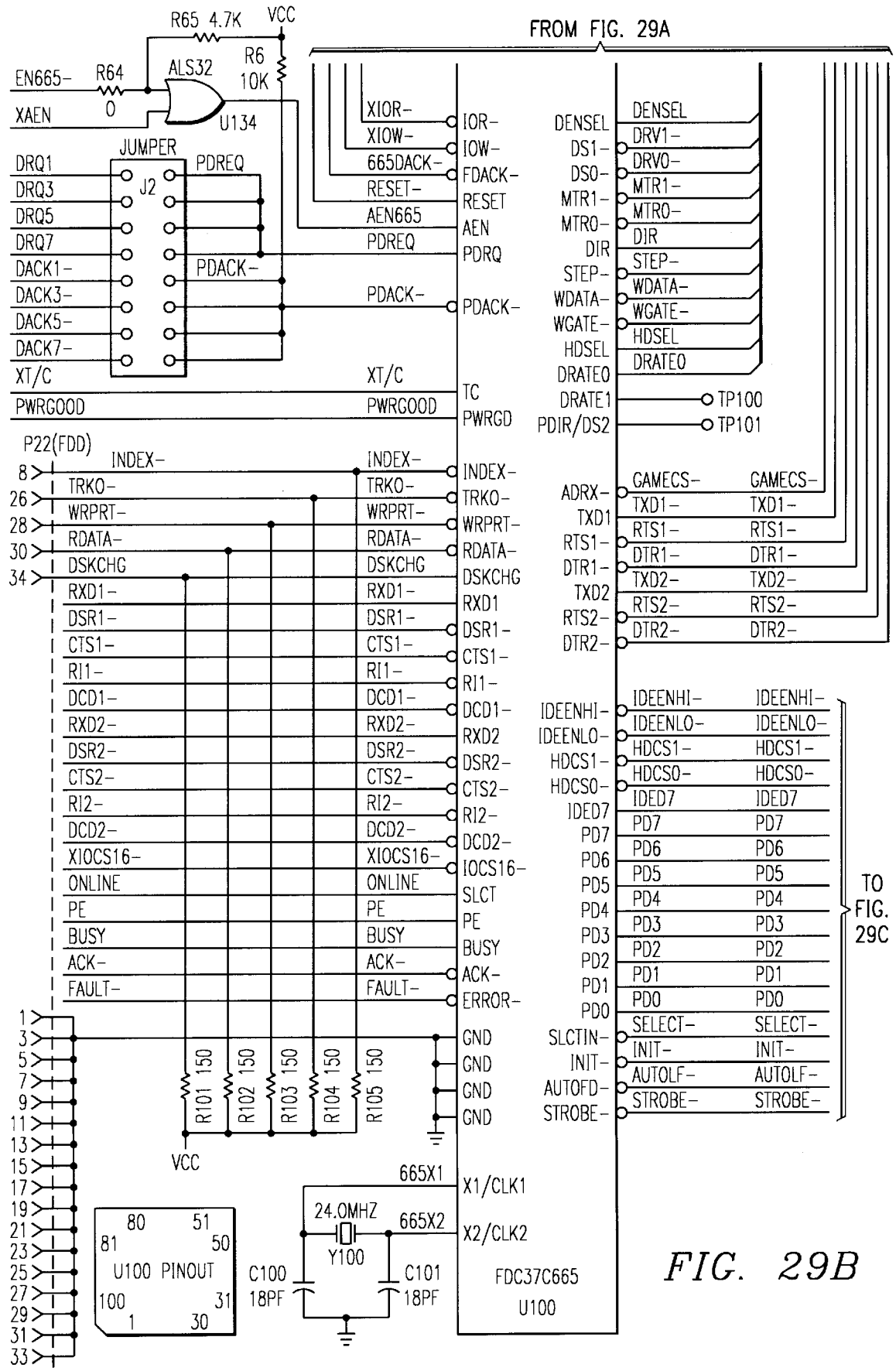
Figure 29C:
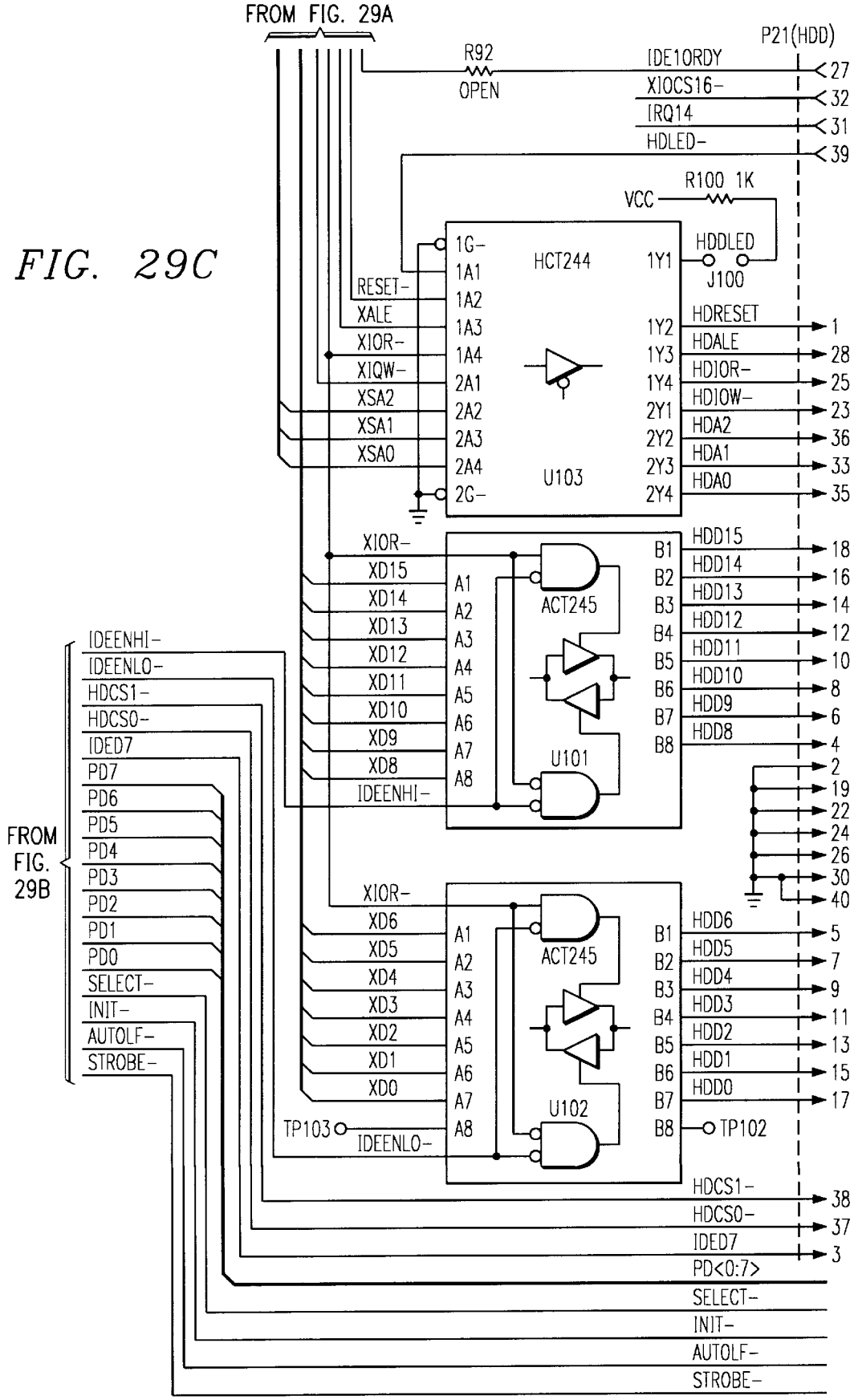
Figure 30A:
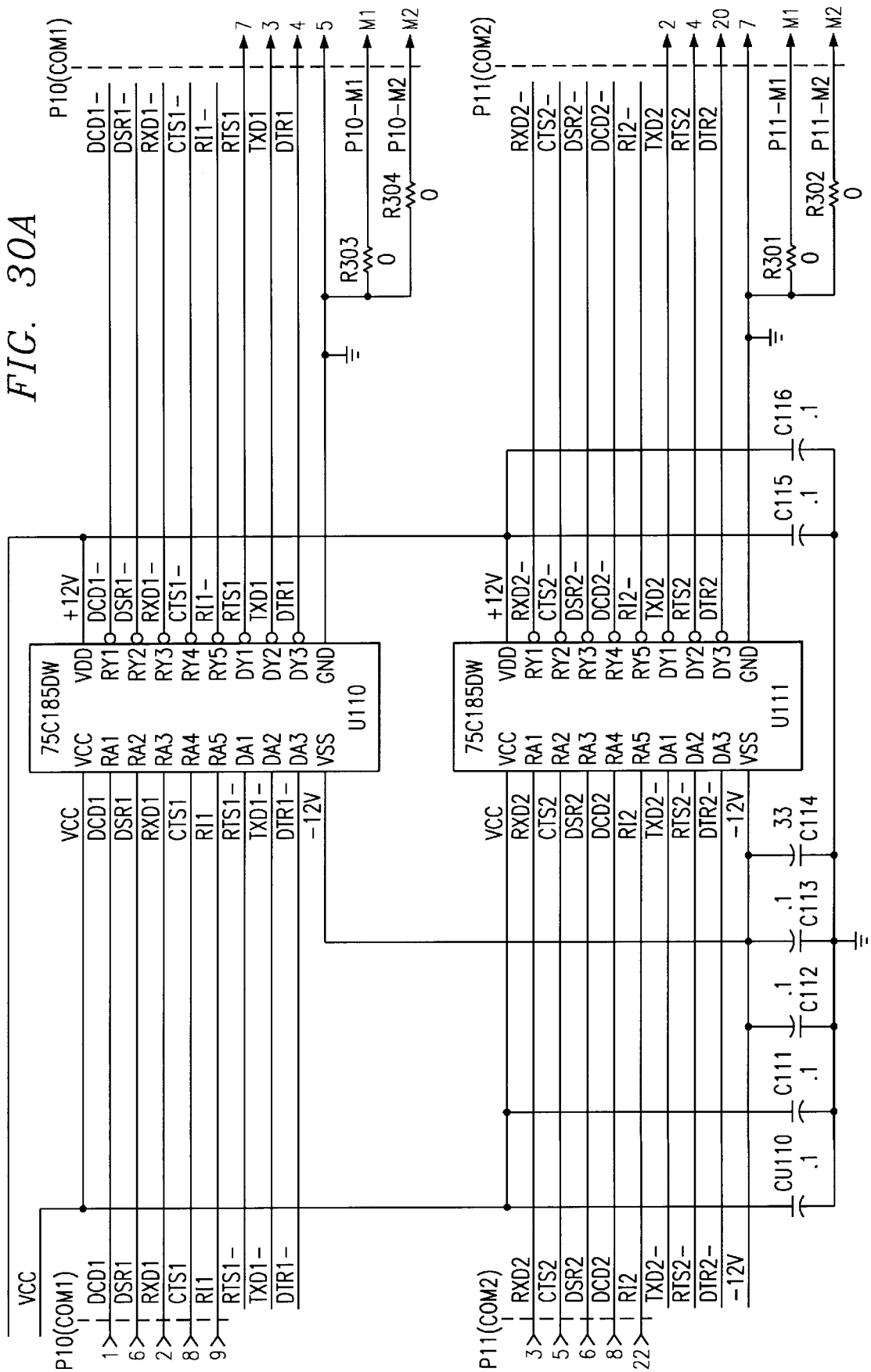
Figure 30B:
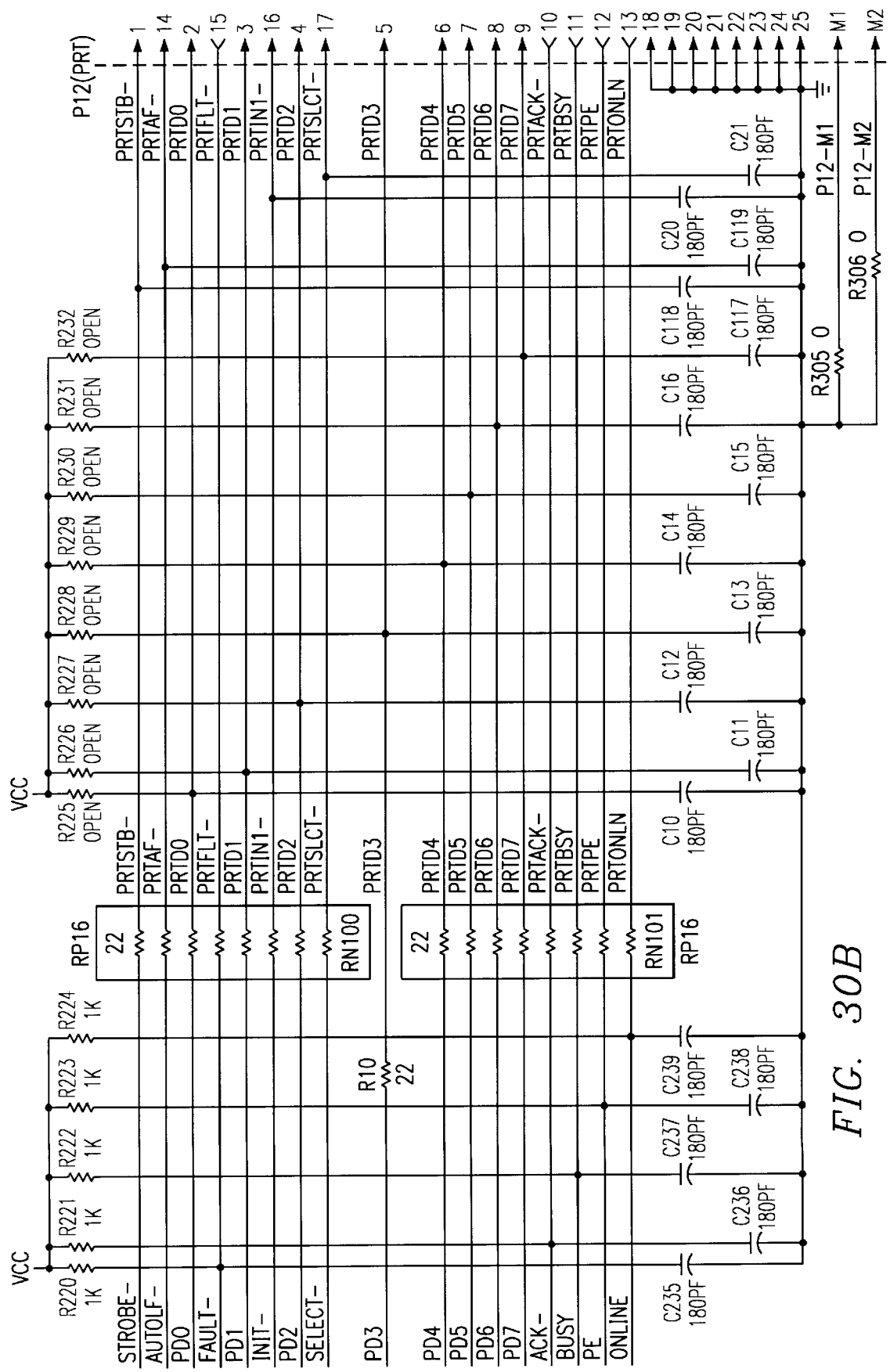
Figure 31A:
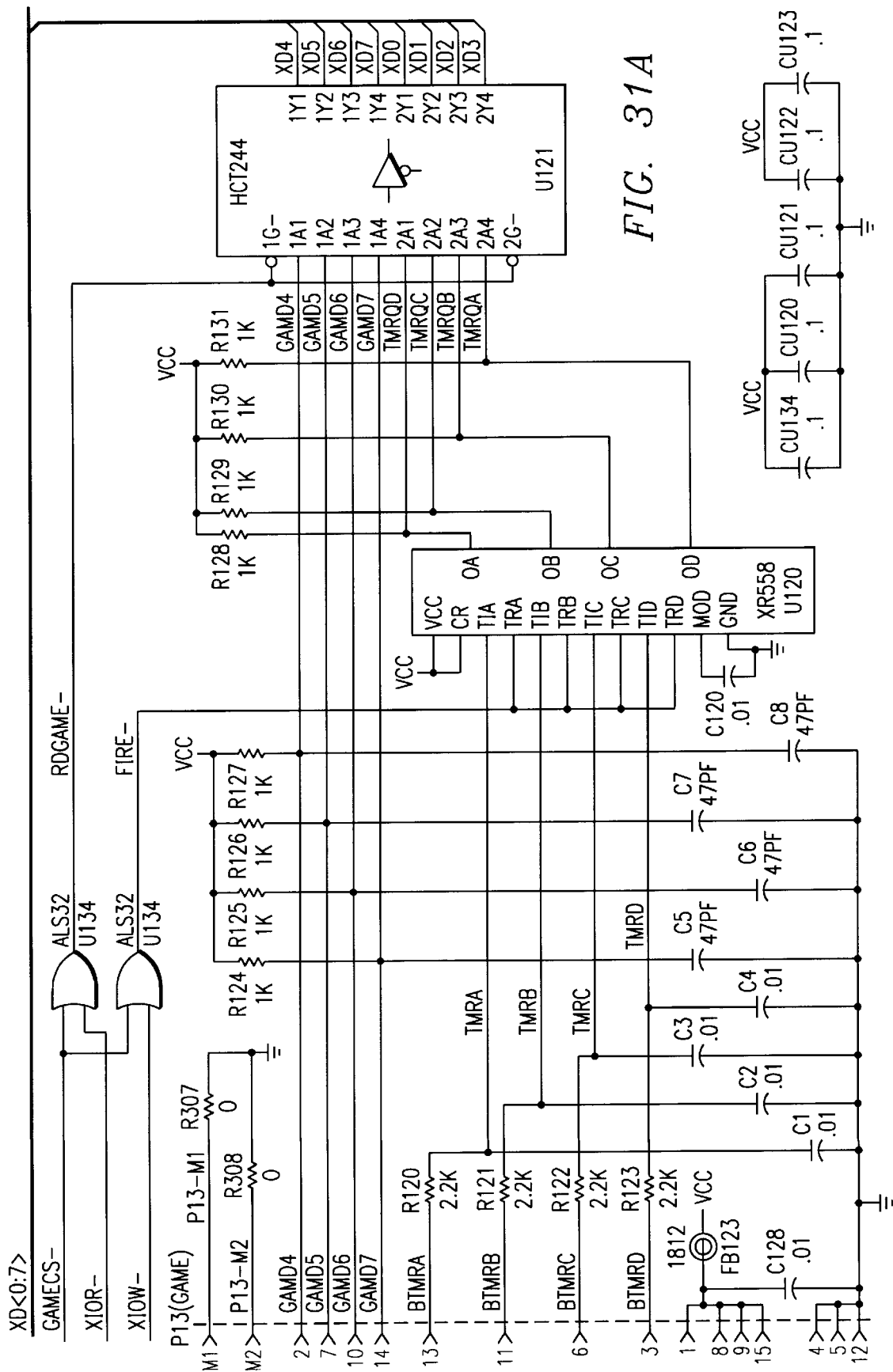
Figure 31B:
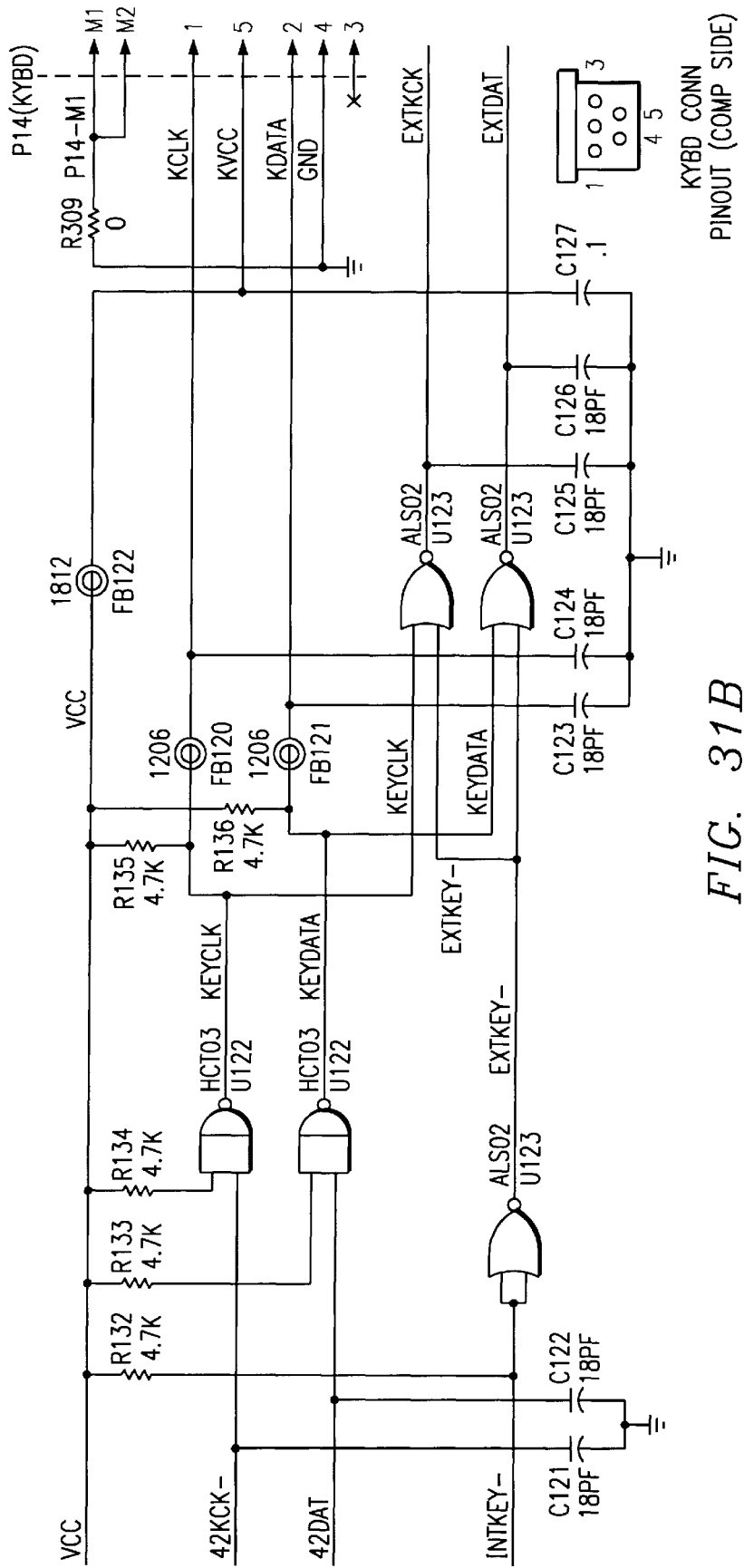
Figure 32D:
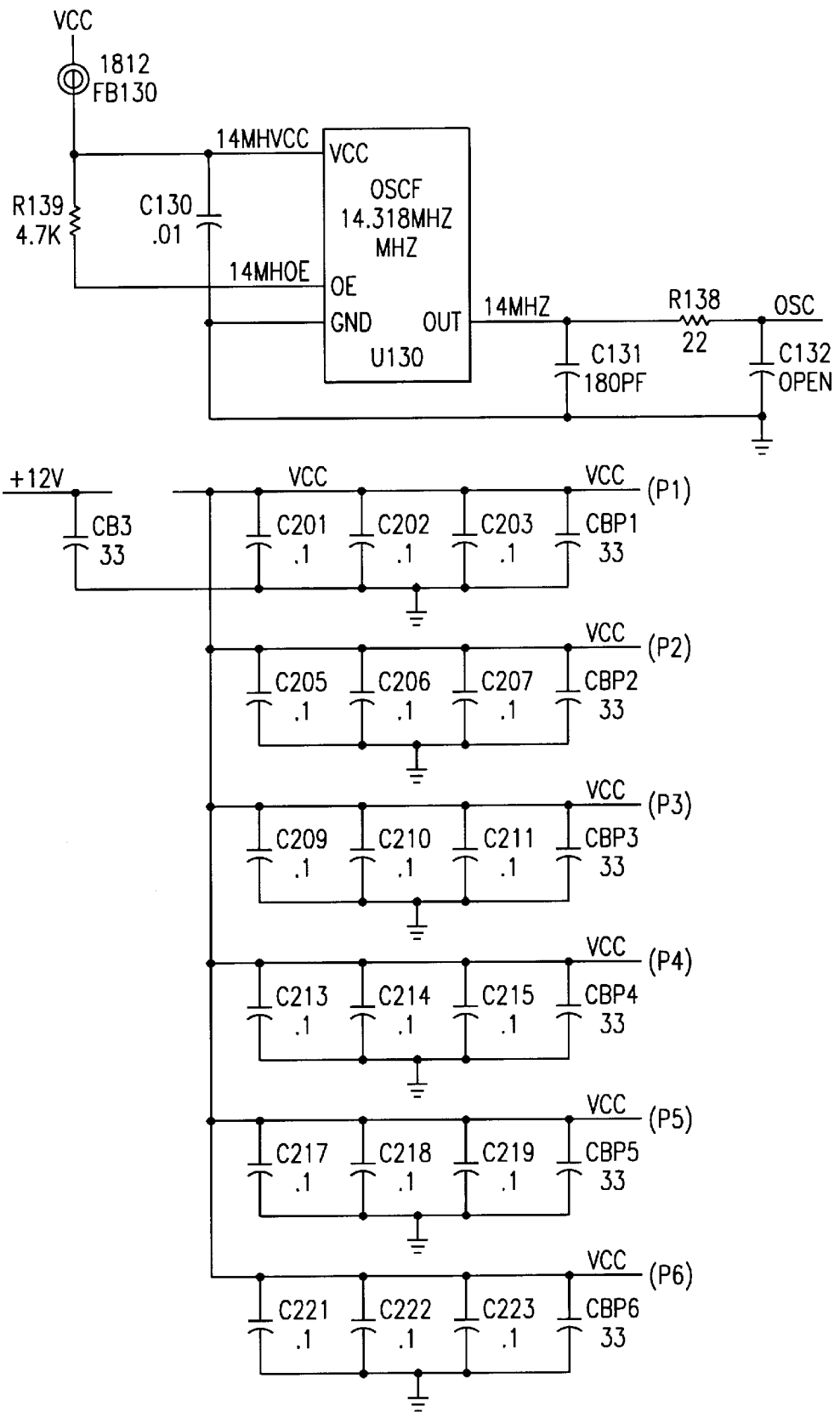
Figure 36:
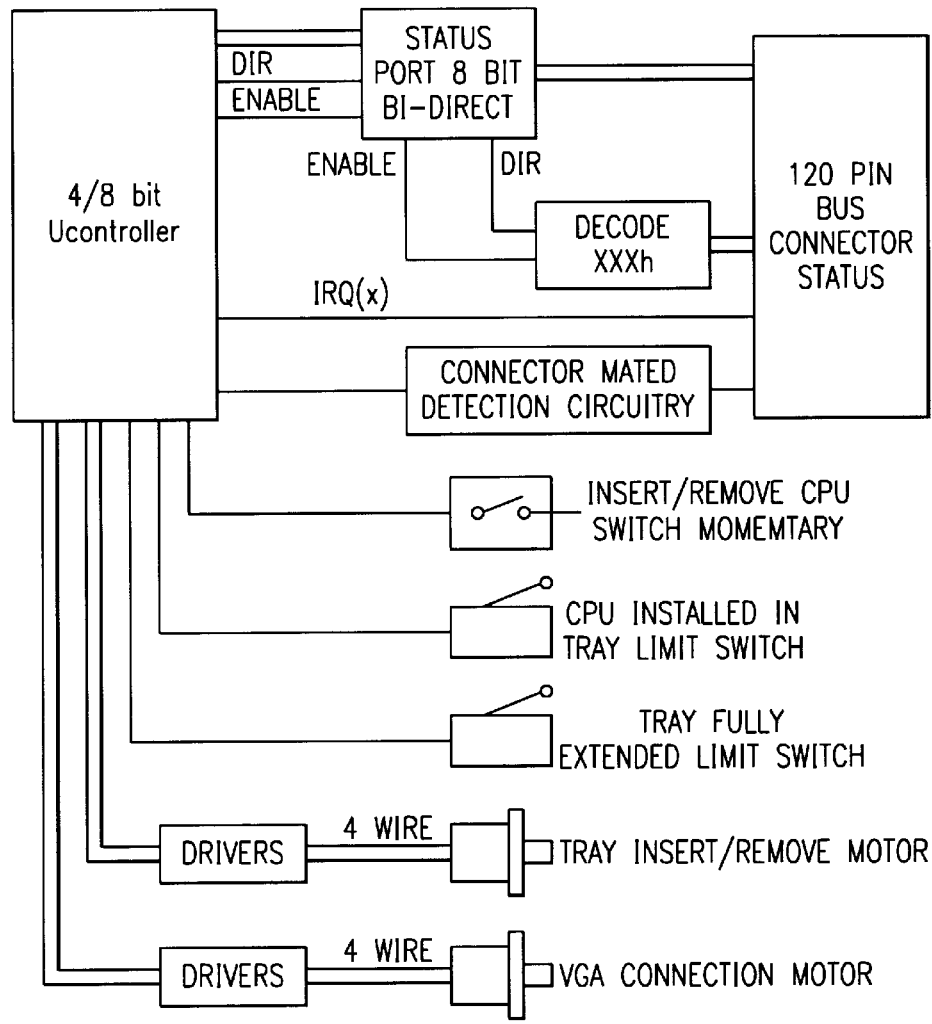
FIG. 36 is a block diagram of the main processing system of docking station 10.
Figure 33A:
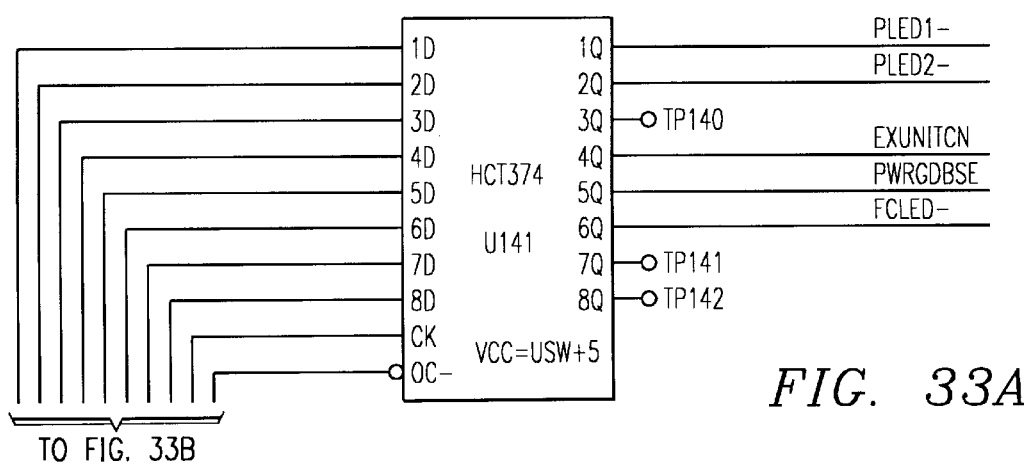
Figure 33B:
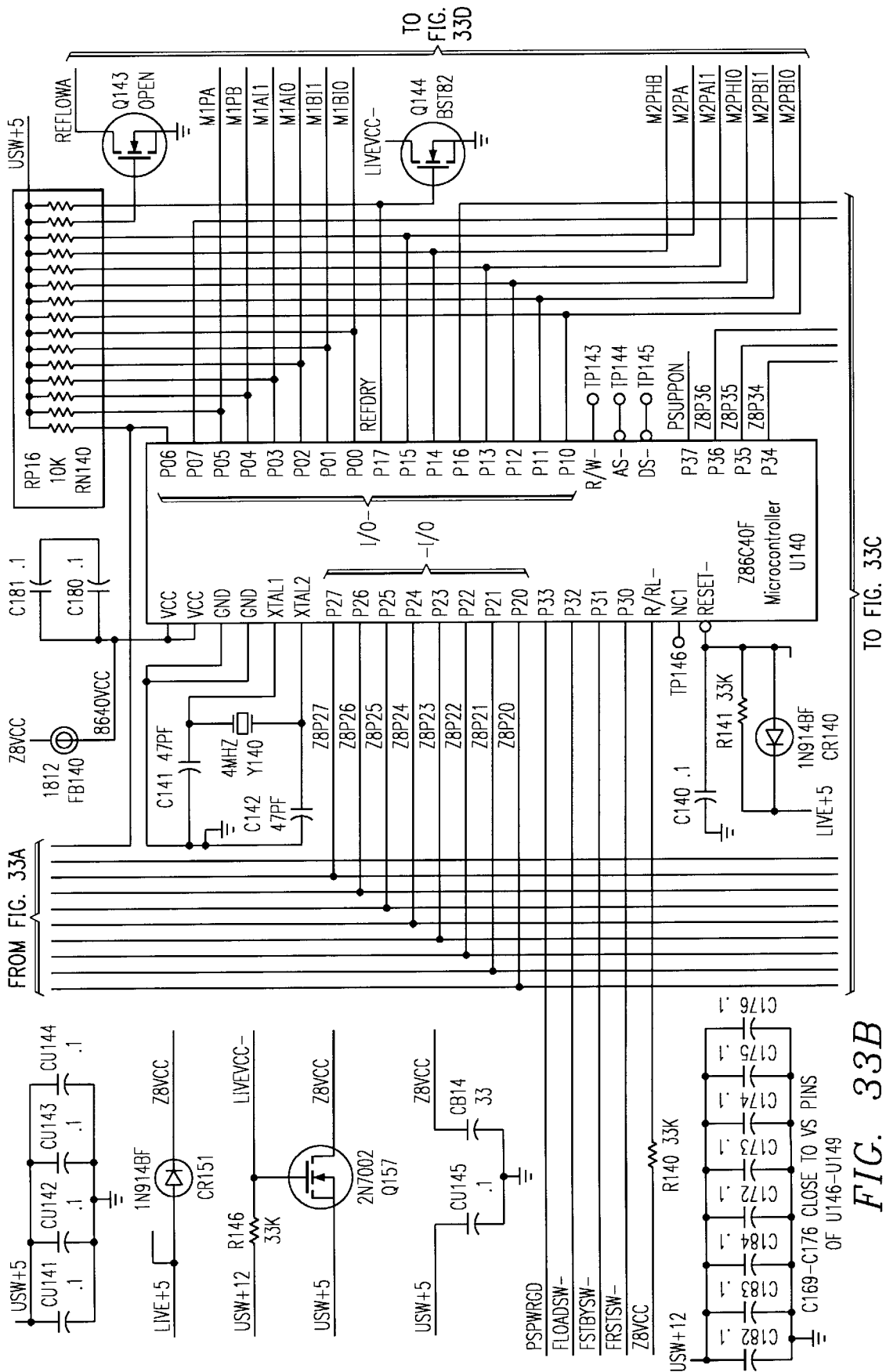
Figure 33C:
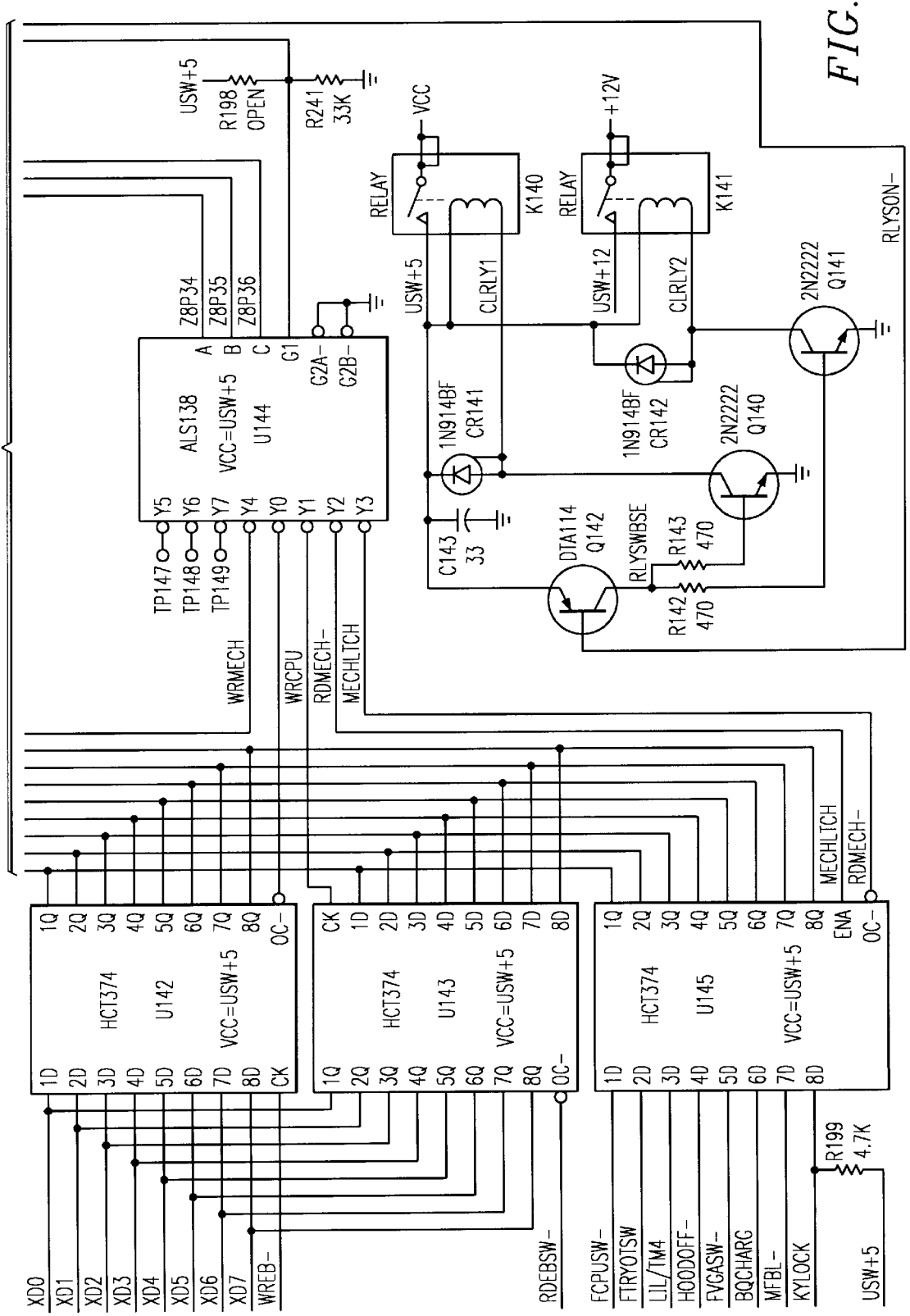
Figure 33D:
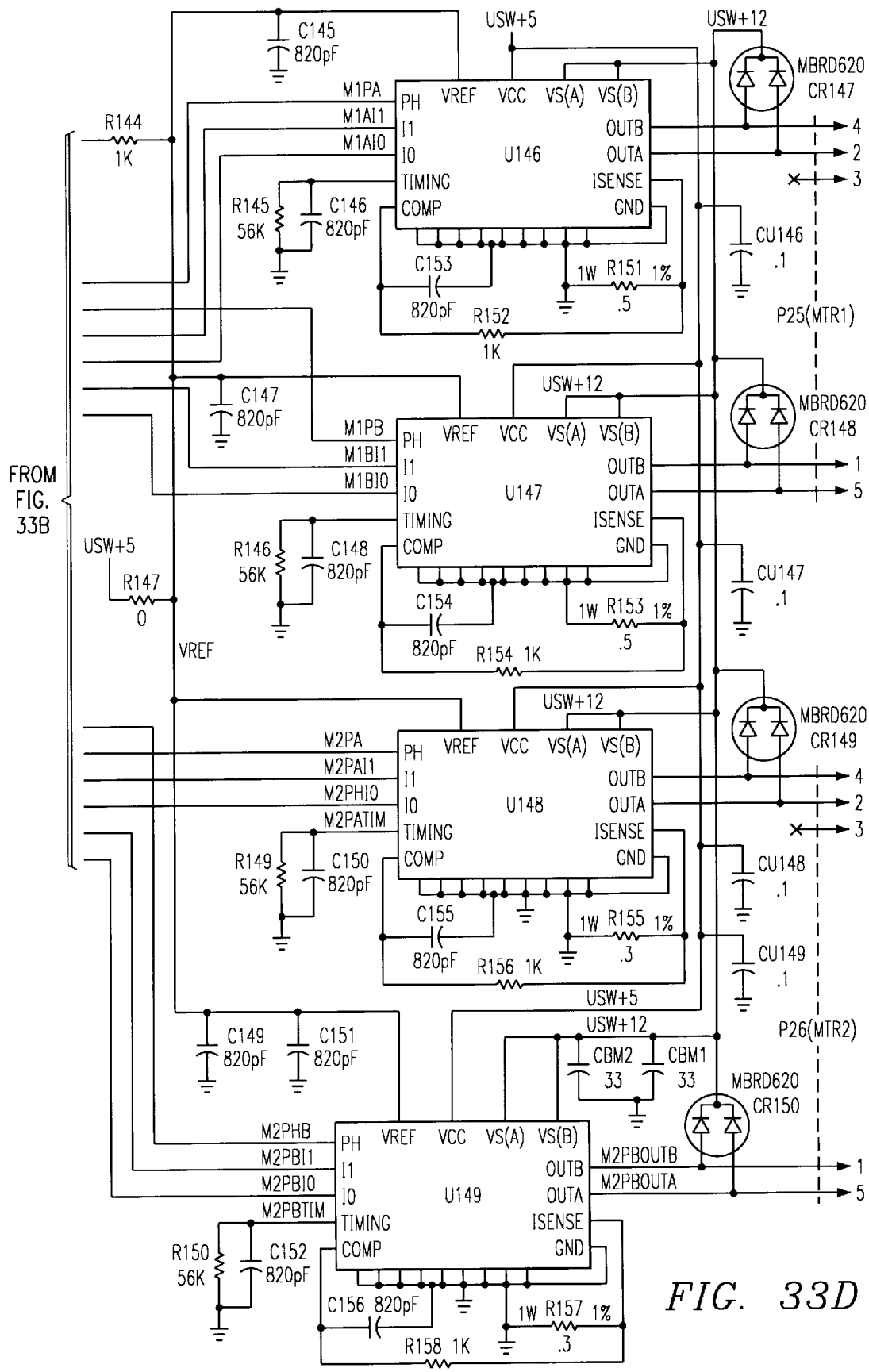
Figure 34A:
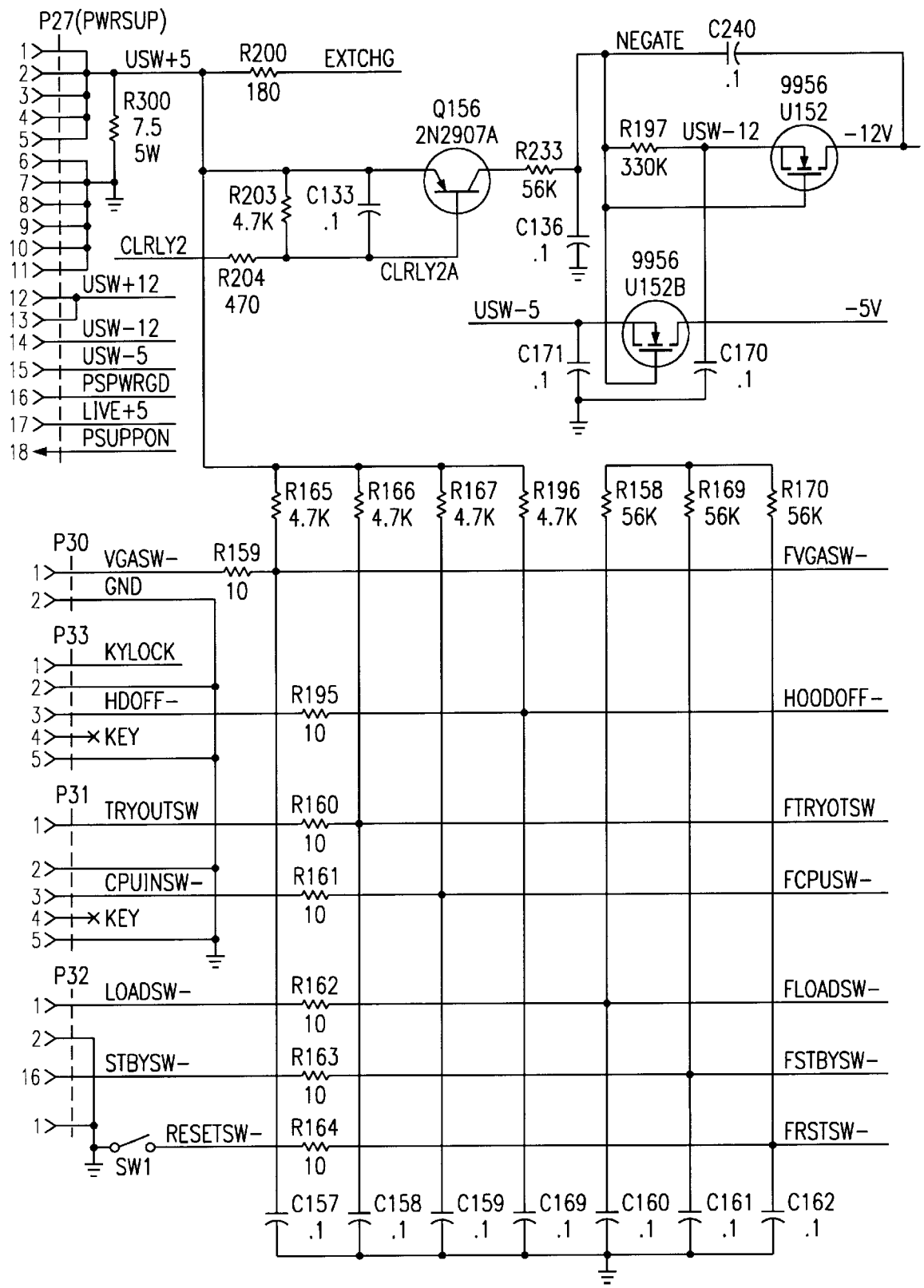
Figure 34B:
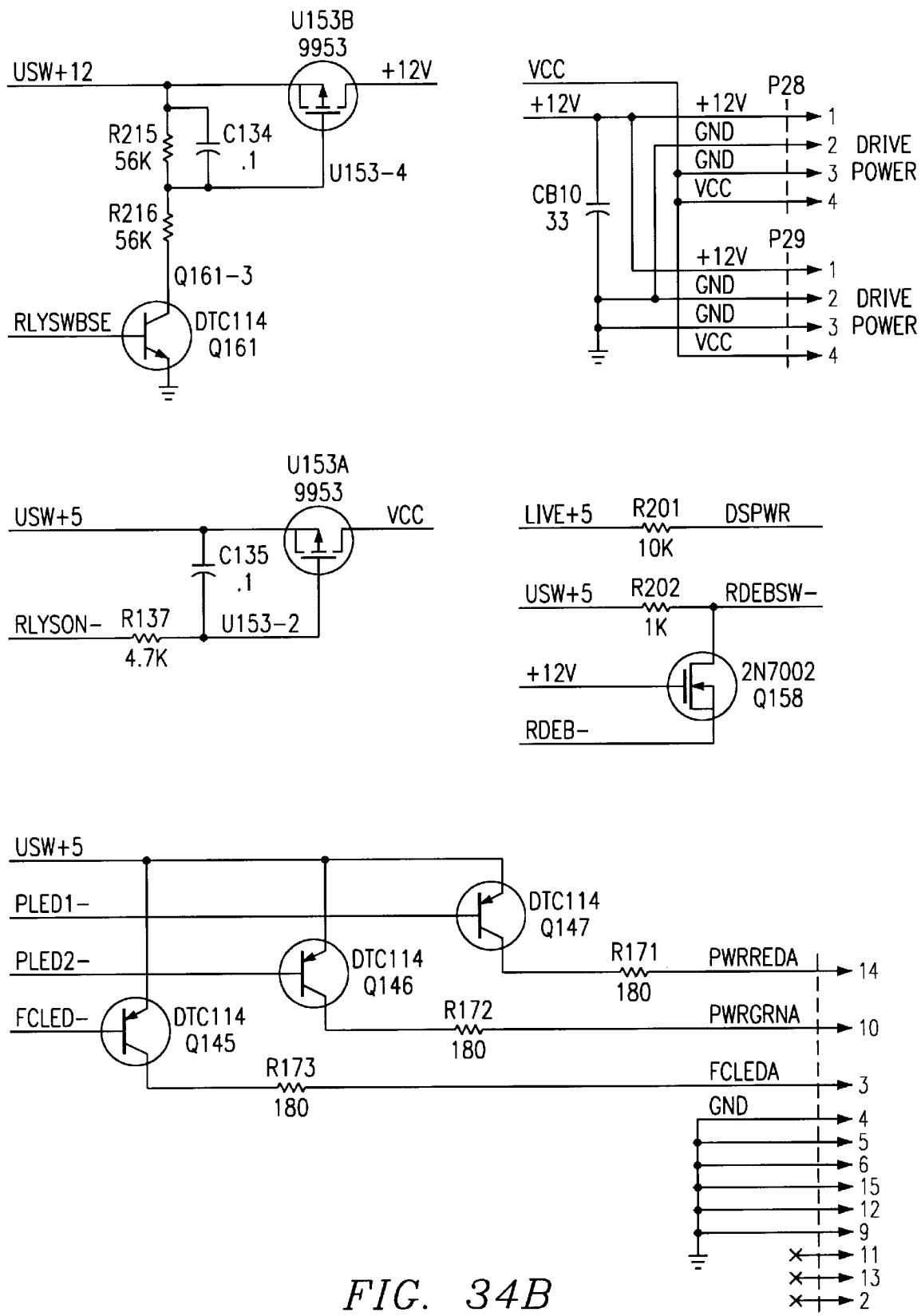
Figure 34C:
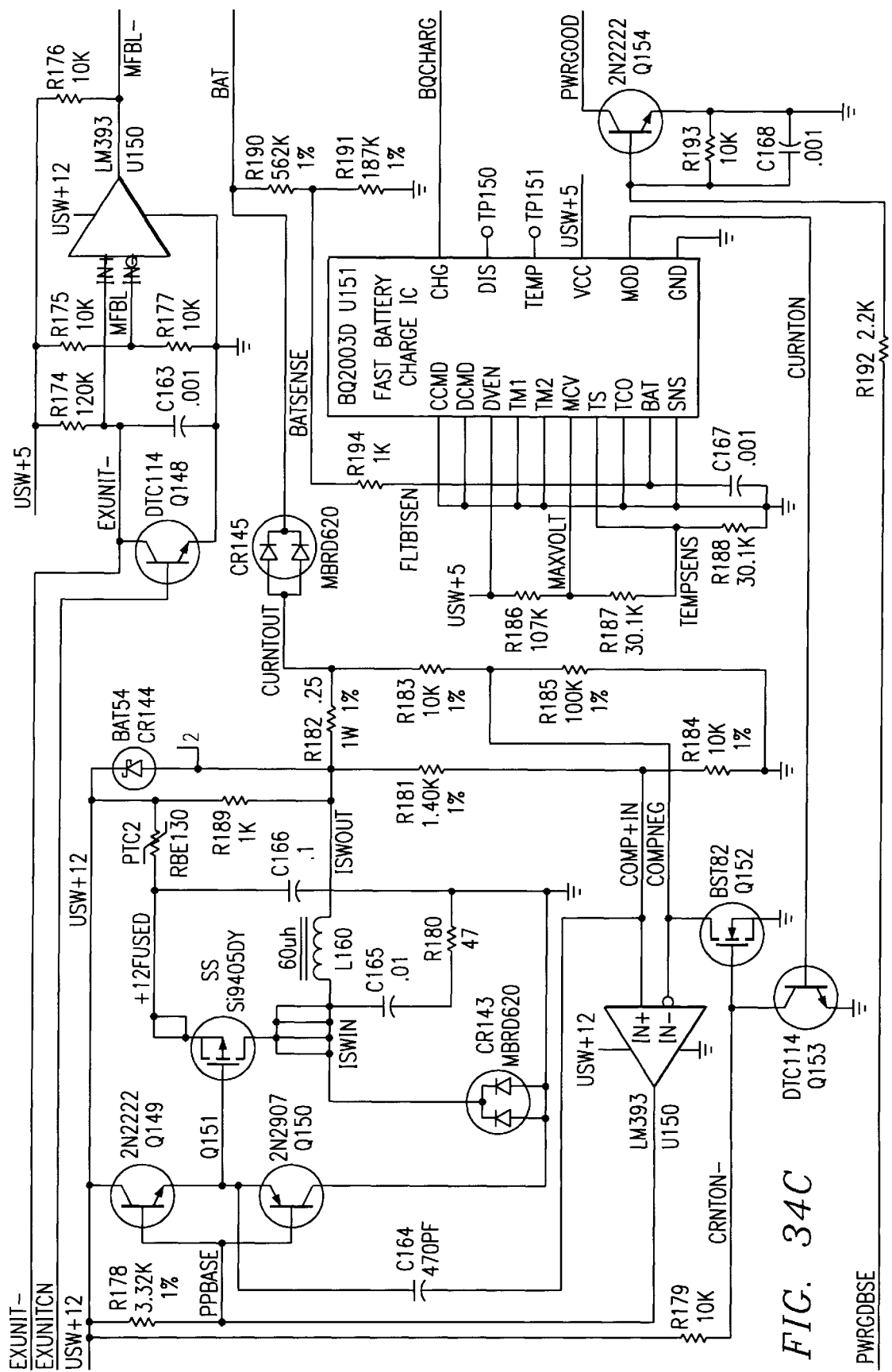
Figure 35A:
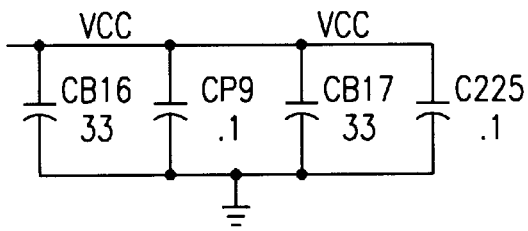
Figure 35B:
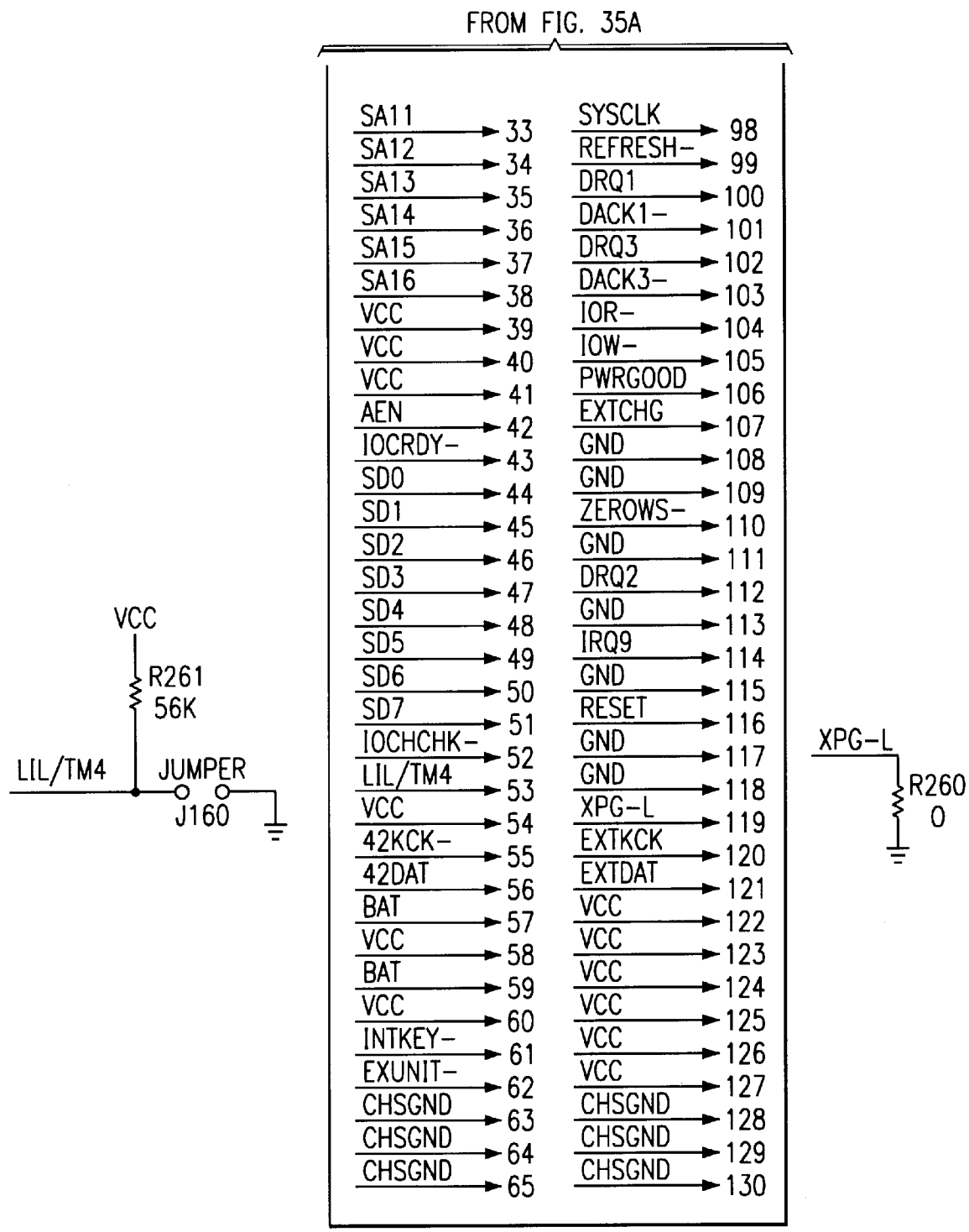
Figure 35C:
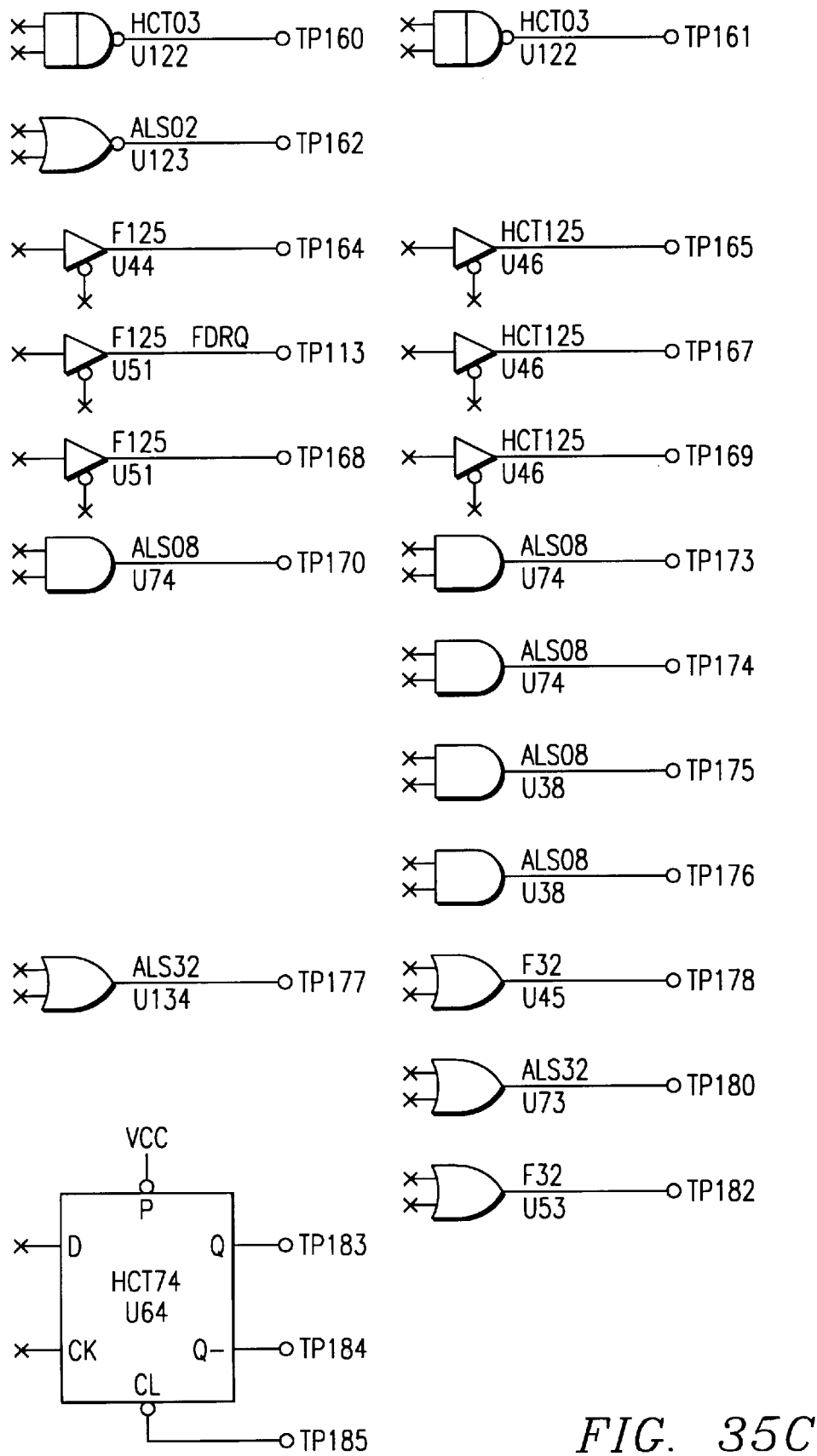

FIG. 18 illustrates a top plan view of main board 94. FIG. 19 illustrates a bottom plan view of main board 94. FIGS. 20–35 are electrical schematic diagrams for main board 94. FIG. 36 is a block diagram of the main processing system of docking station 10. The microprocessor (U140 in FIG. 33) in the docking station is a Z86 (or Z40 depending on desired application) microprocessor having 4K of ROM. The computer program "MOTORCODE", listed in the Computer Program Listing section at the end of the description but before the claims, must be loaded onto the memory (4k of ROM) of microprocessor (U140) of docking station 10. The "MOTORCODE" computer program enables the microprocessor (U140) to: run the motors 47 & 90 that control the loading and docking of the portable computer 13 to the docking station 10; control the communications channel from the docking station to the portable computer; turn power on/off to the docked portable computer; control the time and rate of battery recharge of the portable computer's batteries; control the function of switches 12 and 16 on the docking station and control the docking station's front panel LEDs.

Figure 37:
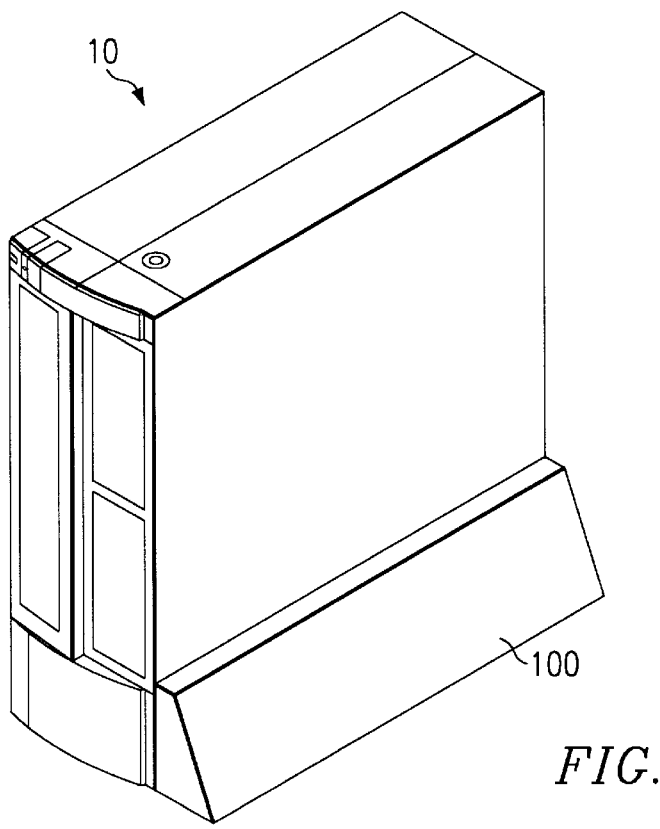
FIG. 37 is a sketch of the docking station of FIG. 1 being oriented in a vertical or "tower" position.

While docking station 10 has been thus far illustrated in a horizontal position it can also be operated in a vertical or "tower" position, as illustrated in FIG. 37. In the tower position, the docking station can be neatly stored under a desk to free additional desktop space. In the tower position, a stand or side support 100 should be added to the docking station 10 to prevent accidental tipping over.

INTERFACE PROTOCOL

The interface between the microprocessor (MC) in docking station 10 (U140 in FIG. 33) and the main processor (PC) in the portable computer is an eight bit I/O port ar PC I/O address 00E9h. The MC reads the values that the PC writes and the MC writes the values that the PC reads. Normally the MC will store standard values in this port. If the PC wants other information or wishes the MC to perform other actions, there is a defined protocol for sending commands from the PC to the MC. When the MC has other information available, it can set one of the status bits and the PC will send commands to discover what other information is available.

The upper two bits of the I/O port define what the lower five bits mean. These bits (bit 7 and 6) can be one of four values. At powerup or when the PC writes 00xx-xxxx to the status register, the lower 5 bits will contain the standard status values. When the PC wants to send a command to the MC, the PC will write 01yy-yyyy to the status register with the lower 6 bits containing the command number. When the MC notices the command, it will write 01yy-yyyy to the port to acknowledge the command. If the MC wants to tell the PC that the command is invalid, the MC will write 10yy-yyyy to the port. For valid command, the MC will write 11zz-zzzz to the port when it is finished executing the command. In this paragraph, the xx-xxxx denotes the standard status port definition. The yy-yyyy denotes a command number. The zz-zzzz denotes the response to the command.

Multi-byte commands follow the same format. The 2nd byte from the PC will be 10yy-yyyy, the 3rd byte will be 01yy-yyyy and the 4th byte will be 10yy-yyyy. The command description will state how many bytes are expected in a multibyte command. The MC will ensure that the response to each new byte is different from the response to the previous byte. In most cases, the MC will just increment the previous response. The following tables show the values in the upper two bits for single and multi-byte commands.

| PC Write | MC Write | Comments |
|---|---|---|
| Single Byte Command flow. | | |
| 00xx-xxxx | | PC is ready to send a command to the MC |
| | 00xx-xxxx | MC is ready to receive commands |
| 01yy-yyyy | | PC sent command yy-yyyy to the MC |
| | 01yy-yyyy | MC received the command and is processing the command (ACK) |
| | 11zz-zzzz | MC finished the command and zz-zzzz is the response |
| Multi-Byte Command flow. | | |
| 00xx-xxxx | | PC is ready to send a command to the MC |
| | 00xx-xxxx | MC is ready to receive commands |
| 01yy-yyyy | | PC sent command yy-yyyy to the MC |
| | 01yy-yyyy | MC received the command and is processing the command (ACK) |
| 10yy-yyyy | | PC send 2nd 6 bits of the command to the MC |
| | 01yy-yyyy+1 | MC received the 2nd 6 bits (ACK) |
| 01yy-yyyy | | If there is more, the PC sends the 3rd 6 bits to the MC |
| | 01yy-yyyy+2 | MC received the 3rd 6 bits (ACK) |
| 10yy-yyyy | | If there is more, the PC sends the 4th 6 bits to the MC |
| | 01yy-yyyy+3 | MC received the 4th 6 bits (ACK) The PC will continue swapping the upper 2 bits until the entire command sequence is sent |
| | 11zz-zzzz | Sent after all 6 bit groups are sent |

Note several features of this protocol:

1. The PC might miss an ACK. When the MC finishes a command, it will put 11xx-xxxx in the port. If the PC has been interrupted or just busy, it might have missed the 01xx-xxxx state.

2. The PC will not miss a NAK. When the MC decides a command is invalid, it will place 10xx-xxxx in the port. This might happen instead of the ACK or after the MC decodes the command. Once the PC writes 00xx-xxxx or 01xx-xxxx the MC can change the port.

3. The PC might not always see exactly what it last wrote.

4. The PC must ensure that the port contains either a 00xx-xxxx state or a 11xx-xxxx state before starting a command.

5. If there is a possibility that two sections of code could write to the I/O port on the PC at the same time, special steps must be taken to ensure that two different code sections don't start a command at the same time. There is a short time between when the PC starts the command and when the MC will notice the command. The MC will ACK the command that it reads and not previous or later commands. But, there is no guarantee that an ACK will be seen.

6. Commands with no return values defined in the lower 5 bits will not necessarily return zeros in those bits.

7. Bit 5 is valid as a "more information available" bit only during 00xx-xxxx state and the 11xx-xxxx state.

Status Values

The General Status values are available whenever the PC clears the upper two bits of the I/O port. The MC will then clear the upper bits and keep the other bits updated on a timely fashion. The other status values are only available after requesting them with a command. They are not updated, but are a snapshot of the status of the time the command was requested.

General Status Values

This I/O port contains the General Status values whenever bits 7 and 6 are read as zero.

---
These definitions are of the General Status Bits.
This is the values are the ones the PC sees when reading 00E9h

```
7 6 5 4 3 2 1 0
            └── Power LED State
                    00 = Power LED Off
                    01 = Power LED Green
                    10 = Power LED Red
                    11 = Power LED Yellow
         └────── Battery Charger State
                    0 = Trickle or No Charge
                    1 = Fast Charge
       └──────── Standby Button
                    0 = Standby Key was not Hit
                    1 = Standby Key was Hit
     └────────── Eject/Dock Button*
                    0 = Eject/Dock Button was not Hit
                    1 = Eject/Dock Button was Hit
  └───────────── More MC Data Available
                    0 = No more status info available
                    1 = More status info available
```
*To clear the set conditions on these two bit, the PC should send the Clear Kithit Command to the MC.

---

Switch Status Byte Values

This port contains the status of the hardware switches that sense the position of the portable computer and the load tray.

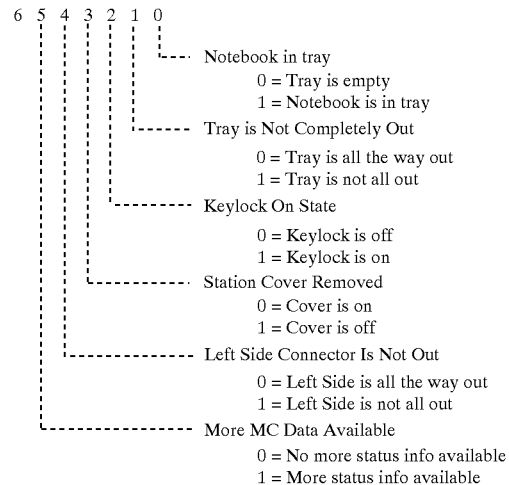

These definitions are of the Switch Status Bits.

```
7 6 5 4 3 2 1 0
            └── Notebook in tray
                    0 = Tray is empty
                    1 = Notebook is in tray
          └──── Tray is Not Completely Out
                    0 = Tray is all the way out
                    1 = Tray is not all out
        └────── Keylock On State
                    0 = Keylock is off
                    1 = Keylock is on
     └───────── Station Cover Removed
                    0 = Cover is on
                    1 = Cover is off
   └─────────── Left Side Connector Is Not Out
                    0 = Left Side is all the way out
                    1 = Left Side is not all out
 └───────────── More MC Data Available
                    0 = No more status info available
                    1 = More status info available
```

Modes Status Byte Values

This port contains the status of the Smart PC mode 1, LED modes, RESET signal just prior to eject mode and the RESET on reload of the notebook mode.

---
These definitions are of the Modes Status Bits.

```
7 6 5 4 3 2 1 0
            └── Eject with RESET Active State
                    0 = Eject with RESET Inactive
                    1 = Eject with RESET Active
          └──── Dock with RESET Active State
                    0 = Doc with RESET Inactive
                    1 = Doc with RESET Active
        └────── Smart PC State
                    0 = Smart PC state Inactive
                    1 = Smart PC state Active
     └───────── Charge LED State
                    0 = Charge LED under MC Control
                    1 = Charge LED under PC Control
   └─────────── Power LED State
                    0 = Power LED under MC Control
                    1 = Power LED under PC Control
 └───────────── More MC Data Available
                    0 = No more status info available
                    1 = More status info available
```

Command Values

The following are the command values that are currently defined. There are 64 possible commands. Not all are defined currently. The MC will return 10xx-xxx when the PC tries to execute an invalid command.

Command 00h (00-0000)—Clear Keyhit Bits

This command clears the keyhit bits in the General Status Byte.

Command 01h (00-0001)—Init Smart PC Mode 1

This command turns on the "Smart PC" mode number 1. This mode means that the PC wants to have control over the portable computer eject process. The MC will not eject the portable computer except when the user presses the Standby & eject buttons at the same time or when the PC sends an eject command.

Command 02h (00-0010)—Terminate Smart PC Mode 1

This command turns off the "SmartPC" mode number 1.

Command 03h (00-0011)—Eject Notebook

This command causes the MC to eject the notebook now. If the keylock is engaged, the MC will return with 1100-0001. There are several modes that the PC can set to modify the eject process. The default modes are "perform RESET before eject" and "power down before eject".

Command 04h (00-0100)—Read Switch Status Byte

This command returns the switch status byte to the PC. These bits are a snapshot of the various electro-mechanical switches of the docking station.

Command 05h (00-0101)—Blink Power LED

This command causes the MC to start blinking the Power LED at a standard blink rate. Either a "Standard Power LED" or one of the solid Power LED commands will cancel the blinking.

Command 06 (00-0110)—Standard Power LED

This command causes the MC to go back to the standard meaning for the Power LED.

Command 07 (00-0111)—Power LED Red

This command causes the MC to turn the Power LED red solid.

Command 08 (00-1000)—Power LED Green

This command causes the MC to turn the Power LED green sold.

Command 09 (00-1001)—Power LED Yellow

This command causes the MC to turn the Power LED yellow solid.

Command 0A (00-1010)—Power LED Off

This Command causes the MC to turn the Power LED off solid.

Command 0B (00-1011)—Connect Left Side

This command causes the left side connectors to try to be connected to the portable computer. If the connectors are already connected, no action is required. This command might just start the action.

Command 0C (00-1100)—Disconnect Left Side

This command causes the left side connectors to try to be disconnected from the portable computer. If the connectors are already disconnected, no action is required. This command might just start the action.

Command 0D (00-1101)—Toggle Left Side

This command causes the left side connectors to be moved in if they are out or disconnected if they are in. This command might just start the action.

Command 0E (00-1110)—Read Station Type

This command causes the MC to return 5 bits of ID. The current ID is 0.

Command 0F (00-1111)—Read Firmware Revision

This command caused the MC to return 5 bits of Firmware revision.

Command 10 (01-0000)—Read Firmware Version

This command causes the MC to return 5 bits of Firmware version.

Command 11 (01-0001)—Read Fast Charge Time

This command causes the MC to return the number of 16 minutes that the portable computer has been on Fast charge. If more that 32, then the value will be 1101-1111 which is 32*16 minutes or a little over 8.5 hours.

Command 12 (01-0010)—Blink Charge LED

This command causes the MC to blink the Charge LED at a standard rate. Either the "Standard Charge LED" or one of the solid Charge LED commands will cancel this blinking state.

Command 13 (01-0011)—Standard Charge LED

This command causes the MC to go back to the standard meaning for the Charge LED.

Command 14 (01-0100)—Charge LED On

This command caused the MC to turn the Charge LED on solid.

Command 15 (01-0101)—Charge LED Off

This command causes the MC to run the Charge LED off solid.

Command 16 (01-0110)—No RESET on Eject Mode

This command sets the mode so that on the next eject, no RESET is performed. This mode will then revert to the RESET on Eject state.

Command 17 (01-0111)—RESET on Eject Mode

This command set the mode so that on the next eject, a RESET is performed.

Command 18 (01-1000)—Load with no RESET Mode

This command sets the mode so that on the next load, no RESET is performed. After the load, this mode will then revert to the RESET on Load state.

Command 19 (01-1001)—Load with RESET Mode

This command set the mode so that on the next load, a RESET is performed.

Command 1A (01-1010)—Read Modes Status Byte

This command reads the status byte containing various information about the state of the MC software modes.

Command 1B (01-1011)—Power On

This command turns the power on to the expansion part of the docking station. On the 1st docking station, this includes the portable computer.

Command 1C (01-1100)—Power Off

This command turns the power off to the expansion part of the docking station. On the 1st docking station, this includes the portable computer.

Command 1D (01-1101)—Turn Power Back On Later

This 3 byte command tells the MC to turn the power back on at a later time. The 2nd byte contains the number of hours to delay and the third byte contains the number of minutes. The 1st implementation limits the hours to X. Also, the minutes only have a X resolution.

Command 1E (01-1110)—Clear Power Back On Timer

This command clears the hours and minutes time from the Turn Power Back on Later command.

Command 1F–3F (01-1111 through 11-1111)— Reserved

These commands are reserved at this time.

Figure 65:
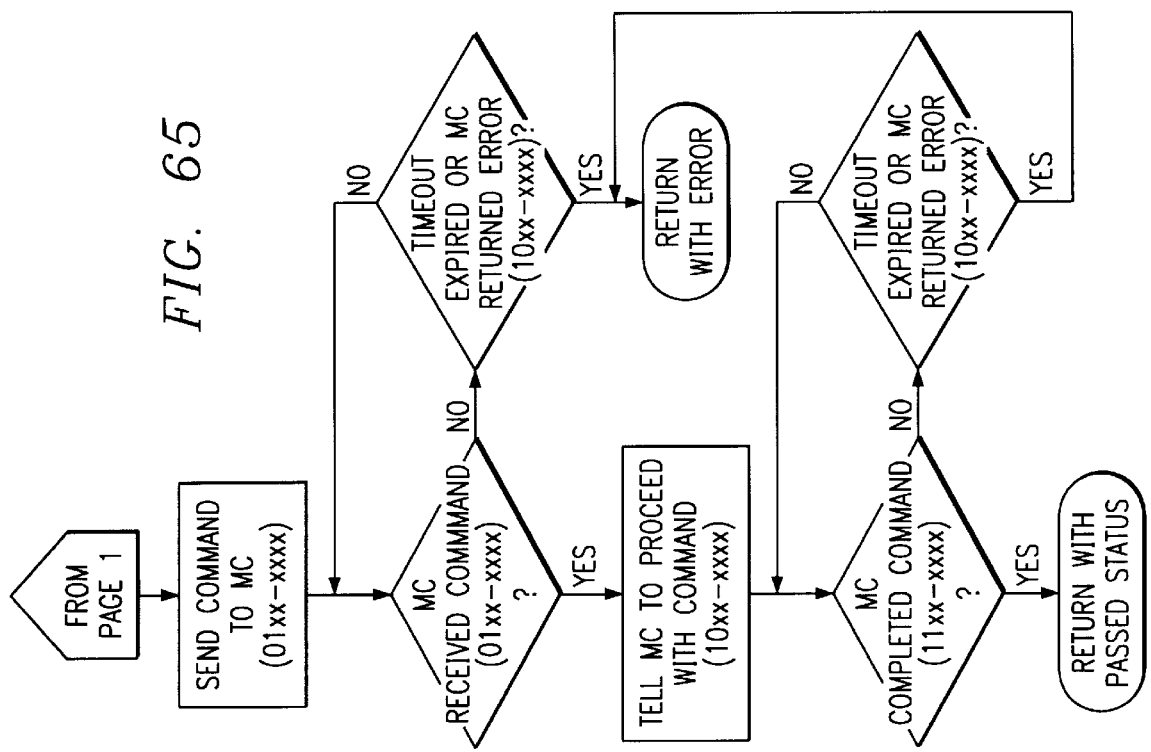
FIGS. 64 & 65 illustrate a flowchart of the portable computer's communication code for talking to the microprocessor in the docking station.
Figure 64:
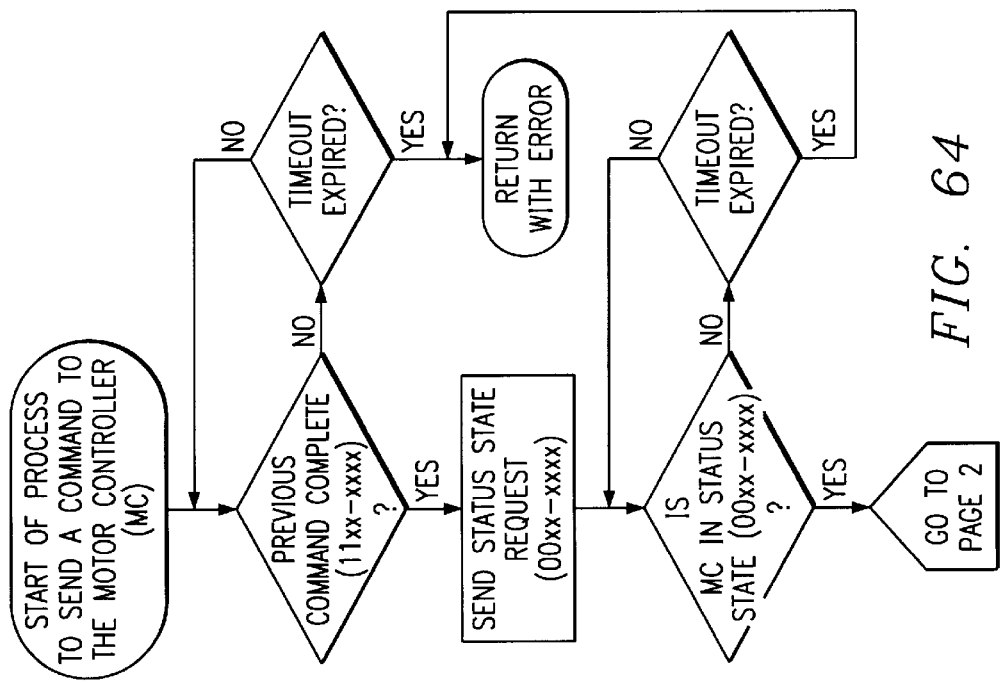

FIGS. 64 and 65 illustrate a flowchart of the portable computer's communication code for talking to the docking station's microprocessor.

DOCKING SYSTEM SOFTWARE OVERVIEW

The docking system is designed to accommodate at least the following software (should be installed in the order listed):

Windows for Workgroups Add-On, Version 3.11 (for user with Windows 3.1); this operating system environment addon includes many new features particularly useful for the docking environment. This new operating system environment also provides Windows networking for both desktop and portable operation.

BatteryPro and Productivity Software—a collection of TI Utilities including.

BatteryPro Power Saving Utility

SETDOCK—A menu-driven program that allows you to configure a desktop environment. Run this utility for setting up a basic system or prior to running one of the other configuration programs like EZ_SCSI or PCM Plus.

Super Shutdown—a utility that automatically saves all open files, closes all open applications and undocks the notebook.

Collection of other utilities (ALARM, CURSON, GETSTAT, etc.) as described in TI's TravelMate 4000 User's Manual.

TIVGA Utilities—Video installation program with various video device drivers supported by enhanced VGA display modes.

Intel Plug-N-Play Configuration Manager—software that provides for easy configuration of ISA Option Cards.

PCMCIA PhoenixCARD Manager Plus—the supporting software required to install PCMCIA option cards on the docking system.

Adaptec EZ-SCSI for DOS/Windows—the supporting software required to install SCSI devices onto the docking system.

Loading and operating information for the previously listed software (except the TI Utilities) is provided in the following reference manuals:

Windows for Workgroups User's Manual, P/N 9791790-0001

PCMCIA PhoenixCARD Manager Plus User's Manual, P/N 9791792-0001

Adaptec EZ-SCSI for DOS/Windows User's Manual P/N 978866-0001

TravelMate—Series Notebook Computer User's Reference Manual, Part No. 2581179-0001—contains information regarding the VGA utilities.

Intel Plug-N-Play User's Manual, TI Part No. 9791791-0001

SOFTWARE REQUIRED FOR MINIMUM SYSTEM

For a minimum system comprising a docking station, a portable computer, an external mouse, a keyboard, an external monitor, but not yet installing any options, the following software is needed:

Windows for Workgroups Version 3.11 (see associated Windows for Workgroups User's Manual for loading and operating instructions).

BatteryPro and Productivity Software (contains the configuration program, SETDOCK, Video Utilities (LCD, CRT, and SIM) and Super Shutdown, a utility which provides for automated undocking.

TI VGA Utilities—a video installation program with various device drivers supported by enhanced VGA display modes

LOADING WINDOWS FOR WORKGROUPS ADD-ON SOFTWARE

1. Insert the Windows for Workgroups v3.11 diskette into Floppy Drive a.

2. At the DOS prompt, type: A:\SETUP and press ENTER.

3. Follow the displayed instructions to install the software on the hard drive.

4. For further instructions, refer to the Windows for Workgroup v3.11 User's Manual.

LOADING BATTERY PRO AND PRODUCTIVITY SOFTWARE

To load the BatteryPro and Productivity Software from diskette, use the following procedure:

1. Insert the BatteryPro diskette into the notebook diskette drive. Select the MS-DOS Prompt icon to return to DOS.

2. From the C:\WINDOWS> prompt, type A:\INSTALL.EXE and press ENTER to run the install program.

3. At the main menu of the Install program, use the arrow keys to select your choice and press ENTER. For a new installation, select the INSTALL ALL FILES option. The files are then loaded in the designated director. Select the default values as you are prompted for choices by pressing the ENTER key. The software should eventually return you to the Windows environment.

LOADING THE VIDEO UTILITIES

The following three utilities are provided on the TI VGA Utilities diskette:

LCD—Sends output to the LCD display on the notebook.

CRT—Sends output to an external VGA monitor

SIMUL—Sends output to both panel and CRT

After they are properly installed, these utilities appear as icons in the notebook group in the Windows desktop. Double-click on the icon to run the desired utility. To configure VGA Windows utilities, ensure you have the Video Utilities diskette in drive A and complete the following steps:

1. From the Program Manager, select File+Run . . . and enter a:Setup.EXE
2. Select OK. The VGA Windows Utility Installation screen appears.
3. Enter the path where the screen utilities will be copied (default is C:\Windows).
4. Select OK. The files are copied to the designated directory and a dialog box appears stating that the files were successfully copied.
5. Select OK.

The VGA utilities will not change the default output in DOS (driven by System Setup). Changing the display type using WSETUP instead of these utilities will require a cold boot before the changes take place.

RUNNING SETDOCK

Using SETDOCK to Configure the System

SETDOCK is a configuration utility developed for the Docking System environment that customizes the desktop hardware configuration for maximum performance. SETDOCK must be run anytime docking system hardware is added or removed or port settings are to be changed. SETDOCK is automatically loaded when the BatteryPro and Productivity software is loaded. SETDOCK may be run from either MS-DOS or Windows (located in the UTILS directory of the hard drive).

Running SETDOCK from Windows

To run SETDOCK from Windows, select Run rom the File menu and type: C:\UTILS\SETDOCK.EXE in the Command line. Select OK to Run.

Running SETDOCK from DOS

To run SETDOCK from MS-DOS, type: C:\UTILS\SETDOCK.EXE at the MS-DOS c:\prompt. The SETDOCK main screen then appears on your monitor. The first time you run SETDOCK, simultaneously press ESC and F5 to ensure default values are installed.

Exiting from SETDOCK

To leave the SETDOCK utility, press ESC to call up the exit menu options and select the appropriate option.

SETDOCK Main Screen

Figure 38:
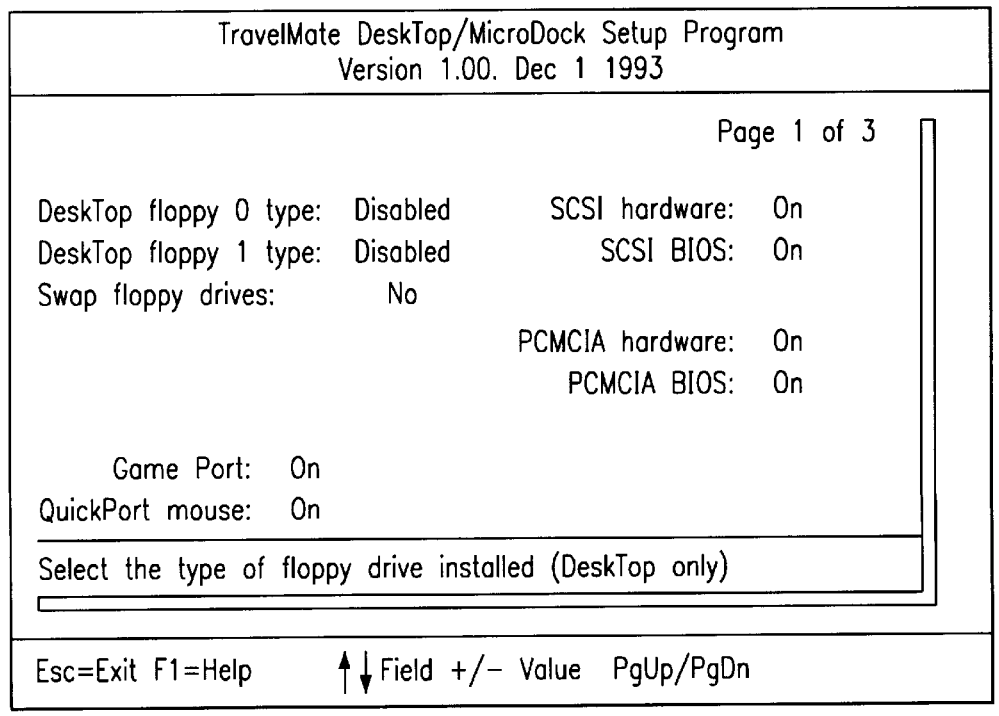
FIG. 38 illustrates SETDOCK main screen.

The SETDOCK main screen, illustrated in FIG. 38, allows a user to configure the notebook for use with the docking system.

When using some combination (combo) floppy drives, a user may need to swap the floppy 0 and floppy 1 types in addition to setting Swap floppy Drives to YES (i.e. if 3½" was type 0 and 5¼" was type 1, if setting Swap Floppy Drives to YES, then you will need to change 3½" to type 1 and 5¼" to type 0 as well.

SETDOCK Key Functions

To move around within the main screen of the SETDOCK utility, use the following keys:

| Key | Function |
|---|---|
| ←→ | Displays options available for the selected item |
| {↓ | Moves up or down through the list of options |
| Tab | Moves down through the list of options |
| ESC | Displays a screen with Exit options |
| F1 | Provides help |
| +/− | Increases or decreases the values in the selected field |
| Spacebar | Increased the values in the selected field |
| PgUp PgDn | on 4000 Series, will move you from page to page. On other notebooks, press FN + PgUp of FN + PgDn |

From the main screen, the following options are available:

| Item | Options | Description |
|---|---|---|
| Desktop floppy 0 (1) type | 5.25, 360 KB<br>5.25, 1.2 MB<br>3.5, 720 KB<br>3.5, 144 MB<br>3.5, 2.88 MB<br>Disable | Sets your floppy drive to the correct settings |
| Swap floppy drives | Yes<br>No | Changes the order other floppy drives (for instance, A can be configured to be seen as B) |
| Game Port | On<br>Off | Normally set to ON unless you want to use a game port on another board (such as a sound board) or you need the I/O space. |
| QuickPort mouse | On<br>Off | Normally set to ON unless you want to use a serial mouse and need the I/O ports |
| SCSI hardware | On<br>Off | Normally set to ON unless you have a board that conflicts with the I/O ports, DMA, or Interrupts assigned to the SCSI hardware by the onboard jumpers |
| SCSI BIOS | On<br>Off | Normally set to ON unless it is not required and you want to use the small amount of BIOS area for Upper Memory Blocks |
| PCMIA hardware | On<br>Off | Normally set to ON unless you have a board that conflicts with the I/O ports, DMA, or Interrupts assigned to the PCMCIA hardware by the onboard jumpers |
| PCMCIA BIOS | On<br>Off | Normally set to ON unless you're not using PCMCIA options and you want to use this BIOS areas for Upper Memory Blocks |

SETDOCK Second Screen

FIG. 39 illustrates the SETDOCK second screen:

From the second screen, the following options are available:

| Item | Notebook Only (Avail. Options) | MicroDock & Notebook (Avail. Options) | MicroDock & Notebook (Avail. Options) |
|---|---|---|---|
| Configuration | 1 thru 3<br>Custom | 1 thru 5<br>Custom | 1 thru 6<br>Custom |
| Notebook 9 Pin Serial* | COM 1 thru COM 2<br>OFF | COM 1 thru COM 4<br>OFF | COM 1 thru COM 3 |
| Notebook | COM 1 thru | COM 1 thru | COM 1 |

-continued

| Internal* | COM 2 | COM 2 off | through COM 2 Off |
|---|---|---|---|
| Station 9 Pin Serial* | N/A | COM 1 thru COM 4 off | COM 1 thru COM 4 Off |
| Station 25 Pin Serial* | N/A | N/A | COM 1 thru COM 4 Off |

| Item | Options | Description |
|---|---|---|
| COM 3/COM 4 Addresses | 2e8/2eO 220/228 338/228 3e8/2e8 | Selects address for COM 3 and COM 4 |

*Automatically set based on configuration unless Custom is selected.

SETDOCK Third Screen

FIG. 40 illustrates the SETDOCK third screen:
From the third screen, the following options are available:

| Item | Notebook Only (Avail. Options) | MicroDock & Notebook (Avail. Options) | Desktop & Notebook (Avail. Options) | Description |
|---|---|---|---|---|
| Config. | 1 thru 4 | 1 thru 2 | 1 thru 2 | Selects LPT port printer configuration |
| LPT1* | Disabled 3BCh-IRQ7 378h-IRQ7 278h-IRQ7 | Disabled 3BCh-IRQ7 378h-IRQ7 278h-IRQ7 | Disabled 378h-IRQ7 | |
| LPT2* | N/A | Disabled 3BCh-IRQ7 378h-IRQ7 278h-IRQ7 | N/A | |

*Automatically set based on configuration.

Exiting SETDOCK

To leave the SETDOCK utility, complete the following steps:
1. Press ESC from the main screen. The Exiting Setup Menu appears.
2. Select one of the following options:
   Based upon your input, you may return to the main screen, accept changes to Setup, or exit Setup (see the following chart).

| Key | Function |
|---|---|
| ESC | Returns you to the main screen |
| F4 | Saves all changes, exits Setup, and reboots |
| F5 | Loads default values for all pages |
| F6 | Aborts Setup without saving values |

CONFIGURING PCMCIA OPTION CARDS

To install PCMCIA option cards into the docking system, load the PCMCIA PhoenixCARD Manager Plus (PCM Plus) software. PCM Plus consists of the following components:
EZ-INSTALL—menu-driven installation program that loads required PCM Plus components onto your system. Two installation versions are available depending on your level of expertise: Quick Install (for beginners) or Advanced Install for advanced users.

Windows Information Utility (PCMCIA ICON)—displays PCMCIA card status for any cards installed in the PCMCIA slots (or indicate if a slot is empty). The status information includes configuration state of the card, card manufacturer's name, type of card (for instance FLASH, FAX/MODEM, or SRAM), and whether the card has a battery installed. If a card is installed that cannot be configured by PCM Plus, the status message will indicate this. The remainder of the PCM Plus software components are automatically loaded into your system when you run the EZ-INSTALL installation program.

Running PCM Plus Setup

A Setup program must be run after doing any of the following:
Installing one or more PCMCIA option card(s).
Removing one or more PCMCIA option card(s).

Running PCMCIA EZ-INSTALL

Use the following procedure to load PCM Plus onto hard disk:
1. Dock the notebook into the docking station.
2. Insert the PhoenixPCMCIA Utility diskette into the floppy drive in your notebook.
3. From the C: prompt, type the drive name A. (or B:) and press Enter.
4. From the A: (or B:) prompt, type: INSTALL and press Enter. The program displays the copyright screen.
5. Press any key and you will be prompted to enter the number of PCMCIA sockets in the machine. Type 2 and press Enter.
6. Press Q for the "Quick" or A for the "Advanced" Install. The Quick Install option allows you to accept defaults as presented or make minor changes and then press Enter. This is the desirable approach for an inexperienced user. More experienced users can select the Advanced Install option that allows the inputting of specific command line parameters to suit specific requirements.
7. Next, a series of questions pertaining to the installation of PCM Plus will be presented. Refer to the Phoenix PCMCIA Card Manager's User's Guide included with your system for further installation and operating instructions.

After installing (or removing) one or more ISA Expansion Cards, load and run Intel's ISA Plug-N-Play Configuration Utility.

Running the ISA Configuration Utility

The procedure for loading and using the ISA configuration utility is as follows:
1. Insert the installation diskette into the notebook floppy.
2. From Windows, select FILE, then RUN, Type: A:\SETUP and follow the instructions on installing the Plug-N-Play software to the hard drive.
3. To execute the ISA configuration Utility, double click on the Intel ISA Configuration Utility Icon in the Plug-N-Play window for further operating instructions. Also refer to the Intel Plug-N-Play User's Manual.

INSTALLATION OF SCSI DEVICES

After installing one or more SCSI devices onto the docking station, load and run the Adaptec EZ-SCSI for DOS/Windows program. EZ-SCSI is a menu-driven program that provides a convenient means of installing SCSI devices without having a technical background (defaults are provided that will get you up and running without a comprehensive understanding of SCSI bus parameters). A more advanced install option is also provided to permit tailoring the SCSI bus parameters for more advanced users.

Included with the EZ-SCSI program are device drivers to support all common SCSI devices, low-level and high-level SCSI disk formatting utilities, and a menu-driven install program that takes one through the configuration process and automatically installs the necessary device drivers on the docking system.

Running the EZ-SCSI Install program

The procedure for running the EZ-SCSI install program is as follows:

1. Connect the notebook computer to the docking station.
2. Insert the Adaptec EZ-SCSI diskette into the floppy drive in the notebook computer.
3. From the C: prompt, type the drive name A: (or B:) and press Enter.
4. Type INSTALL to start the install program.
5. Follow the instructions that appear on the screen. In most cases, respond to the prompts by pressing ENTER. This selects the factory default settings.
6. When installing a SCSI HDD, add the following command in the CONFIG.SYS file: LASTDRIVE=X where X is next drive available in your system (e.f. H,2).

USING THE SUPER SHUTDOWN UTILITY

Super Shutdown is an automatic shutdown configuration utility available on the BatteryPro and Productivity Software diskette. With this utility, the docking system exits Windows faster than with the standard Windows exit procedure. One can also select from a variety of user-specified shutdown features that will customize the way the user's computer shuts down and reboots. Examples include automatically closing all Windows and DOS applications as well as saving files.

Figure 41:
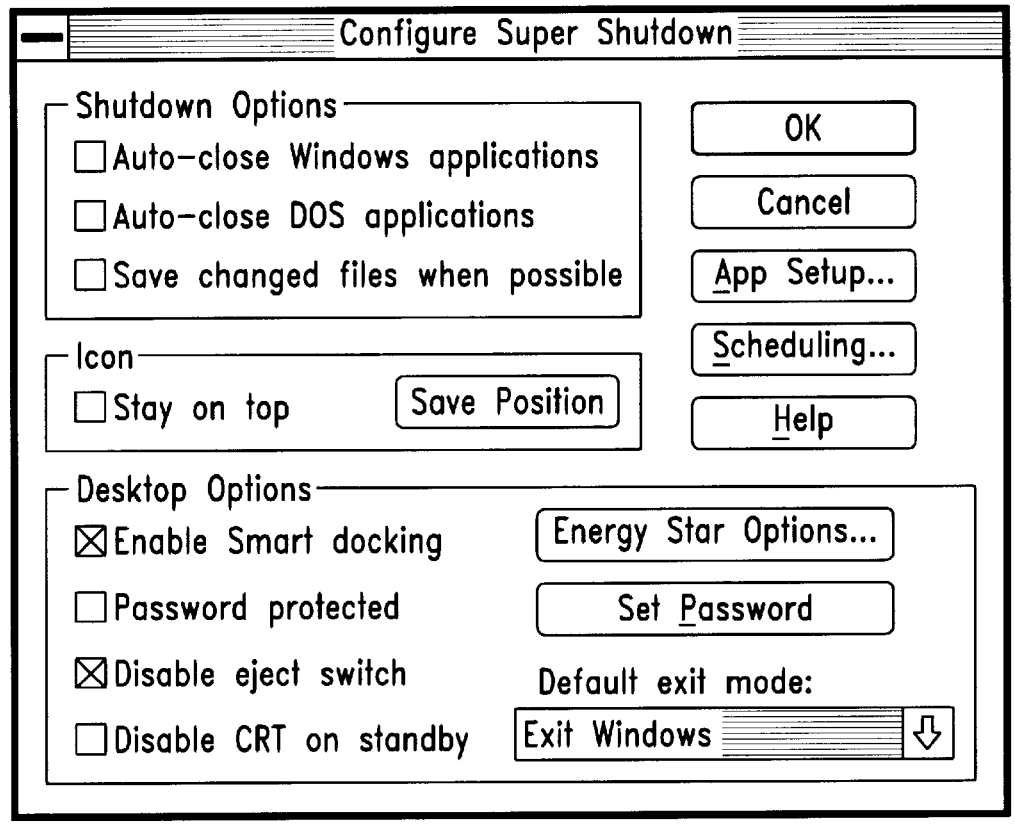
FIG. 41 illustrates Super Shutdown configuration menu.

To use Super Shutdown, single-click on the Super Shut down icon so that the Shutdown Configuration Menu appears, as illustrated in FIG. 41. If the Super Shutdown icon did not automatically load when entering Windows, the Battery Pro Utilities Diskette may need to be reinstalled.

This menu allows a user to set the following as defaults for system shutdown:

Options that allow customized software configuration upon system shutdown.

The position the user wants the Shutdown icon to appear on the screen of the notebook or external CRT.

Options that customize the notebook.

Use of the Dynamic Data Exchange (DDE) to communicate with Windows applications that support it.

Schedule time for automatic system shutdown

Maximum power savings for your computer during battery operations

Shutdown Options

Shutdown options allow a user to:

Terminate Windows applications unconditionally

Terminate DOS applications unconditionally

Allow any applications that support DDE (such as Microsoft EXCEL) to save and close any open files.

Send keystrokes to DOS and Windows applications to close and save any open files.

ICON

The icon options allow a user to select whether or not the user wants the Shutdown icon to stay on top of any overlapping windows or to automatically appear in the position in which it was located at the time of system shutdown.

DeskTop Options

The DeskTop Options allow a user to perform functions that affect the system connection and notebook ejection. These options include:

| Option | Description |
| --- | --- |
| Enable Smart Docking | Allows Super Shutdown to control the eject process. Shutting down causes the notebook to be ejected. pressing the eject button causes Super Shutdown to run first. |
| Password protected | allows you to set password privileges to access your default shutdown settings. See Set Password. |
| Disable eject switch | Disables the eject switch so that you cannot eject the notebook from the Docking Station manually. |
| Disable CRT on standby | Disconnects the CRT and modem on the notebook during Auto-Standby mode |
| Energy Star Options | Saves power usage by suspending operations at specified times. |
| Set Password | Only enabled if Password Protected is selected. Allows you to set and change passwords. |
| Default Exit Mode | Allows you to select conditions (such as exiting to DOS) that occur upon shutdown. |

DeskTop Energy Saving Features

Figure 42:
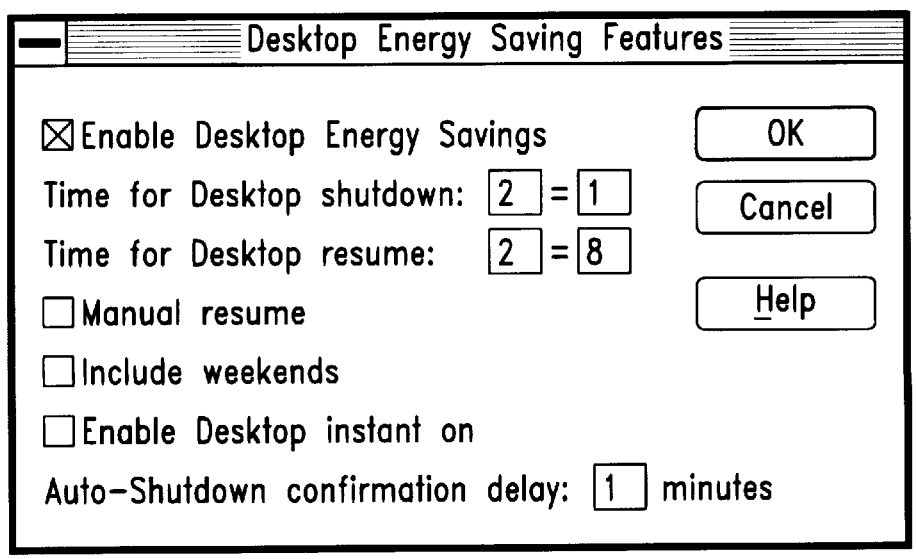
FIG. 42 illustrates DeskTop Energy Saving Features dialog box.

This feature is available when the Energy Star Options button is selected from the Shutdown Configuration menu. This feature causes the system to enter a suspended state automatically at specified times. The system will also automatically resume at specified times. If the system is in use, a message appears before the system is suspended to ensure automatic shutdown is desired. FIG. 42 displays the DeskTop Energy Saving Features dialog box.

The following options are available to customize energy saving features:

| Feature | Description |
| --- | --- |
| Enable Energy Saving Feature | Turns on the Energy Saving Feature |
| Time for DeskTop Shutdown | Allows you to specify the time you want the system to shut down |
| Time for DeskTop Resume | Allows you to specify the time you want the system to resume operation |
| Manual resumption of the DeskTop | Allows you to restart your system manually. System will not restart until user presses suspend button. |
| Include weekends | Allows you to select the Energy Saving Feature to operate every day of the week. |
| Enable Desktop Instant On | Lets the desktop to come up automatically when a key is pressed or the mouse is moved. |

-continued

| Feature | Description |
|---|---|
| Auto-Shutdown Confirmation Delay (in minutes) | If the system is currently in operation, this feature allows you to enter the number of minutes after which the system will assume you want to shutdown. |

Set Password

A user may set or reset a password for Super Shutdown. To set or reset a password, complete the following steps:

1. Select Password protected on the Shutdown Configuration menu.
2. Select the Set Password button.

Figure 43:
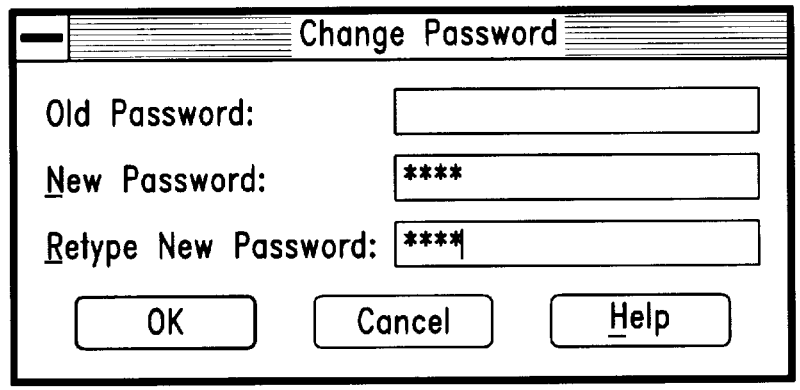
FIG. 43 illustrates Change Password dialog box.

The Change Password dialog box appears as illustrated in FIG. 43.

Entering a Password

To enter a new password.

1. Type the new password at the New Password line.
2. Retype the new password in the Retype New Password line.
3. Press ENTER.

Changing a Password

To change a password.

1. Type the old password in the Old Password line.
2. Type the new password at the New Password line.
3. Retype the new password in the Retype New Password line.
4. Press ENTER.

EXIT MODES

To select an exit mode for Shutdown:

Single click on the Shutdown icon and select the exit mode from the menu, or

Select the Default Exit Mode from the Shutdown Configuration menu.

The following table explains exit mode available from the Super Shutdown Utility:

| Shutdown Method | Description |
|---|---|
| Exit to MS-DOS (default) | Takes you to the MS-DOS prompt after shutdown. |
| Suspend | Enters the power saving mode |
| Exit to MS-DOS and Suspend | Takes you to the MS-DOS prompt and enters the power saving mode |
| Exit to MS-DOS and Eject | Takes you to the MS-DOS prompt and then ejects the notebook from the Docking Station |
| Restart Windows | Exits and then restarts Windows (useful when configuration changes have been made or application errors must be cleared. |
| Reboot System | Exits Windows and reboots the system. |

Application Setup

Figure 44:
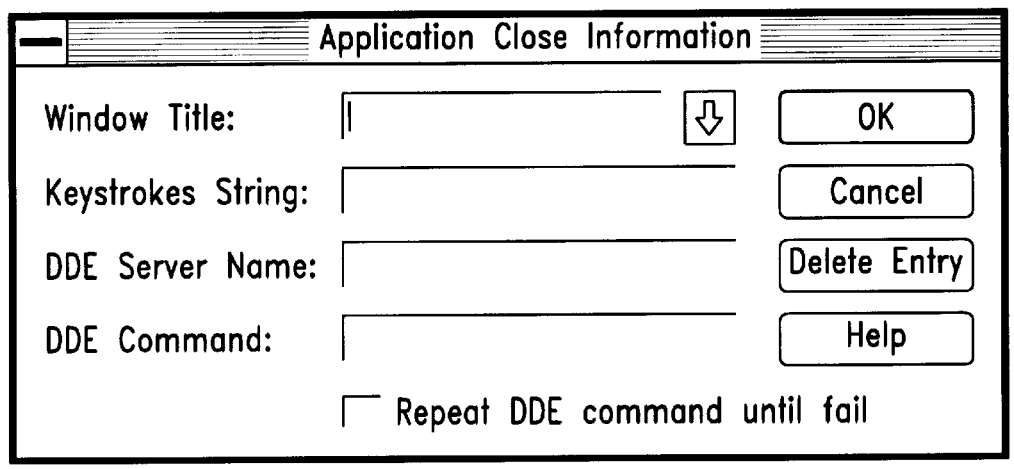
FIG. 44 illustrates Application DDE Information dialog box.

The Application Setup button allows a user to use the Dynamic Data Exchange (DDE) to communicate with Windows applications that support it. Such applications are called DDE Servers. When selected, the Application DDE Information dialog box appears as shown illustrated in FIG. 44.

From this dialog box, the following information is required:

| Selection | Description |
|---|---|
| Window Name | The window title that appear in the title bar. Clicking on the button next to the text box in the Application Close Information dialog box drops down a list of applications that are currently set up. |
| Keystrokes String | The DDE command or the string of keystrokes used to close any open files. For instance, to close an open Winword file, the keystrokes are ALT + F4. |
| DDE Server Name | The name that the application responds to for DDE communication (such as Winword). |
| DDE Command | The command sent to the DDE from the application. The Application Close Information dialog box checks this line if Keystrokes String does not function. To obtain DDE Command Information, refer to the User's Manual for your specific application or call the manufacturer. |
| Repeat DDE command until fail | If selected, the DDE command specified in the Keystrokes String will be sent repeatedly until an error message is received. For example, if an application has multiple files open, the command is sent until each file is closed. When no more open files exist, the error message is sent. |

The DDE Server and command string must be specified by the application software.

Scheduling

Figure 45:
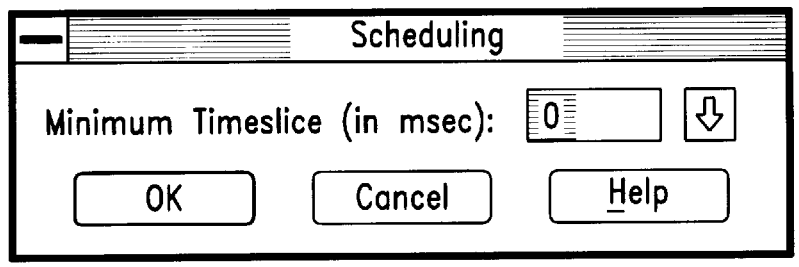
FIG. 45 illustrates Scheduling dialog box.

The Scheduling feature of Shutdown is used during battery operation of your computer. If a power savings driver is active on your computer, Shutdown works with it to reduce power consumption while running Windows. The lower the value, the greater the savings. FIG. 45 illustrates an example of the Scheduling dialog box.

Suggested Values:

Microsoft Word for Windows v 1.1 or lower or Microsoft Power Point—value=100

Games—value=130 to 200

The following DOCK command allows you to set arguments for various Docking System configurations. The Arguments typed at the MS-DOs prompt as follows: DOCK [ARGUMENT]

The following arguments are available with the DOCK command:

| Argument | Definition | Message |
|---|---|---|
| (No argument), U, ?, HELP | Displays help for the DOCK command | N/A |
| CRT = ON | Maintains a connection to the CRT and Modem on the notebook during Auto-Standby mode | CRT and Modem connector will remain connected during Auto-Standby |
| CRT = OFF (Default) | Disconnects the CRT and Modem on the notebook during Auto-Standby mode | CRT and Modem connector will be withdrawn during Auto-Standby |
| EJECT | Allows you to remove the notebook from the Docking Station | Ejecting unit |

-continued

| Argument | Definition | Message |
|---|---|---|
| SMART = ON | Enables the Smart Mode for the Docking System required for other dock options to function correctly. At DOS, if Power/Standby Key is pressed, the unit will not power off (goes into Standby). Pressing Standby/Power Key again will resume operation from Standby. | Smart Eject = ON |
| SMART = OFF (Default) | Disables the Smart Mode for the Docking System. At DOS, if Power/Standby Key is pressed, the unit will power off. Caution: Unsaved DOS Files will be lost. | Smart Eject = OFF |
| STATUS | Displays the current status for the Smart Mode Options. | N/A |
| SUSPEND (not available for non-E series notebooks) | Puts the system in Auto-Standby mode immediately. | N/A |
| VERSION | Displays the version and copyright information. | N/A |

INTELLIGENT DOCKING SYSTEM

An intelligent docking system is the result of a combination of docking station system 9 and the previously discussed software.

The microprocessor (U140 in FIG. 33) in docking station 10 drives motors 47 and 90 in a manner similar to the way motors are driven in a printer (i.e. open loop stepper with sequential switches). The microprocessor also provides intelligent processing to portable computer 13 and applications across the bus {like in TI's PCMCIA bus patent but without the controller on the main board}. The microprocessor addresses are decoded to the CPU in portable computer 13 and the CPU application software writes back to the microprocessor communications channel, which it then turns on. The result is back and forth communications between the microprocessor and the CPU, e.g., what is the status of may battery? or which key was hit? or it reads the auxiliary keyboard. If the CPU likes the communications it receives from the microprocessor, it gives commands to the microprocessor to do something with the information, e.g., turn the power off but wake-up in a set number of minutes or hours. The intelligent part is the back and forth communications.

Load/eject switch 16 and standby/on power switch 12 are free form switches. Docking station 10 controls the power to portable computer 13. When load/eject switch 16 is pressed and no portable computer is in docking station 10, the docking station anticipates that a user may want to load a portable computer (not yet within software control). When a portable computer 13 is deposited on tray 39 of the docking station, docking station 13 performs the algorithms needed to activate the motors and mechanical mechanisms that are needed to move the portable computer into a docking position. The docking station also performs a reset to the CPU, provides power to the docking system, e.g., to bring it up so that the CPU (486, 586 or pentium) and application logic star talking to the microprocessor.

The intelligent docking system also provides a dumb mode/smart mode option. In dumb mode, the microprocessor in docking station 10 has the opportunity to do things on its own. As an example, in dumb mode, standby/on power key 12 is an on/off switch. But, if in smart mode, the microprocessor is not allowed to interpret the key as anything other than a key switch. The 486 application reads the key 12 and decides what to do with it. It may do nothing with it, or it may send back a command, such as put into suspend mode, or withdraw the VGA port. As a result, more functions are performed based on what the key hit was based on user programmable functions. As an example, set a suspend event for Windows. Windows reads the suspend event and does whatever it wants to, such as close filed down after which it suspends. The system also has the ability to suspend without telling Windows and the ability to eject the system from a software application—Super Shutdown feature.

The Super Shutdown feature allows the microprocessor to talk to the underlying software in the CPU (486 as an example) and through the microprocessor's actions and the user's set up actions, the microprocessor translates that as the code in the CPU to commands to the microprocessor, if present, or if not, terminates to other commands. The feature sets up and closes Windows applications, closes DOS applications and saves changes to files. The feature will not allow the system to shut down and eject the portable computer until all the pre processing is done. When smart docking is enabled, the CPU can talk to the microprocessor. The feature allows the disabling of the eject switch to prevent accidental ejection, provides pass word protection, set time for automatic shut down of the system, wakes up the system and facilitate manual or automatic resume. The feature also allows the system to be locked through the communications port which the CPU uses to send instruction to the docking station. The microprocessor examines the key lock status and will not allow ejection until the key lock is clear.

The processor in docking station 10 talks to the application processor CPU in the portable computer and allows an interface to the user. The user makes an interface directly to the application that can talk to the microprocessor in the docking station or go through a third party such as the BATTERYPRO feature (which is insensitive to the operating system). The system can go through a normal Windows eject system—e.g., file close/eject and depending on what the user set up and turn it into shut the system down and eject the portable computer or turn the power off and wake up later. The system also has the ability to remember everything when it wakes up or do a cold boot or have the ability to warm eject or hot eject and hot dock.

The SETDOC feature goes in and programs common hardware in any docking station and configures communication ports on the portable computer. SETDOC tells the portable computer what kind of docking station it has connected to. During plugin, the microprocessor controls the speed and force of motors 47 and 90. During slew in (period of connector movement during connector connection of portable computer connectors), the motors are slowed down right before the connector of the docking station connect with the connectors on the portable computer. When the connectors on the portable computer begin to mate with the connectors on the portable computer, the drive current to the motors is increased to plug the connectors hard. This feature prevents user smashed fingers and reduces connector damage due to incorrect connector coupling.

PCMCIA slots in a docking station is another innovative feature of the present invention. Unlike current portable computers having PCMCIA slots and a PCMCIA controller in the portable computer, the PCMCIA controller in the present invention is in the docking station. Other advantages of the docking station system include the previously mentioned visual indicator in standby/on power key and power indicator 12 in docking 10 for standby status and a visual indicator between standby/on power key and power indicator 12 and load/eject switch 16 for indicating portable computer battery status. The microprocessor in the portable computer can communicate what's happening to the battery to the system across the interface.

SYSTEM EXPANSION CAPABILITIES

Docking station 10 contains build-in controllers, option sockets and bays and configuration/driver software to add the following expansion options: up to six Industry Standard Architecture (ISA, AT-type) Expansion Boards (three must be half-size cards); up to four internal mass storage devices (e.g. two non-SCSI devices and two SCSI-II compatible SCSI devices such as hard disks, tape drives, CD ROMs, etc.); and up to two PCMCIA option devices may be installed in the external slots. These can be used to add type I, II, or III compatible PCMCIA cards. These two PCMCIA slots support either 3-volt or 5-volt card technologies.

ADDING INDUSTRY STANDARD EXPANSION CARDS

Figure 46:
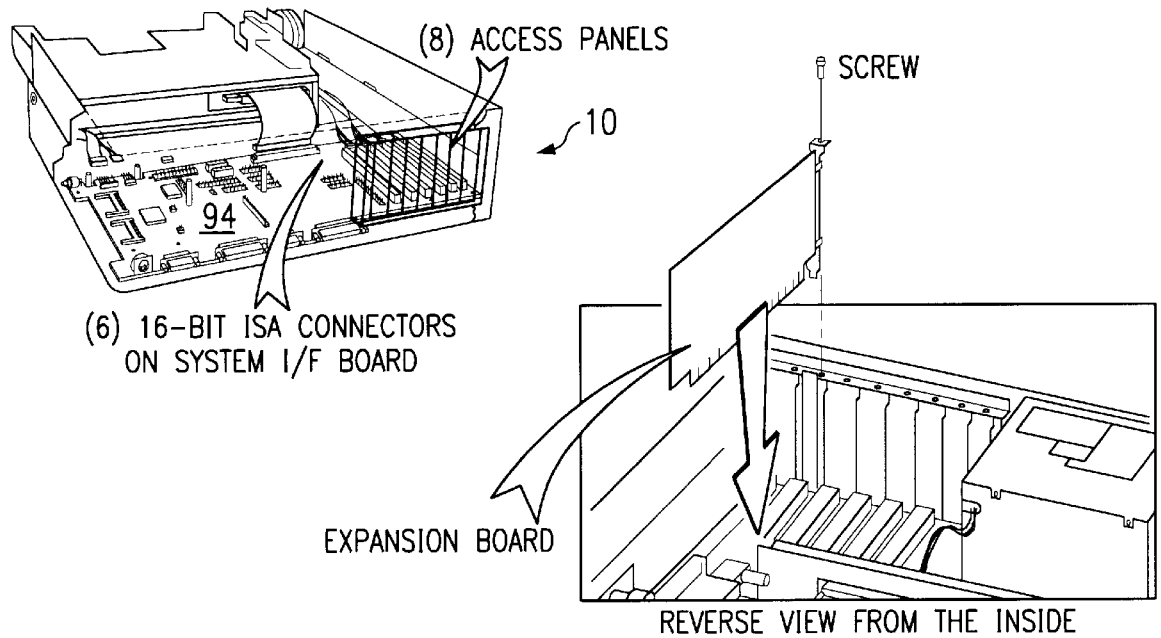
FIG. 46 illustrates internal connectors in the docking station that permit the installation of up to six industry standard (ISA or AT-type) Expansion Boards (network cards, video cards, internal Data/FAX Modem cards, etc.).

Docking station 10 has internal connectors and supporting software to permit the installation of up to six industry standard (ISA or AT-type) Expansion Boards (network cards, video cards, internal Data/FAX Modem cards, etc.), as illustrated in FIG. 46 to allow system growth. An ISA Plug-N-Play Configuration manager provides software support for ISA card installation.

ADDING INTERNAL/EXTERNAL SCSI DRIVES

Figure 47:
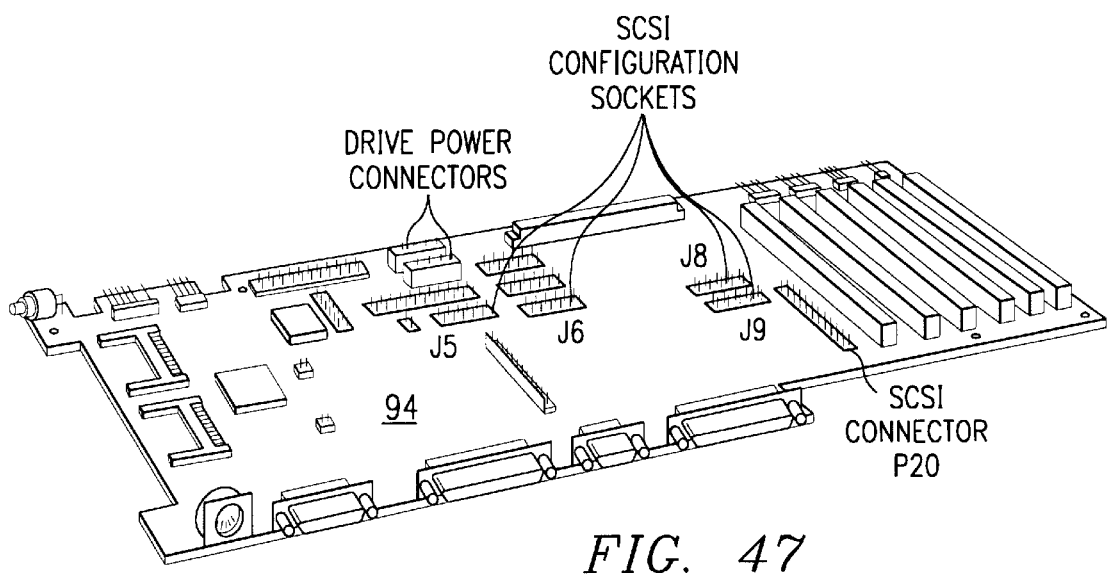
FIG. 47 illustrates built-in controllers and on-board signal/power connectors on the main board of the docking station that allow the installation of up to two internal SCSI Devices or a combination of up to seven internal/external SCSI devices.

Docking station 10 also contains built-in controllers, on-board signal/power connectors and configuration software (EX-SCSI) that allows the installation of up to two internal SCSI Devices or a combination of up to seven internal/external SCSI devices, as illustrated in FIG. 47, using an optional SCSI connect kit. An "Install" program (Adaptec EZ-SCSI) downloads the appropriate SCSI drivers and sets up the necessary Configuration files.

EXTERNAL SCSI EXPANSION CAPABILITIES

An optional External SCSI Kit (TI Part No. 978867-0001) is available if more than two internal SCSI devices or one or more external SCSI devices are to be installed. The kit includes a special 6-connector harness with four internal SCSI ports and a 50-pin SCSI connector that is installed on the rear panel of docking station 10. The special harness and external 50-pin connector allow daisy chaining of up to seven internal/external SCSI devices.

ADDING PCMCIA OPTIONS

Docking station 10 comes equipped with two side-access, external slots that accommodate the credit-card size, Type I, II, or III PCMCIA options (EG. Data/FAX Modem, Networking Card, Hard Drive, etc.). These can be either 3-volt or 5-volt PCMCIA options. A controller (adapter) in the docking station 10 provides the necessary hardware interface between the PCMCIA card slots and the portable computer 13. The PhoenixCARD Manager Plus software provides the necessary configuration driver support.

REAR PANEL CONNECTORS

Docking station 10 brings all ports (connectors) to the rear of the unit for easy connection to external devices (printer, CRT, keyboard, Mouse, External SCSI peripherals (with the optional SCSI kit), RJ-11 (or RJ-45) telephone jack for the portable computer's optional internal Data/FAX Modem, etc). As illustrated in FIG. 4, the docking station's standard set of connectors include:

- VGA Monitor, 15-Pin, D-Sub Connector—This is a pass through port from the portable computer. The port is programmable for up to 256 colors in either 640×480 or 800×600 modes. Can also be programmed for 1024× 768 monitors with up to 16 colors.
- Mouse, 6-Pin, Mini-DIN Connector—This is a pass-through port from the portable computer. This port supports an external PS/2 Mouse.
- 101 Keyboard, 5-Pin, DIN Connector—supports a 101— compatible external keyboard.
- Game Device, 15-Pin, D-Sub Connector—used for attaching joy stick or other game port compatible device.
- Parallel Device, 25-Pin, D-Sub Connector - BI - Directional EPP/ECP Parallel Connector—used for attaching a parallel printer or other parallel interface device (e.g. Document Scanner).
- RS-232 Serial, 9-pin, D-Sub Connector; (with 16550 UART)—used for attaching a serial printer, external modem or other serial device.
- RS-232/422 Serial Device, 25-Pin, D-Sub Connector (with 16550 UART)—used for attaching a 25-pin serial device.
- RJ-11 Telephone Jack or RJ-45 Telephone Jack (depending on dash number of docking station)—This is a pass-through port from the portable computer's optional internal modem that is used for connecting to the telephone system or Data Access Arrangement (DAA).

PCMCIA/EXPANSION CARD OPTION CONNECTORS

All connectors on ISA Expansion cards and PCMCIA Option devices are available on the exterior of the unit.

INSTALLING INTERNAL OPTIONS

REMOVING TOP COVER

Figure 48:
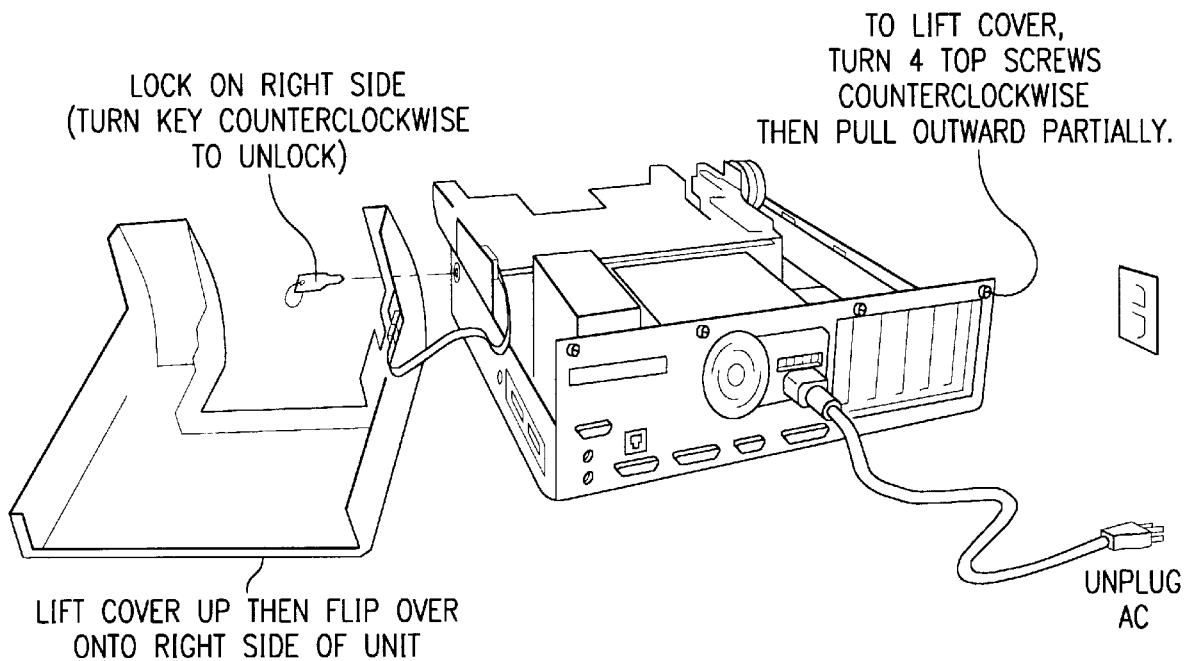
FIG. 48 illustrates the procedure for removing the top housing cover of the docking station.

Top housing cover 10a must be removed to add most internal options. Cover 10a can be removed as follows:

1. Ensure that portable computer 13 is out of docking station 10, that the power cord is removed from the back of the docking station, and that the tray is extended (out) position.
2. Remove the removable portion 10b of top housing cover 10a by sliding the latches inward.
3. Hand loosen (or use a straight slot screw driver if screws are tight) the four large screws along the top of the rear panel on the docking station.
4. Lift the top housing cover 10a upwards from the rear until top housing cover 10a is almost vertical.
5. Flip top housing cover 10a over next to the right side of docking station 10, as illustrated in FIG. 48.
6. When re-instating top housing cover 10a, carefully work the cover into place. Ensure that the cover clears the QuickPort on the right side and that the excess control panel cable is carefully tucked in. Also unsure that the control panel cable connector is securely attached to the System Interface PWB. When the cover is correctly positioned, hand tighten the four screws across the top of the rear panel.

INSTALLING INTERNAL MASS STORAGE DEVICES (OPTIONAL)

Docking station 10 contains an onboard SCSI Controller capable in interfacing up to seven Small System Computer interface (SCSI) devices with the desktop system and a Floppy Controller that can drive a Floppy-type device.

The System Interface PWB also contains a SCSI signal connector (P20), a Floppy Signal Connector (P22) and two disk power connectors, P28 and P29 (provides power for either SCSI devices or standard Floppy Drive devices).

Docking station 10 contains two types of bays or facilities for installing mass storage devices including:

Two front-mounted storage bays (visible from the front)—typically used to hold SCSI CD ROM drives(s) or optionally a dual floppy drive (combo unit) containing both a 5¼ inch and 3½ inch floppy drive.

Two internal bays in the HDD Bracket Assembly—typically used for installing SCSI Hard Disk Drives (if installing an internal Floppy Drive in the docking station, the floppy drive in the portable computer is disabled).

SCSI Signal Adapter Cable (contains three signal connectors that permit connecting one or two SCSI devices to the onboard SCSI connector, P20). One end of the cable must be connected to SCSI Connector. The middle connector is used for attaching the first SCSI device and the other end connector is used for attaching the second SCSI device (either now or later).

Two Power Adapter cables that provide power connections for up to four mass storage devices (can be attached to either SCSI or Floppy Drive devices).

Figure 49:
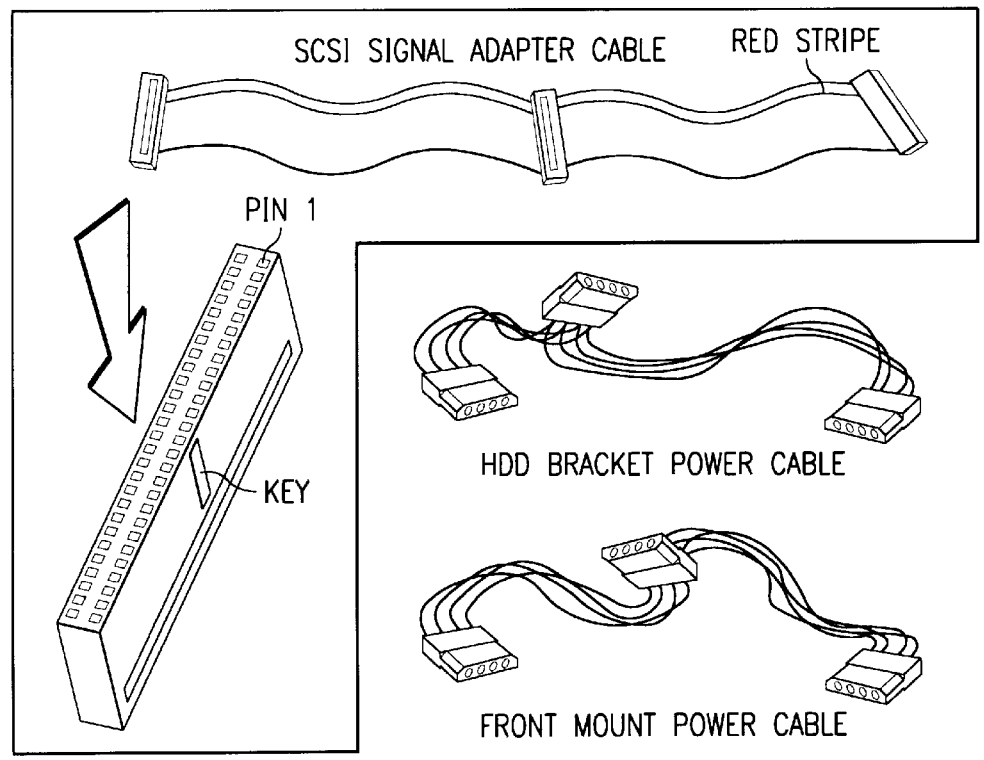
FIG. 49 illustrates mass storage device installation cables.

The standard set of mass storage cables are illustrated in FIG. 49. A floppy Interface Cable, typically supplied with the drive, is required to install a front-mount, non-SCSI Floppy Drive. If more that two internal SCSI device or one or more external SCSI devices are to be installed, an SCSI Connector Kit, TI Part No. 978867-0001 is required.

INSTALLING ONE OR TWO FRONT-MOUNTED DEVICE(S)

Figure 52:
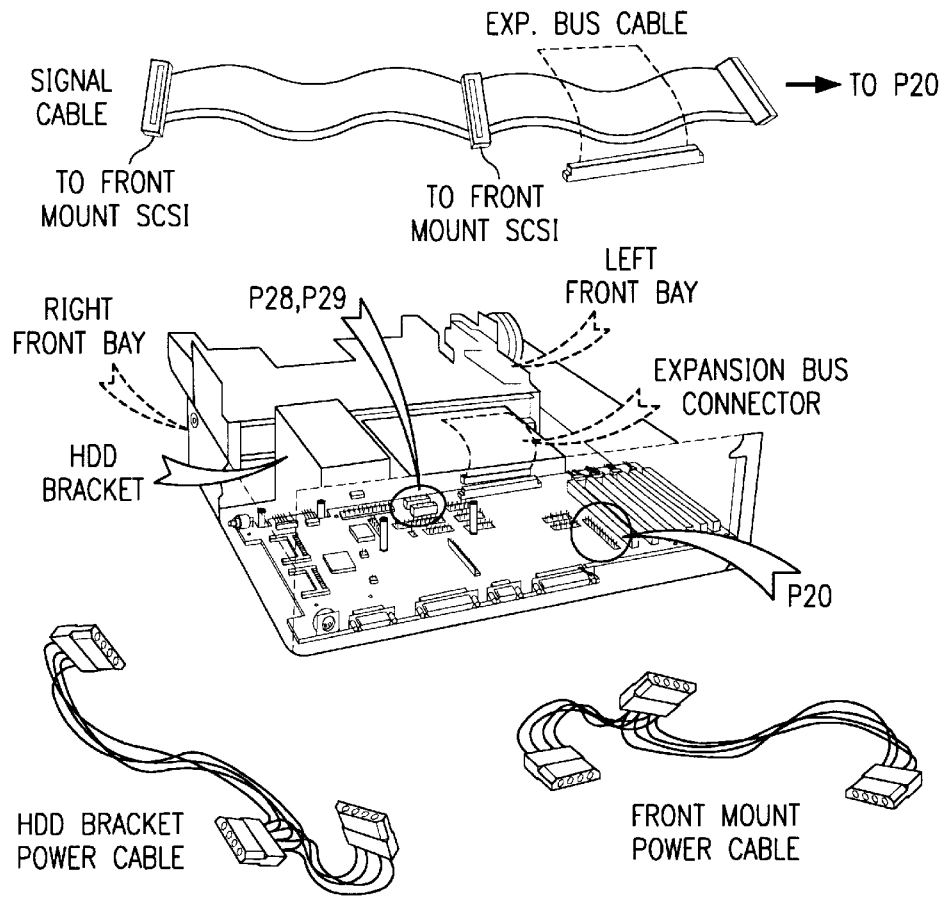
FIG. 52 illustrates install SCSI signal and power cables.
Figure 53:
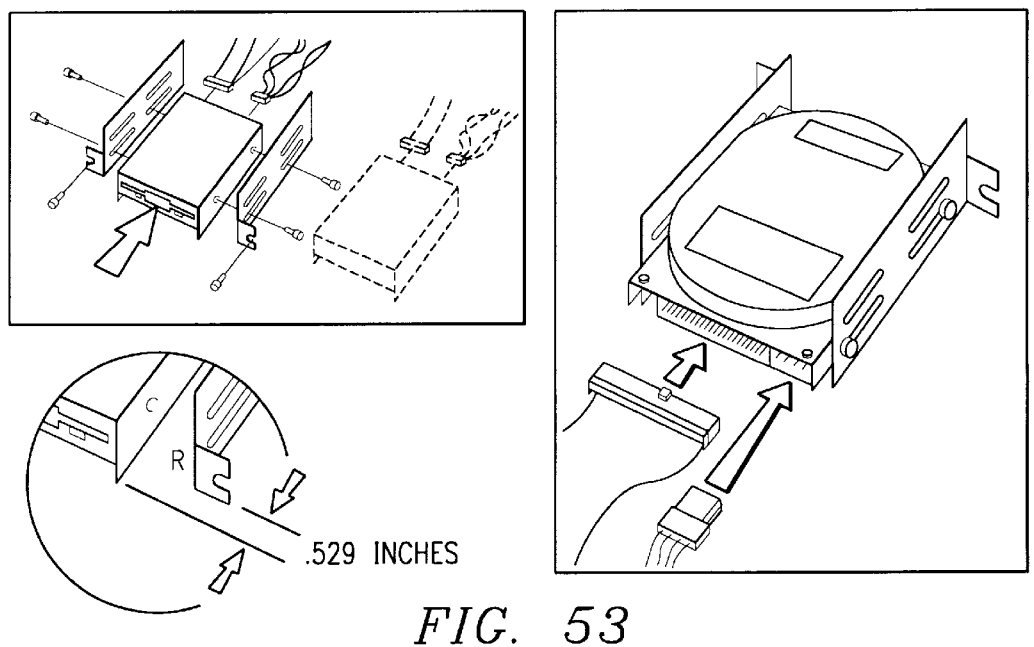
FIG. 53 illustrates attaching cables to drive.

To install front-mounted devices (e.g. SCSI CD-ROM Drive and/or Dual Floppy Drive), use the following procedure:

Follow steps 1–5 of REMOVING TOP COVER section;

6. Remove the four screws from the top of the bezel accessible through the holes along the front edge of the transport assembly, as illustrated in FIG. 50.
7. Remove the four screws securing the front bezel to the frame and remove the bezel.
8. Remove the two screws securing the left side pair of brackets and remove the brackets.
9. Install the brackets (noting right and left designations) onto the mass storage device using screws supplied with the Drive. Ensure that the front edge of the drive protrudes approximately ½ inch beyond the edge of the brackets so that the drive will fit flush with the bezel when installed.
10. If installing a floppy device, substitute a Floppy Signal Interface Cable for the SCSI Cable Adapter and attache one end of the cable to the HDD Connector, P22, illustrated in FIG. 51. Locate the SCSI Signal Interface Cable (ribbon cable with three connectors), as illustrated in FIG. 52. Lay either end of this cable next to the SCSI Connector P20). Remove the copper-colored Expansion Bus connector from the PWB and fold out of the way. Route the center connector of the SCSI Interface Cable through the opening at the base of the system and out to the from of the docking station. Lay the other end of the cable in the adjacent bay (note that the "front-mount" power adapter has a connector in the center of the cable whereas the power able for the internal drives has two connectors near one end for attaching to drives in the HDD Bracket Assembly).
11. Locate and route one end of the "front-mount" power cable through he same opening. At this point, one end of the power adapter and the center connector of the SCSI cable should just clear the front of the docking station.
12. Locate pin 1 on the Signal Interface Cable (adjacent to the red wire) and pin 1 on the signal connector on the drive; attach the Signal Interface Cable to the drive connector (note that SCSI devices also make use of a tab key. In this case, align the elevated tab on the interface connector with the key cutout on the drive).
13. Connect the power connector (protruding from the front bay opening) into the power connector on the floppy Drive, as illustrated in FIG. 53. If installing two or more SCSI devices, the terminating resistors must be removed from all except the last SCSI device in the chain.
14. While holding the signal and power cable at the rear of the unit, slowly insert the drive into the front bay while taking up the cable slack at the rear.
15. Using the previously removed screws, attach the drive brackets to the disk drive and then installing the assembly in the docking station front bay. If a second front mount device is not being installed at this time, replace the bezel at this time.
16. Plug the end connector of the SCSI Interface Cable into P20 (note the location of pin 1 on the connector and match up the red wire with pin 1).
17. Install the middle power connector from the Power Adapter Cable into connector P29 (bottom power connector). Tuck the remaining power connector under the right side drive bay for later use.
18. Reinstall the Expansion Bus connector by pressing firmly on the ends of the connector avoiding the pins on the back of the connector. If installing a second front mount device, and both are SCSI devices, use the remaining signal and power connectors from the adapter cables installed with the first device install the termination device on the second SCSI device. If the second device is a Floppy Drive, procure a Floppy Interface Cable and attach between the Floppy signal connector and P22 on the Signal Interface Board. Use the extra power connector tucked under the right side bay.

INSTALLING SCSI DRIVES IN THE HDD BRACKET

If installing one or two internal SCSI Drives:

1. Place the docking station 10 on a table top where you can easily get to the front and back section of the docking station. Ensure that the docking platform of portable computer 13 is fully extended (out) position (if not, press load/eject key 16.
2. Remove the external CRT display 15 from the top of the docking station (if present); disconnect the power cord from the rear of the docking station and remove the lid and top cover (if not already done).

Figure 54:
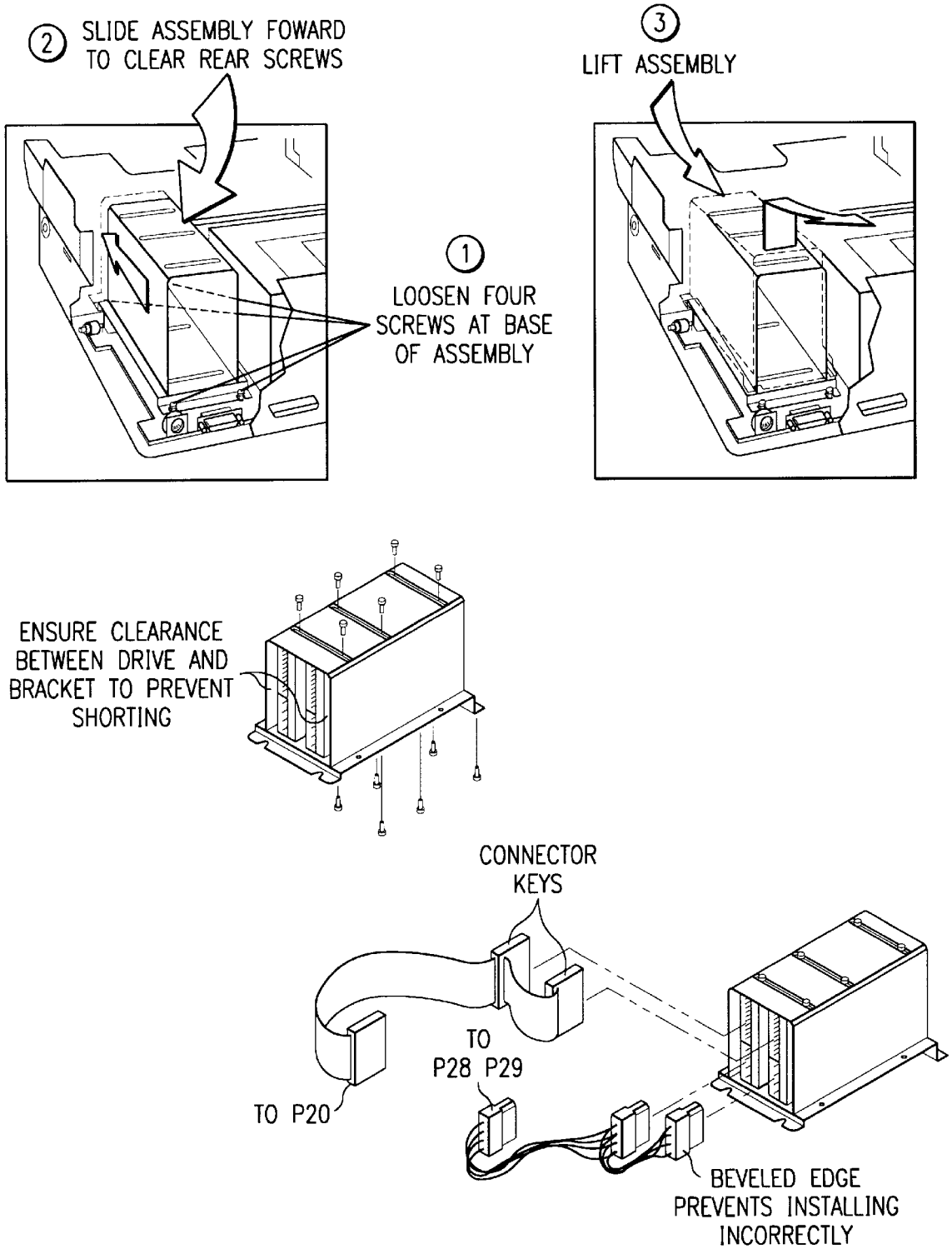
FIG. 54 illustrates installing internal hard drives.

3. Using a Phillips screw driver with a five-inch long shank, loosen (but don't remove) the four screws at the base of the HDD Bracket, as illustrated in FIG. 54. Slide the bracket forward to clear the back two screws; then slide the bracket backward to clear the front screws and remove the bracket.

4. Install the hard drives as shown in the previous figure with connectors facing to the right and toward the front of the unit. Ensure that clearance exists between the side walls of the bracket and each installed device; tighten the top and bottom screws (supplied with the drives).

5. Reinsert the HDD bracket with drive(s) installed (carefully insert the front of the bracket underneath the two screws on the standoffs; then slide the back of the bracket underneath the rear two screws; tighten all four screws).

6. If you have previously installed one SCSI device (either as a front mounted device or in the HDD Bracket), you have an extra power connector and signal connector ready to be connected on the second SCSI device. If this is the first installed SCSI device, plug one end of the SCSI signal cable into SCSI connector, P20. Then route the second connector over to the SCSI device you've just installed and connect it to the signal connector (align the connector keys and ensure that the red strip of the interface cable goes to pin 1 on the device connector). It may be necessary to disconnect the Expansion Bus connector from the board and route the SCSI signal cable underneath the Expansion Bus Connector; then reconnect the Expansion Bus Connector.

7. If an available power connector is on hand, route it to the power connector on the device just installed. If not, install the end connector of a power cable onto connector P29 or P28 and connect the next available connector on the harness to the power connector on the device just installed. When install internal SCSI drives only, the correct terminators are provided on the System Interface Board. If installing both internal and external SCSI devices, the onboard terminators must be disabled.

INSTALLING MORE THAN TWO SCSI DEVICES

If installing more than two SCSI devices in the docking station or one or more SCSI devices external to the docking station, an SCSI Connector Kit option, TI part No. 0978867-0001, is required. The kit includes a six-connector signal interface cable and a four-connector power cable. The end connector on the signal cable is an external connector that attaches to the docking station's rear panel (used for connection to external SCSI devices).

Use the following procedure to install more than two internal SCSI devices:

1. Place docking station 10 on a table top to provide easy access to the front and back section of the docking station. Ensure that the portable computer docking platform is in the fully extended (out) position (if not, press load/eject key 16).

2. Remove the external CRT 15 from the top of the docking station (if present); disconnect the power cord from the rear of the docking station and remove the lid and top cover.

3. Remove the four screws from the top of the bezel accessible through the holes along the front edge of the transport assembly.

4. Remove the four screws securing the front bezel to the frame and remove the bezel. If there is already a front-mounted SCSI device and installation of additional SCSI devices is anticipated; remove the installed SCSI device(s) and disconnect the three-connector interface cable. All SCSI drives should be interconnected using a six-connector interface cable.

Figure 55:
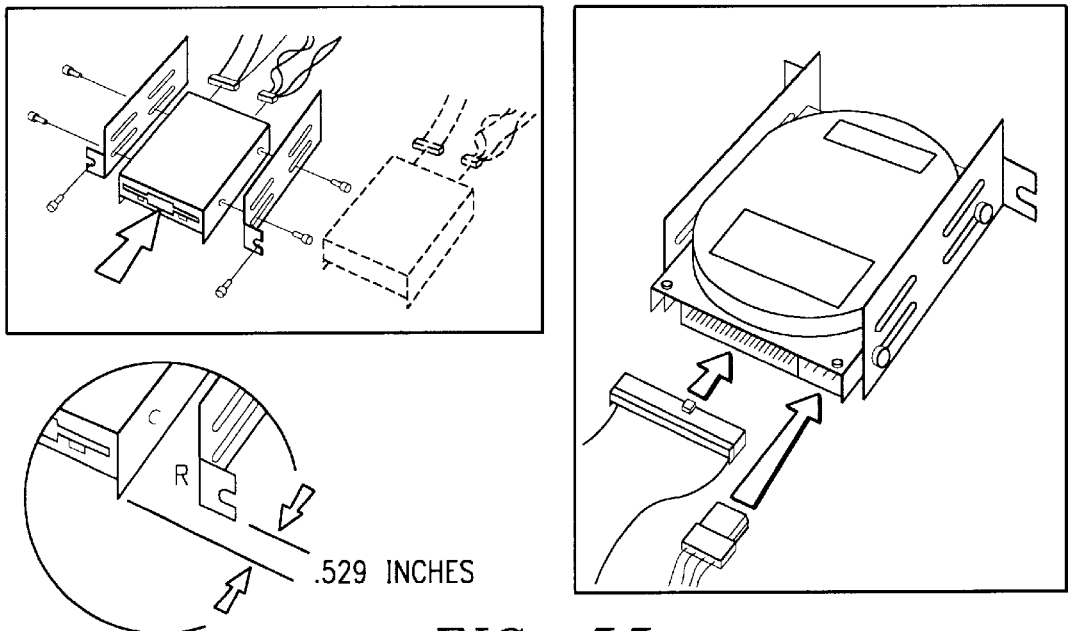
FIG. 55 illustrates installing front mounted SCSI devices.

5. Remove the screws securing the brackets and remove the brackets (note that the left and right brackets are different), as illustrated in FIG. 55.

6. Install the two brackets (the left side bracket is marked by the letter L on the front edge of the bracket; the right bracket contains the letter R.) on the SCSI Drives using screws supplied with the Drive. Ensure that the front edge of the drive protrudes approximately ½ inch beyond the edge of the brackets so that the drive will fit flush with the bezel when its installed.

Figure 56:
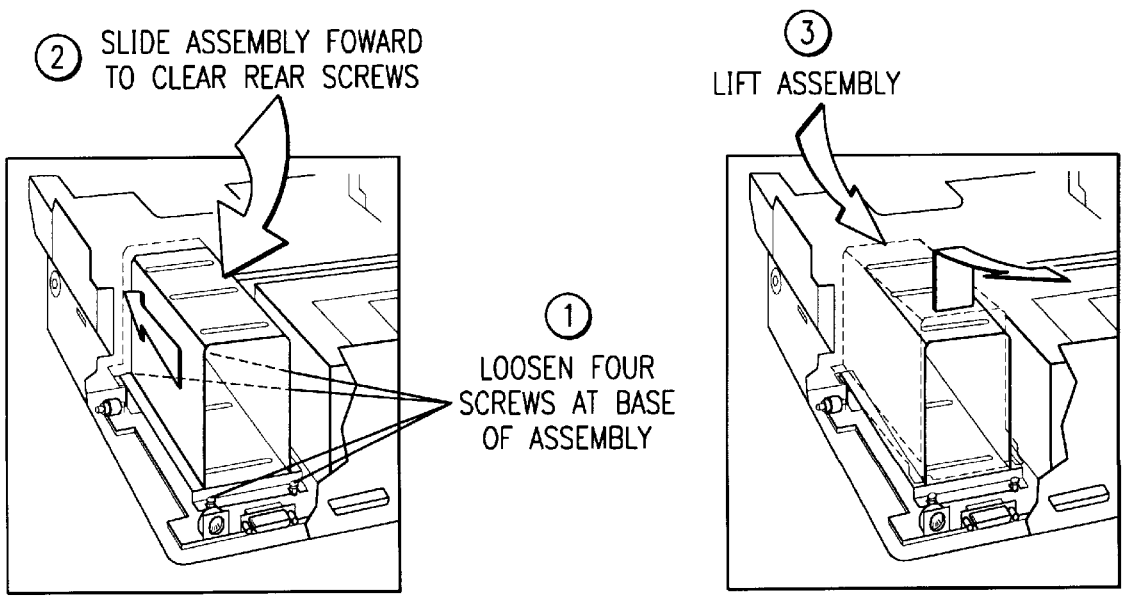
FIG. 56 illustrates removing the HDD bracket.

7. Using a Phillips screw driver with a five-inch long shank, loosen (but do not remove) the four screws at the base of the HDD Bracket, as illustrated in FIG. 56. Slide the bracket forward to clear the back two screws; then slide the bracket backward to clear the front screws and remove the bracket. If a hard drive was previously installed in the HDD Bracket, remove the three-connector interface cable from the Drive(s) and from the SCSI Connector (P20) on the System Interface Board—a 6-connector interface cable will be installed.

8. Lay out the 6-connector interface cable across the rear of the docking station with the external connector near the cutout in the rear panel and the opposite end connector adjacent to the onboard SCSI Connector, P20. Note the following connector assignments, as illustrated in FIG. 57: Connector No. 1 (end opposite the external connector) attaches to P20 on the board; Connector No. 2 attaches to left-front mounted SCSI device (if used; otherwise tucked into the vacant area in the back of the bay); Connector No. 3 attaches to the SCSI device in the right-front of the docking station (if not used, tuck into the space in the right-front bay); Connectors 4 and 5 attach to two SCSI devices in the HDD bracket; and Connector No. 6 is installed in the cutout on the docking station rear panel.

9. Route Connector No. 2 through the opening at the base and out to the front of the docking station.

10. Fold Connector No. 3 back under the right-front bay area. Route connectors 4 and 5 to the area near where the front of the HDD bracket will later be installed and route connector No. 6 to the rear of the docking station near the cutout.

11. Route one of the two power cable supplied with the system from the left-front bay area to either of the two power connectors on the board. Tuck the remaining power connector underneath the right front bay area.

12. Route the lon 94-connector) power adapter cable supplied with the SCSI connector kit option as follows: one end tucks under the right-front bay. The second connector is installed on either P28 or P29 on the System Interface Board. The third and fourth connectors attach to hard drives in the HDD assembly.

13. Install up to two hard drives in the HDD bracket with connectors facing to the right and toward the front of the unit. Ensure that clearance exists between the side walls of the bracket and each installed device; tighten the top and bottom screws. Install the signal and power connectors on each drive.

14. Reinsert the HDD bracket with drive(s) installed (carefully insert the front of the bracket underneath the two screws on the standoffs; then slide the back of the bracket underneath the rear two screws; tighten all four screws).

15. Reinstall the Expansion Bus connector by pressing firmly on the ends of the connector without touching the pins.

INSTALLING ISA EXPANSION BOARDS

The docking station main board contains six slots for accommodating ISA Expansion Cards (Networking Cards, Video Cards, Modem cards, etc). If an Expansion Option is to be added, check the dimensions of the card (cards larger than half-size must be installed in the out three slots; half-size cards may be installed in any of the slots).

1. If any jumper or switch hardware configuration is required on the card, perform this configuration task at this time.
2. Select an available slot for installing the option but do not install the option yet. If the device is small enough, select an installation slot nearest the power supply; otherwise select a slot from the outer group of three slots (farthest from the power supply).
3. Most Expansion devices will require a single I/O connector panel. In this case, use a Phillips screw driver to remove the metal blank filler panel on the rear of the docking station, as illustrated in FIG. 46. If installing a multi-function option with several ports (connectors), select one of the inner slots and remove two or more blank filler panels to accommodate the I/O panel on the multi-function board.
4. Install the expansion device in the selected slot and secure the I/O panel(s) with the supplied screw. Ensure that the card is securely seated in the card slot.

INSTALLING PCMCIA CARD OPTIONS

Figure 58:
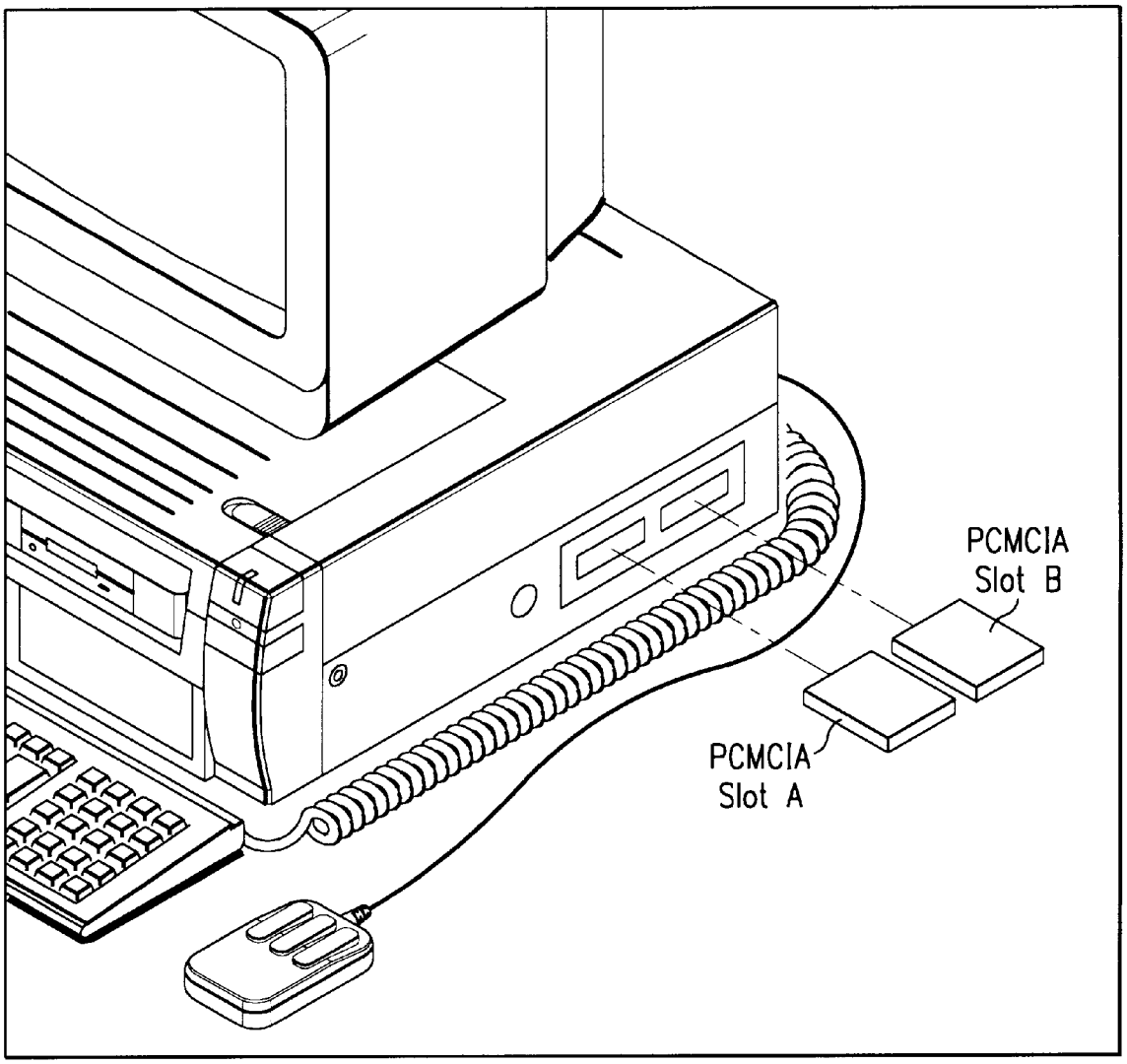
FIG. 58 illustrates installing PCMCIA card options.

The docking station can accept up to two credit-card size, 14.5 mm, Type I, II, or III PCMCIA options which may be a Data/FAX Modem, Networking Card, Hard Drive, etc. To install a PCMCIA option card, use the following procedure:

1. Carefully read the installation instructions supplied with the PCMCIA device.
2. Hold the card at the end opposite the pins with the label side up. Insert the card into any unused slot (two slots available on the right side of the docking station as illustrated in FIG. 58.

INSTALLING MONITOR, KEYBOARD, MOUSE

Figure 59:
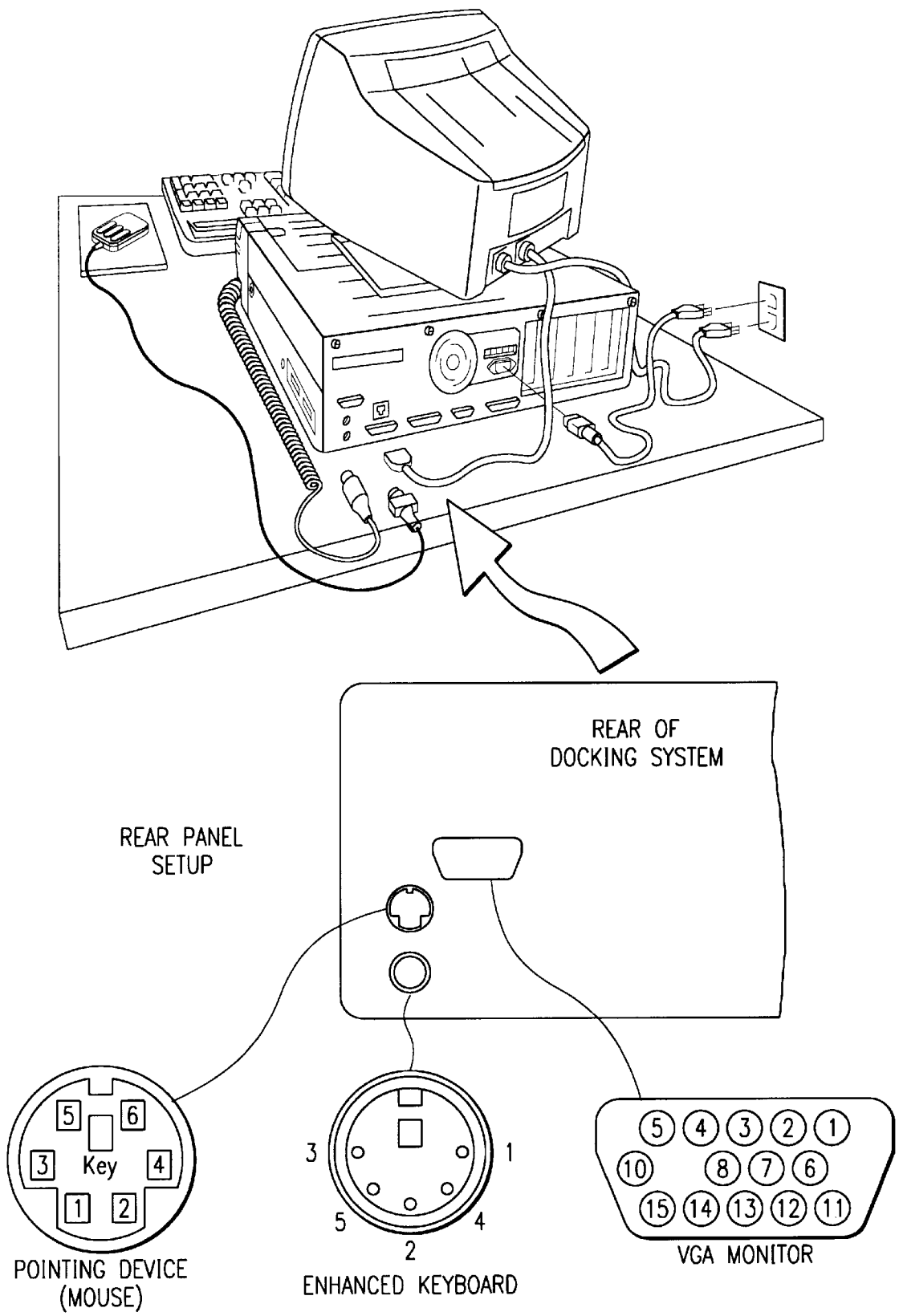
FIG. 59 illustrates installing a monitor, keyboard and mouse.

The docking station is capable of supporting the weight of a 17 inch diagonal VGA monitor on top of the docking station as illustrated in FIG. 59. Position the monitor as far back as possible.

1. Connect the monitor cable connector the 15-pin VGA monitor port as illustrated in FIG. 59.
2. Connect the monitor's power cable to an AC outlet. There are no special configuration setups that need to be performed. The intelligence of the docking station will detect if a monitor is present and automatically display on the CRT. If no CRT is attached, the system defaults to the default setting configured in the portable computer setup program (LCD only, SIMUL or CRT).

To install an external keyboard, connect the found 101 keyboard cable connector to the 5-pin circular connector on the rear of the docking station as illustrated in the previous figure. When an external keyboard is attached, the system automatically disables the notebook's internal keyboard. If no keyboard is attached, the system automatically enables the portable computer's internal keyboard.

To install a mouse, connect the mouse connector to the 6-pin mouse port on the rear of the system as illustrated in the previous figure.

To install the power cord, connect the power cable to the AC outlet on the rear of the docking station. Then plug the power cord into the AC outlet.

INSTALLING TELEPHONE CONNECTION

Figure 60:
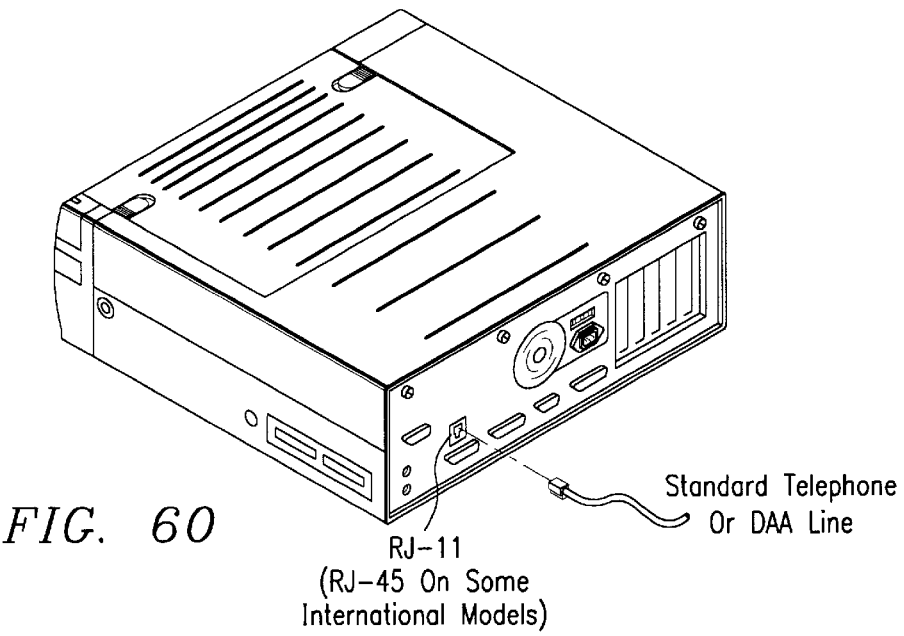
FIG. 60 illustrates modem telephone line connection.

If using the portable computer's internal Data/FAX Modem option, connect the docking station to a telephone line via the RJ-11 telephone jack on the rear of the docking station, as illustrated in FIG. 60.

ATTACHING SERIAL DEVICES

Figure 61:
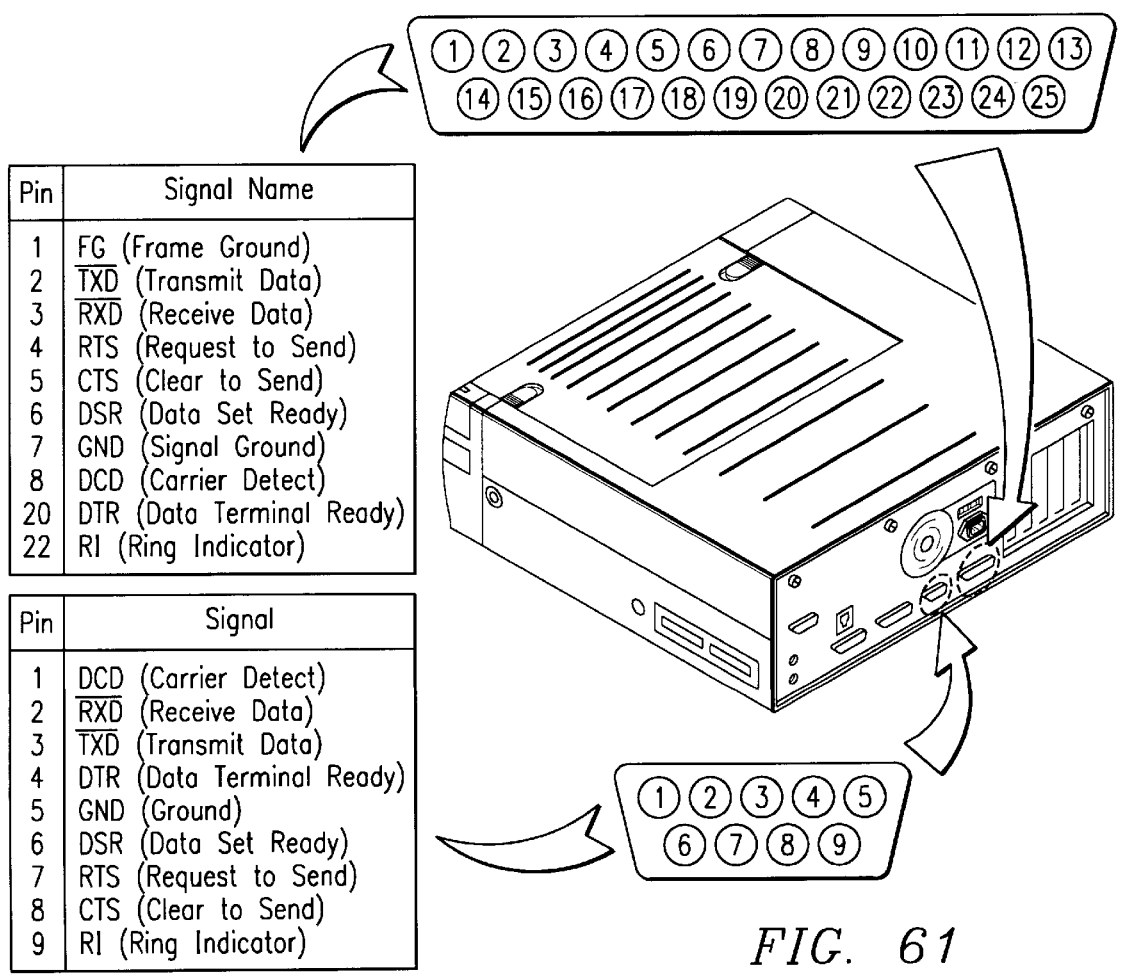
FIG. 61 illustrates serial port connections.

The docking station is equipped with two serial ports, as illustrated in FIG. 61 including: 9-pin serial port and 25-pin serial port. Although these two ports have a different number of pins, they are electrically identical. The serial ports are used to interconnect such devices as: external modem, serial printer, or any device that uses an RS232 interface.

ATTACHING PARALLEL DEVICE

Figure 62:
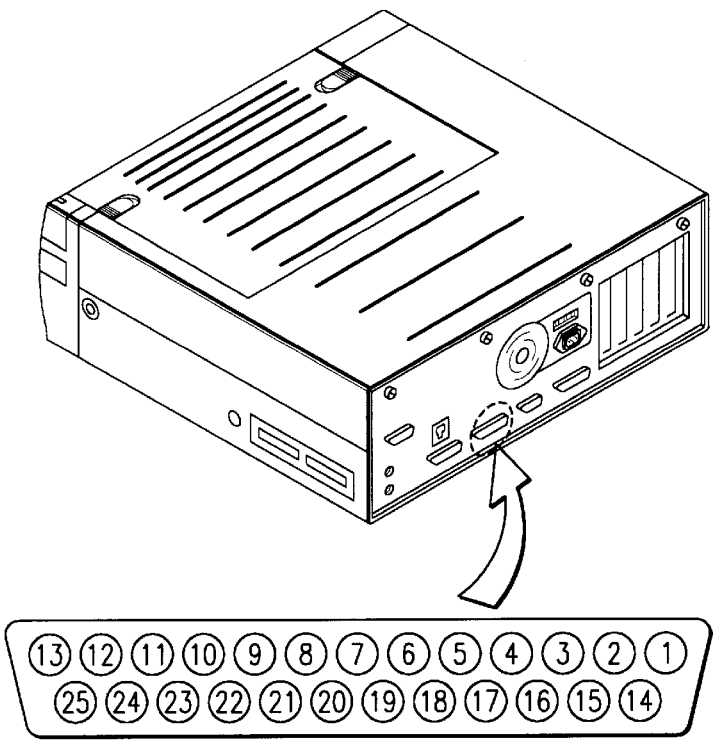
FIG. 62 illustrates a serial port connection.

The docking station is equipped with one DB25 (25-pin), bidirectional Parallel Port (device name LPTI) as illustrated in FIG. 62. This port occupies address 0378h, and is designated LPTI (default value). Typically, the portable computer always sends print data to LPTI unless menu configured otherwise. Two or more parallel ports (maximum of three ports in the system) can be added via expansion card options. If a parallel port is added at address 03BCh, then this port is designated LPTI and the docking station's built-in parallel port is re-designated LPT2 (the system automatically assigns the device name LPTI to the first port it finds in order of polling.

ATTACHING GAME DEVICES

Figure 63:
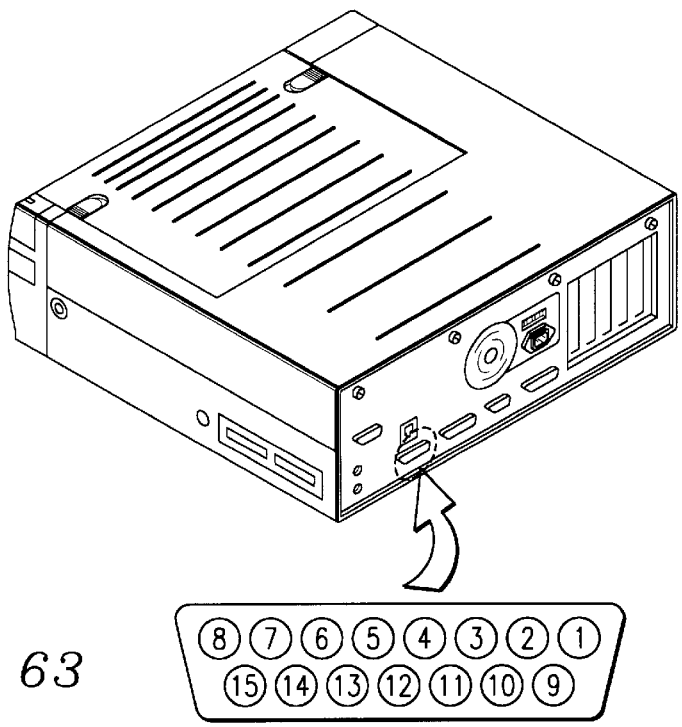
FIG. 63 illustrates attaching game port compatible devices.

The docking station contains a 15-pin, female connector, illustrated in FIG. 63, that can be used to connect joysticks or various other game port-compatible devices to the docking station.

COMPUTER PROGRAMS LISTING

1. MOTOR CODE—pages 65–114. MOTOR CODE is loaded onto the ROM memory of microprocessor U140 and it facilitates: microprocessor control of the loading and docking of a portable computer to the docking station, including motor speed and force; control of on/off power to the docking station; intensity and duration of portable computer battery recharging while docked; control of function of docking station front panel switches and control of front panel LEDs.

2. DOCK—pages 115–138. DOCK is the DOS version of the docking station control functions.

3. SUPER SHUTDOWN—pages 139–194. SUPER SHUTDOWN is an automatic shutdown configuration (also available on TI's BatteryPro and Productivity Software diskette). This utility allows the docking system to exit Windows faster than the standard Windows exit procedure.

The utility provides a selection of user-specified shutdown features that customizes the way a computer shuts down and reboots.

4. SETDOCK—pages 195–268. SETDOCK sets up the I/O ports on the docking station which customizes the docking system hardware configuration for maximum performance.

5. TISYSTEM—pages 269–316. TISYSTEM provides a library of functions.

6. BATTERY PRO—pages 317–379. BATTERY PRO power saving utility provides control of energy usage within the portable computer and better handshaking between the portable computer and the docking station.

We claim:

1. A computer docking system, comprising:
   a portable computer having a central processing unit; and
   a docking station having connection means for connecting said portable computer to said docking station, said docking station having an internal microprocessor which controls itself under a first mode of operation and is under at least partial control of said central processing unit in said portable computer under a second mode of operation.

2. The computer docking system of claim 1, in which said microprocessor performs processing to the portable computer and applications across a communications bus between said microprocessor and said portable computer.

3. The computer docking system of claim 1, in which said microprocessor controls the means by which the portable computer is mechanically connected to said docking station.

4. The computer docking system of claim 1, in which said microprocessor controls the means by which the portable computer is electrically connected to said docking station.

5. The computer docking system of claim 1, in which said microprocessor controls the means by which the portable computer is mechanically and electrically connected to said docking station.

6. The computer docking system of claim 1, in which said microprocessor controls the power to the portable computer.

7. The computer docking system of claim 1, in which said microprocessor controls the function of free form switches on the docking station.

8. The computer docking system of claim 1, in which said microprocessor controls itself under a first mode of operation and is under at least partial from a central processing unit in said portable computer under a second mode of operation.

9. A computer docking station, comprising:
   connection means for connecting a portable computer to said docking station, said docking station having an internal microprocessor which, when said portable computer is connected to said docking station, controls itself under a first mode of operation and is under at least partial control of a central processing unit in said portable computer under a second mode of operation.

10. The docking station of claim 9, in which said microprocessor performs processing to the portable computer and applications across a communications bus between said microprocessor and said portable computer.

11. The docking station of claim 9, in which said microprocessor controls the means by which the portable computer is mechanically connected to said docking station.

12. The docking station of claim 9, in which said microprocessor controls the means by which the portable computer is electrically connected to said docking station.

13. The docking station of claim 9, in which said microprocessor controls the means by which the portable computer is mechanically and electrically connected to said docking station.

14. The docking station of claim 9, in which said microprocessor controls the power to the portable computer.

15. The docking station of claim 9, in which said microprocessor controls processing across a bus.

16. The docking station of claim 9, in which said microprocessor controls the function of free form switches on the docking station.

17. A computer docking system, comprising:
    a docking station having a central processing unit and a mechanism connecting said docking station to a portable computer, said central processing unit controlling itself under a first mode of operation and being at least partially controlled by a central processing unit in said portable computer under a second mode of operation.

18. The computer docking system of claim 17, in which said mechanism mechanically connects said docking station to said portable computer.

19. The computer docking system of claim 17, in which said mechanism electrically connects said docking station to said portable computer.

20. The computer docking system of claim 17, in which said mechanism electrically and mechanically connects said docking station to said portable computer.

21. The computer docking system of claim 17, in which said mechanism mechanically connects said docking station to and disconnects said docking station from said portable computer.

22. The computer docking system of claim 17, in which said mechanism electrically connects said docking station to and disconnects said docking station from said portable computer.

23. The computer docking system of claim 17, in which said mechanism electrically and mechanically connects said docking station to and disconnects said docking station from said portable computer.

24. The computer docking system of claim 21, in which said central processing unit in said docking station controls said mechanism.

25. The computer docking system of claim 22, in which said central processing unit in said docking station controls said mechanism.

26. The computer docking system of claim 23, in which said central processing unit in said docking station controls said mechanism.

27. The computer docking system of claim 24, in which said central processing unit in said docking station is under software control.

28. The computer docking system of claim 25, in which said central processing unit in said docking station is under software control.

29. The computer docking system of claim 26, in which said central processing unit in said docking station is under software control.

30. The computer docking system of claim 16, in which said central processing unit in said docking station sends information to and receives information from said portable computer via a communication bus between said central processing unit and said portable computer.

31. The computer docking system of claim 30, in which said central processing unit in said docking station controls processing across said bus.

32. The computer docking system of claim 30, in which said a central processing unit in said portable computer controls processing across said bus.

33. The computer docking system of claim 30, in which said central processing unit in said docking station and a central processing unit in said portable computer control processing across said bus.

34. The computer docking system of claim 30, in which said information is data.

35. The computer docking system of claim 30, in which said information is applications.

36. The computer docking system of claim 30, in which said information is data and applications.

37. The computer docking system of claim 16, in which said central processing unit in said docking station logically disconnects said docking station from said portable computer while maintaining an electrical connection between said central processing unit and said portable computer.

38. The computer docking system of claim 16, in which said central processing unit in said docking station logically disconnects said docking station from said portable computer while maintaining an electrical connection between said central processing unit and said portable computer.

39. The computer docking system of claim 37, in which said central processing unit in said docking station logically connects said docking station to and disconnects said docking station from said portable computer while maintaining an electrical connection between said central processing unit and said portable computer.

40. A computer docking station, comprising:

a central processing unit and a mechanism for connecting said docking station to a portable computer, said central processing unit controlling itself under a first mode of operation and being at least partially controlled by a central processing unit in said portable computer under a second mode of operation when said docking station is connected to said portable computer.

41. The docking station of claim 40, in which said mechanism mechanically connects said docking station to said portable computer.

42. The docking station of claim 40, in which said mechanism electrically connects said docking station to said portable computer.

43. The docking station of claim 40, in which said mechanism electrically and mechanically connects said docking station to said portable computer.

44. The docking station of claim 40, in which said mechanism mechanically connects said docking station to and disconnects said docking station from said portable computer.

45. The docking station of claim 40, in which said mechanism electrically connects said docking station to and disconnects said docking station from said portable computer.

46. The docking station of claim 40, in which said mechanism electrically and mechanically connects said docking station to and disconnects said docking station from said portable computer.

47. The docking station of claim 44, in which said central processing unit in said docking station controls said mechanism.

48. The docking station of claim 45, in which said central processing unit in said docking station controls said mechanism.

49. The docking station of claim 44, in which said central processing unit in said docking station controls said mechanism.

50. The docking station of claim 47, in which said central processing unit in said docking station is under software control.

51. The docking station of claim 48, in which said central processing unit in said docking station is under software control.

52. The docking station of claim 49, in which said central processing unit in said docking station is under software control.

53. The docking station of claim 40, in which said central processing unit in said docking station sends information to and receives information from said portable computer via a communication bus between said central processing unit and said portable computer.

54. The docking station of claim 53, in which said central processing unit in said docking station controls processing across said bus.

55. The docking station of claim 53, in which said central processing unit in said portable computer controls processing across said bus.

56. The docking station of claim 53, in which said central processing unit in said docking station and a central processing unit in said portable computer control processing across said bus.

57. The docking station of claim 53, in which said information is data.

58. The docking station of claim 53, in which said information is applications.

59. The docking station of claim 53, in which said information is data and applications.

60. The docking station of claim 40, in which said central processing unit in said docking station logically connects said docking station to and disconnects said docking station from said portable computer.

61. The docking station of claim 40, in which said central processing unit in said docking station logically disconnects said docking station from said portable computer while maintaining an electrical connection between said central processing unit and said portable computer.

62. The docking station of claim 60, in which said central processing unit in said docking station logically connects said docking station to and disconnects said docking station from said portable computer while maintaining an electrical connection between said central processing unit and said portable computer.

63. The computer docking system of claim 1, in which said microprocessor controls processing across a bus.

* * * * *

UNITED STATES PATENT AND TRADEMARK OFFICE
CERTIFICATE OF CORRECTION

PATENT NO. : 6,029,215
DATED : February 22, 2000
INVENTOR(S) : LaVaughn F. Watta, Jr., Gary Verdun, Kevin David, and Thomas R. Grimm It is certified that error appears in the above-identified patent and that said Letters Patent is hereby corrected as shown below:

On the title page: ITEM [54] and Column 1, lines 1 and 2, should read
--COMPUTER DOCKING STATION WITH INTERNAL MICROPROCESSOR--.

Signed and Sealed this

Thirtieth Day of January, 2001

Attest:

Q. TODD DICKINSON

*Attesting Officer*     *Director of Patents and Trademarks*